United States Patent
Yamamoto et al.

(10) Patent No.: US 6,396,565 B1
(45) Date of Patent: May 28, 2002

(54) PHOTOGRAPH PRINTING DEVICE, ELECTRONIC IMAGE INPUT DEVICE, FILM SCANNER, SCRATCH RECOGNITION METHOD, MEMORY MEDIUM RECORDING SCRATCH RECOGNITION PROGRAM, AND IMAGE RESTORATION METHOD

(75) Inventors: Yuji Yamamoto; Hidetoshi Nishikawa, both of Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 0 days.

(21) Appl. No.: 09/236,484

(22) Filed: Jan. 25, 1999

(30) Foreign Application Priority Data

Jan. 27, 1998 (JP) ............................................. 10-014631
Jan. 27, 1998 (JP) ............................................. 10-014655
Sep. 25, 1998 (JP) ............................................. 10-271331

(51) Int. Cl.$^7$ ........................ G03B 27/52; G03B 27/32; G03B 27/72; B41J 2/47
(52) U.S. Cl. ............................ 355/41; 355/32; 355/35; 347/239
(58) Field of Search ............................ 355/41, 32, 35, 355/38, 37, 64; 358/527; 347/239, 255; 348/238, 239, 255

(56) References Cited

U.S. PATENT DOCUMENTS

| | | | | |
|---|---|---|---|---|
| 5,202,724 A | * | 4/1993 | Nagata et al. ............... | 355/64 |
| 5,382,966 A | * | 1/1995 | Doi ............................. | 347/238 |
| 5,748,283 A | * | 5/1998 | Sunagawa et al. ............ | 355/35 |
| 5,812,892 A | * | 9/1998 | Miyoshi et al. .............. | 396/548 |
| 5,883,698 A | * | 3/1999 | Kimura ........................ | 355/38 |
| 5,953,103 A | * | 9/1999 | Nakamura .................... | 355/32 |

FOREIGN PATENT DOCUMENTS

JP 08022081 A 1/1996

* cited by examiner

Primary Examiner—David M. Gray
Assistant Examiner—Peter B. Kim
(74) Attorney, Agent, or Firm—Staas & Halsey LLP

(57) ABSTRACT

A plurality of LEDs are used as a light source for projecting light onto a film negative recording an original image. The LEDs have different respective spectral characteristics, and are provided so as to incline with respect to a light axis, so that light emitted thereby has directivity toward a light axis. By this means, the light emitted by each LED has directivity, thus increasing the light quantity of light projected onto peripheral areas of photographic paper. Accordingly, density unevenness and color unevenness on the photographic paper can be easily distinguished without scattering the light from each LED more than necessary, as was done conventionally. As a result, there is no need for control which attempts to obtain sufficient scattered light by increasing the exposure time or brightness of each LED. Further, there is no need to provide a large number of LEDs, thus simplifying control of the emitted light quantities of the respective LEDs.

30 Claims, 34 Drawing Sheets

F I G. 4
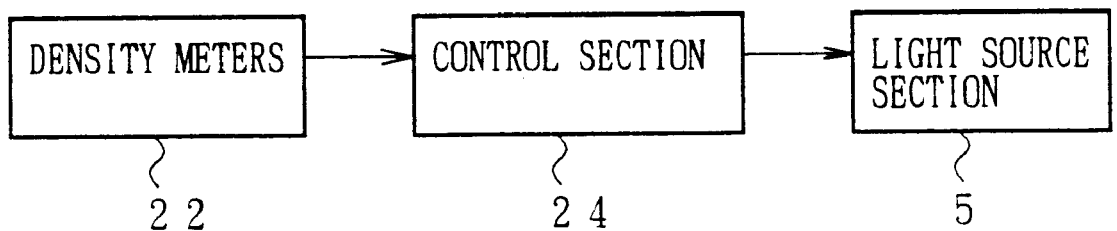

⊗ : LED EMITTING BLUE LIGHT

⊞ : LED EMITTING GREEN LIGHT

○ : LED EMITTING RED LIGHT

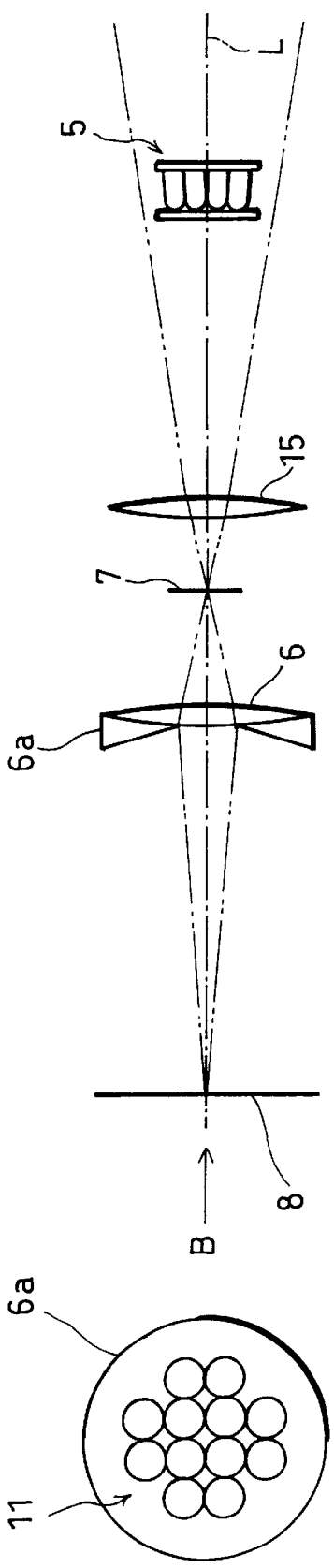

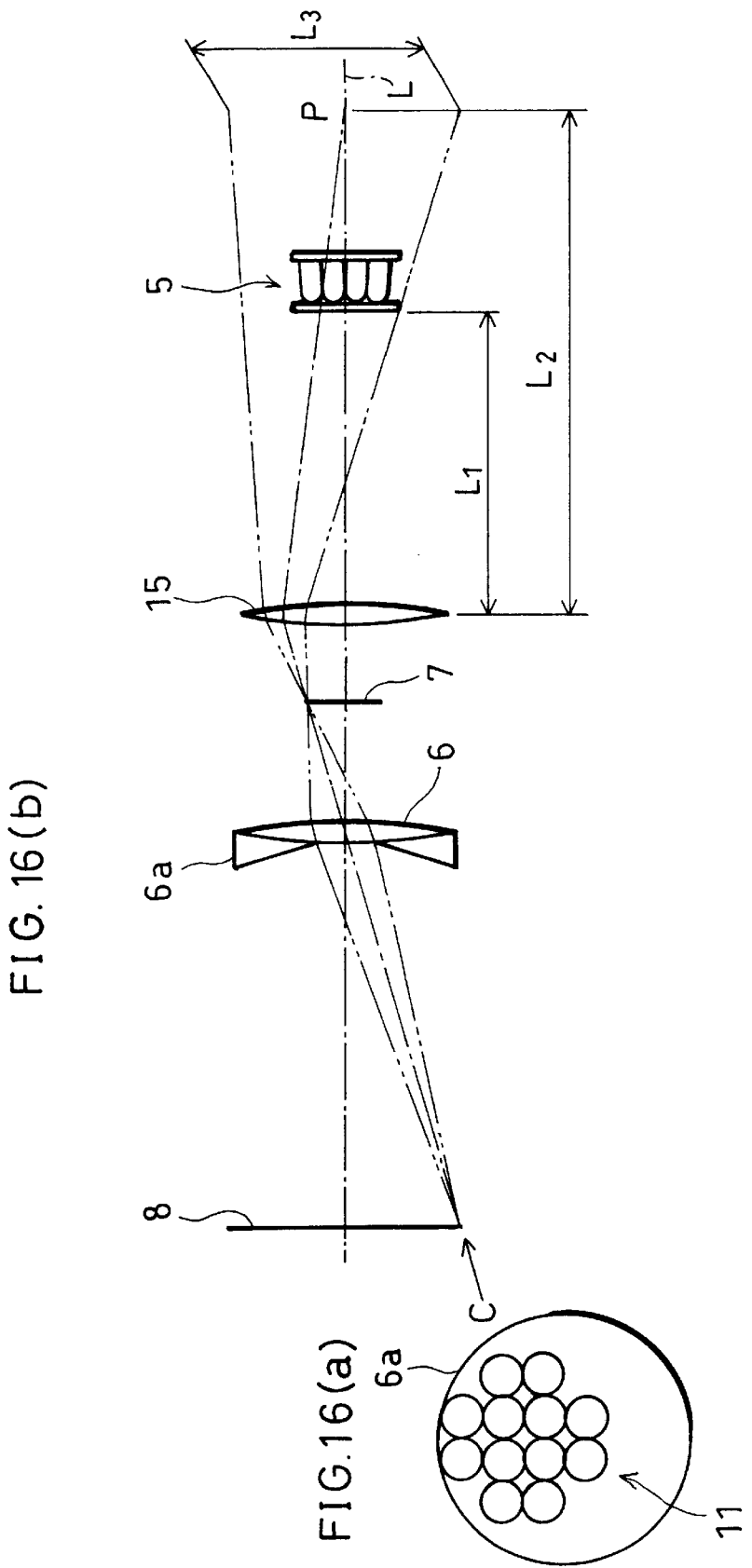

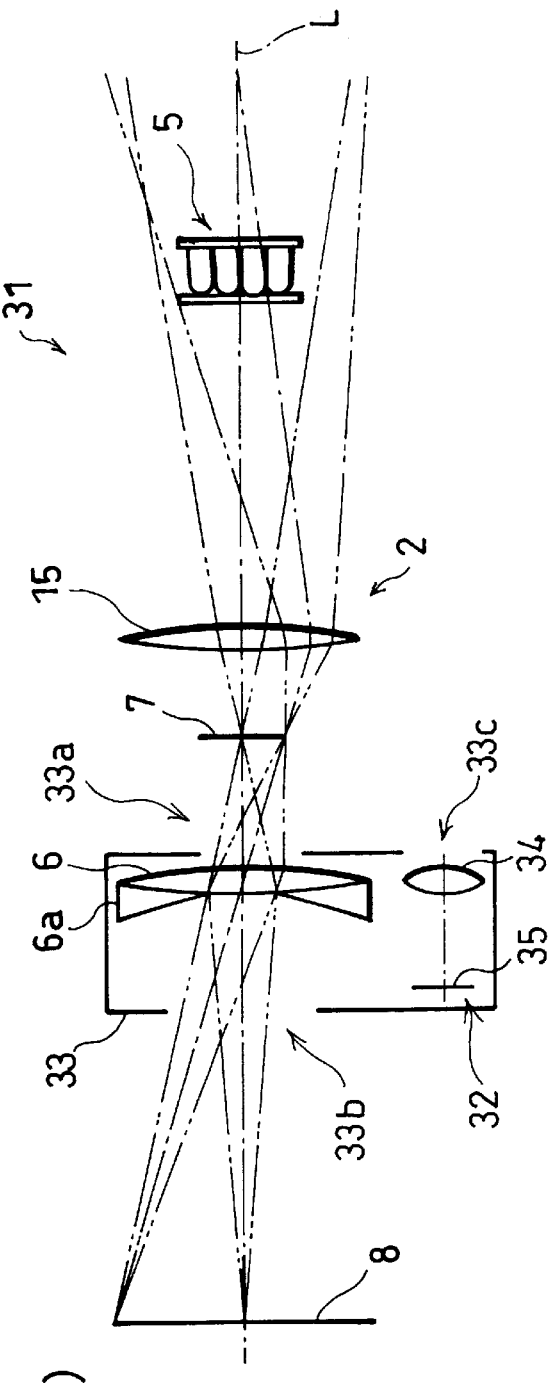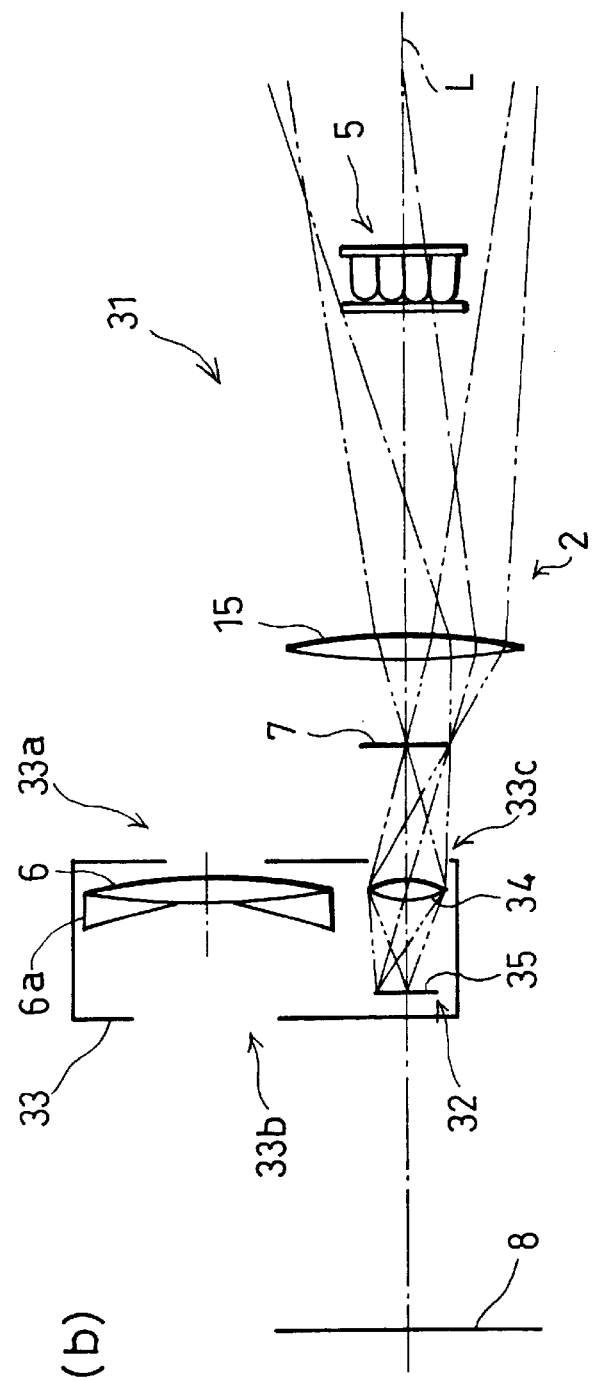
FIG.17(a)
FIG.17(b)

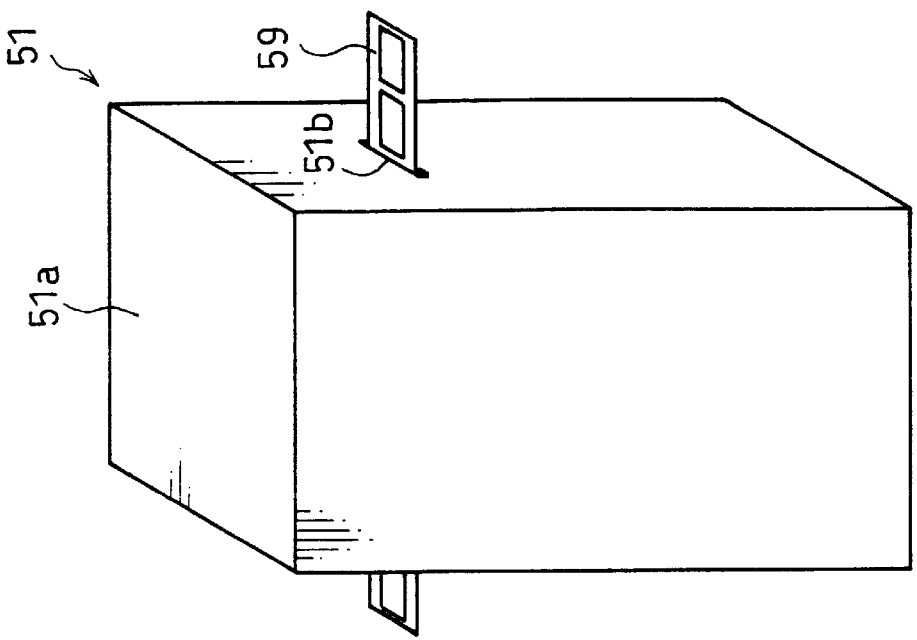
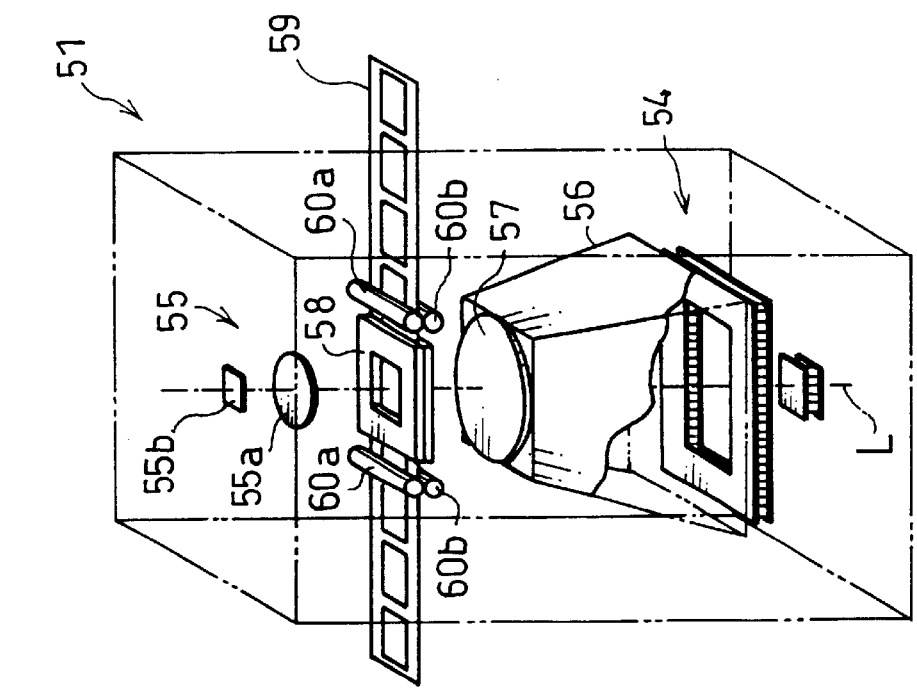

F I G. 26
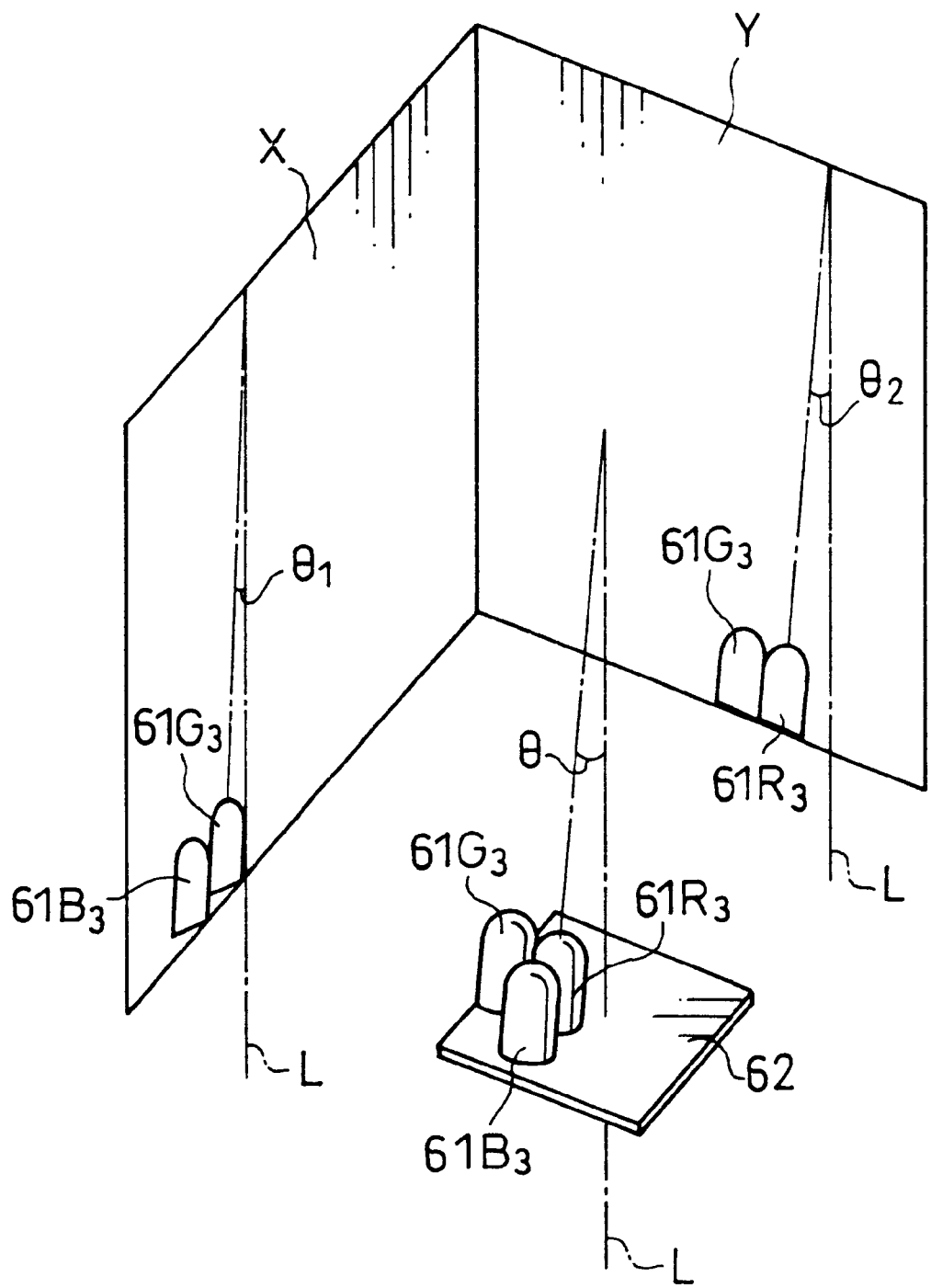

PHOTOGRAPH PRINTING DEVICE, ELECTRONIC IMAGE INPUT DEVICE, FILM SCANNER, SCRATCH RECOGNITION METHOD, MEMORY MEDIUM RECORDING SCRATCH RECOGNITION PROGRAM, AND IMAGE RESTORATION METHOD

FIELD OF THE INVENTION

The present invention relates to (1) a photograph printing device, for use in, for example, a photograph processing device or photograph printer, which, by projecting light onto a photosensitive material through an information holding medium (such as a film negative recording an original image, or a liquid crystal display element, PLZT exposure head, DMD (digital micromirror device), etc. driven by image signals corresponding to the original image), prints an image corresponding to the original image onto the photosensitive material; (2) an electronic image input device including the foregoing photograph printing device and an image pickup element such as a CCD (charge coupled device); (3) a film scanner, for use in, for example, a digital printing system, which, by scanning light obtained through film recording an original image, registers the original image; (4) a scratch recognition method for recognizing a scratch formed on the foregoing film; (5) a memory medium recording a program for scratch recognition; and (6) an image restoration method for restoring a scratch area of an image obtained by scanning.

BACKGROUND OF THE INVENTION

In the past, various photograph printing devices have been proposed in which, for example, a film negative recording an original image is placed in front of a photosensitive material, and an image corresponding to the original image is printed onto the photosensitive material by projecting light onto the photosensitive material through the film negative.

In this type of photograph printing device, a halogen lamp is usually used as the light source for projecting light onto the photosensitive material. Further, by interposing in the light path three different cutoff filters with different respective spectral characteristics, corresponding to red, green, and blue, the light from the halogen lamp is adjusted to light suited to photograph printing.

However, photograph printing devices which use a halogen lamp as the light source have the following problems.

(1) Since halogen lamps produce large amounts of heat, which is unnecessary in photographic printing, forced cooling means such as a cooling fan are necessary. Here, use of a cooling fan is a hindrance to good printing, because surrounding dust is sucked into the optical system.

(2) A stable direct-current power source for stabilizing the spectral characteristics of the halogen lamp, a light-adjusting filter, cutoff filters for cutting out infrared and ultraviolet light, etc. are also necessary, thus increasing the size of the device.

(3) Since a desired light quantity necessary for printing cannot be obtained until a certain time has passed after turning on the halogen lamp, the halogen lamp must be left turned on even when not printing. This increases the power consumption of the halogen lamp. Further, to prevent light from the halogen lamp from reaching the photographic paper (photosensitive material) when not performing printing, a shutter mechanism between the photographic paper and the halogen lamp is necessary, thus increasing the number of structural parts.

(4) Given that light quantity differs greatly between the light axis and surrounding areas, a scattering device is often provided to scatter the light from the halogen lamp to create a planar light source necessary in printing. This increases loss of light quantity.

(5) If the halogen lamp is always left turned on, when printing a large number of photographs, heat from the halogen lamp has an adverse effect on the film negatives.

The problems in (1) through (5) above also arise with film scanners, in which a film negative recording an original image is placed in front of a scanning section, and the scanning section registers the original image by scanning light projected through the film negative. Such a film scanner is connected to a digital printer through, for example, a computer such as a personal computer, and images read by the film scanner are outputted by the digital printer.

A photograph printer and a film scanner disclosed in Japanese Unexamined Patent Publication No. 8-22081/1996 (Tokukaihei 8-22081) use as light source a plurality of light emitting diodes (hereinafter referred to simply as "LEDs") having different respective spectral characteristics, thus avoiding the foregoing problems caused by the halogen lamp. The following will explain in outline the structure of an exposure projection section of the photograph printer disclosed in the foregoing publication.

As shown in FIG. 33, the foregoing conventional photograph printer includes an LED light source 101, a scattering plate 102, and a lens 103.

The LED light source 101 is made up of a plurality of LEDs 101a, each of which projects red, green, or blue light, arranged in matrix form. Here, each of the LEDs 101a is provided so that light emitted thereby has directivity in a direction parallel to a light axis L, as shown in FIG. 33. Further, each LED 101a is independently ON/OFF controlled by a light source driving section (not shown), by means of which the duration and/or brightness of illumination of each LED 101a is controlled.

The scattering plate 102 is provided on the side of the LED light source 101 from which light exits, and scatters the light projected thereby. The lens 103 focuses an optical image, incident thereon, onto color photographic paper 105 (photosensitive material).

In the foregoing structure, when the LEDs 101a of the LED light source 101 are lit, light projected from each LED 101a is scattered by the scattering plate 102, passes through a film negative 104 set in a printing position and the lens 103, and reaches the color photographic paper 105. In this way, an image corresponding to the original image recorded on the film negative 104 is focused on and printed onto the color photographic paper 105.

The film scanner disclosed in the foregoing publication is structured as the foregoing photograph printer, except that the color photographic paper 105 is replaced by an image area sensor 106. Accordingly, in the foregoing film scanner, when the LEDs 101a of the LED light source 101 are lit, light projected from each LED 101a is scattered by the scattering plate 102, passes through the film negative 104 and the lens 103, and reaches the image area sensor 106. In this way, an image corresponding to the original image recorded on the film negative 104 is focused on a photoreceptive surface of the image area sensor 106. Then, if the film scanner is connected to a digital printer through, for example, a computer such as a personal computer, a sheet recording an image corresponding to the original image is discharged from the digital printer.

However, in the photograph printer disclosed in the foregoing publication, since each LED 101a is provided so that light emitted thereby has directivity in a direction parallel to the light axis, due to the influence of, for example, aberration arising from the design of the optical system, the light quantity of light projected onto peripheral areas of the color photographic paper 105 is decreased, resulting in unevenness in density and color between central and peripheral areas.

Some methods of avoiding this difficulty are the following. One is a method in which the scattering plate 102 is thicker in the central portion and thinner toward the periphery, thereby further scattering light so as to reduce the light quantity in the central area of the color photographic paper 105 and increase the light quantity in the peripheral areas of the color photographic paper 105. Another method is one in which the scattering plate 102 is made of frosted glass of a coarseness which can barely be seen through with the naked eye, thereby scattering the light as in the method above.

However, with methods such as these, which scatter light, loss of light quantity is increased, and thus it is necessary, for example, to increase the exposure time of each LED 101a, increase the brightness of illumination of each LED 101a, etc. This results in the further problem that adjustment of uneven density requires time and effort.

Further, in FIG. 34, which shows the intensity distribution of light from each LED 101a, it can be seen that intensity is high near the center of each light spot, but decreases with distance from the center.

In the photograph printer disclosed in the foregoing publication, since each LED 101a emits light having directivity parallel to the light axis, light spots of the LEDs 101a are dispersed across the color photographic paper 105 in positions corresponding to the LEDs 101a, as shown in FIG. 34, giving rise to marked color unevenness. In other words, this color unevenness is due to the fact that the light spots projected onto the color photographic paper 105 appear with a one-to-one correspondence with the LEDs 101a.

One possible method of reducing this kind of color unevenness is to project scattered light onto the film negative 104 using LEDs 101a having a wide directivity. However, since the principle of this method remains scattering of light, to reduce the resulting loss of light quantity, it is again necessary to increase the exposure time or brightness of each LED 101a. Here again, this results in the problem that adjustment of color unevenness requires time and effort.

On the other hand, another possible solution is to use LEDs 101a of narrow directivity, but to greatly increase their number, thereby increasing the density of the light spots to eliminate color unevenness. However, it is extremely difficult to provide LEDs 101a numerous enough to reduce color unevenness, and even if enough LEDs 101a could be provided, fine control of such a large number of LEDs 101a would be nearly impossible in practice.

Further, in the film scanner disclosed in the foregoing publication, if the film negative 104 includes a scratch area disturbing the light path from the LED light source 101 to the image area sensor 106, a scratch image (such as a white area) corresponding to the scratch area appears in the scanning image. This is because light incident on the scratch area is refracted thereby, and diverges from the light path leading to the image area sensor 106, resulting in insufficient light quantity at the scratch image. Further, this phenomenon of insufficient light quantity resulting from irregular refraction, etc. also occurs when dust, foreign objects, etc. are attached to the film negative 104.

However, in the foregoing conventional film scanner using the LED light source 101, a scratch area on the film negative 104 cannot be recognized. In other words, when there is a scratch area on the film negative 104, a white area appears in the scanning image obtained by the image area sensor 106, but even if this white area is recognizable as a scratch image by human eyes, the computer is unable to distinguish whether the white area is a scratch image or a legitimate image corresponding to the original image recorded on the film negative 104.

As a result, in the foregoing conventional film scanner, when there is a scratch area on the film negative 104, it is not possible to restore only the corresponding scratch image, and thus it is impossible to obtain a good print free of scratch images.

SUMMARY OF THE INVENTION

It is an object of the present invention to provide a photograph printing device capable of simple adjustment of unevenness in density and color on photographic paper; an electronic image input device including such a photograph printing device and an image pickup element; a film scanner which, when film recording an original image includes a scratch area disturbing the light path to a scanning section, is able to distinguish the scratch area from non-scratch areas, and to restore an image corresponding to the scratch area; a scratch recognition method; a memory medium recording a scratch recognition program; and an image restoration method.

In order to attain the foregoing object, a photograph printing device according to the present invention, by projecting light onto a photosensitive material through an information holding medium which holds original image information, prints onto the photosensitive material an image corresponding to the original image information, and is provided with a light source for projecting light onto the information holding medium; in which the light source includes a plurality of light emitting means having different respective spectral characteristics, and each of the light emitting means is provided so as to incline with respect to a light axis, so that light emitted thereby has directivity toward the light axis.

With the foregoing structure, since light projected from each of the light emitting means has directivity, even if aberration, etc. occurs in the optical system, the light quantity of light projected through the information holding medium onto the peripheral areas of the photosensitive material is increased in comparison with the conventional art, in which light emitting means were provided so that light emitted thereby has directivity in a direction parallel to the light axis. In this way, unevenness in density and color on the photosensitive material can be easily distinguished, without scattering the light from the light emitting means more than necessary, as was done conventionally. Accordingly, there is no need for control which attempts to obtain sufficient scattered light by increasing the exposure time or brightness of each light emitting means.

Further, since each light emitting means inclines with respect to the light axis, light spots with a one-to-one relationship to the light emitting means do not appear on the photosensitive material. As a result, color unevenness can be suppressed to some extent, and thus, as above, there is no need to scatter the light from the light emitting means more than necessary, nor to provide a large number of light emitting means.

For these reasons, with the foregoing structure, control of each of the light emitting means is simplified, thus facilitating adjustment of unevenness in density and color.

An electronic image input device according to the present invention includes the foregoing photograph printing device, and image pickup means, which pick up light from the light emitting means obtained through the information holding medium.

With the foregoing structure, by replacing the photosensitive material of the foregoing photograph printing device with the image pickup means, adjustment of density and color unevenness, for example, can be performed directly, on the basis of output from the image pickup means, prior to printing. In other words, if the image pickup means are, for example, a CCD, since the CCD outputs electrical signals corresponding to the light quantity received by each pixel thereof, the detected signals from the CCD can be used to register density distribution of an optical image focused on a photoreceptive surface of the CCD. Accordingly, it is not necessary to perform test printing to detect unevenness in density and color, and, as a result, adjustment of density unevenness and color unevenness can be performed quickly.

A film scanner according to the present invention includes a first light source, which projects light onto film recording an original image; scanning means, which register the original image by scanning light transmitted through the film; and light compensating means, which compensate insufficient light quantity due to disturbance of the light path from the first light source to the scanning means by an irregularity in the surface of the film (for example, surface unevenness such as a scratch), which causes an image of the irregularity to be formed in the scanning means, using the disturbance of the light path caused by the irregularity.

In the foregoing structure, when there is unevenness in the film surface, such as a scratch or dust, light from the first light source incident on the film surface is subject to refraction, etc. due to the surface unevenness, and is thus unable to follow the normal light path to reach the scanning means. In other words, the scratch, dust, etc. acts as an irregularity disturbing the light path from the first light source to the scanning means. As a result, in the scanning means, the image at the position of the irregularity, due to insufficient light quantity, is not colored, and appears as, for example, a white area.

Here, by providing light compensating means which, for example, produce light which differs from the light produced by the first light source and which is projected onto the film surface from random directions, insufficient light quantity due to the irregularity can be compensated by taking advantage of the disturbance of the light path by the irregularity. In other words, by intentionally using the refraction, etc. of the irregularity to send light to the position of the image appearing as a white area due to the refraction, etc. of the irregularity, the image at the position of the irregularity can be colored. In this way, the white area at the position of the irregularity can be eliminated.

The light compensating means may be a light source which itself emits light, or they may be means which, by reflecting, refracting, etc., light from the first light source, create light projected onto the film surface from random directions.

A scratch recognition method according to the present invention includes the steps of projecting light onto film recording an original image; and recognizing the existence of a scratch area formed on the film by scanning light obtained through the scratch area.

With the foregoing method, by scanning, among the light projected onto the film, the light obtained through the scratch area, it is possible to recognize the existence of a scratch area on the film. In other words, a scratch image corresponding to a scratch area normally appears as a white area, and, by scanning the foregoing light, it can easily be distinguished whether such a white area is a scratch image or a legitimate part of the image corresponding to the original image recorded on the film.

Accordingly, if the existence of a scratch area can be recognized in this manner, it is then possible to perform processing to increase image density at the scratch image alone by, for example, adjusting emitted light quantity. As a result, scratch images can be restored with certainty.

A memory medium recording a scratch recognition program according to the present invention records a program which causes a computer to recognize the existence of a scratch area, formed on film recording an original image, by projecting light onto the film and scanning light obtained through the scratch area.

With the foregoing structure, since the memory medium records a program for projecting light onto the film recording the original image, and scanning, among the light projected onto the film, the light obtained through the scratch area, the computer automatically recognizes the existence of a scratch area on the film. Accordingly, in comparison with a case in which the operator checks scanning light on a monitor, for example, scratch recognition can be performed more quickly, and with less effort on the part of the operator.

An image restoration method according to the present invention includes the steps of (a) projecting light onto film recording an original image, and scanning light obtained through a scratch area formed on the film; (b) after step (a), projecting onto the film light differing from the light projected in step (a), and scanning light passing through areas of the film other than the scratch area; and (c) bringing density of an image obtained in step (a) into conformity with density of an image obtained in step (b).

With the foregoing method, first, by scanning light obtained through the scratch area formed on the film, the existence of the scratch area on the film is recognized, and the image recorded in the scratch area (hereinafter referred to as the "first image") is obtained. However, density of the first image corresponds to the extent (depth, for instance) of the scratch area; the deeper the scratch, the lower the density.

Next, by scanning light passing through areas of the film other than the scratch area, the image recorded in the areas of the film other than the scratch area (hereinafter the "second image") is obtained, and then, finally, density of the first image is adjusted so as to substantially conform with density of the second image.

Accordingly, even when a scratch area is formed on the film, by recognizing the scratch area, the scratch image (white area, for example) alone can be restored. As a result, it is possible to obtain good prints free of scratch images.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2(b) is a perspective view showing the internal structure of the unevenness correction device shown in FIG. 2(a).

FIG. 4 is a block diagram showing the path of a signal from the unevenness correction device shown in FIG. 2(a) to a light source section of the printing section shown in FIGS. 1 and 3.

FIG. 15(a) is a plan view showing a light source section when viewed from a point corresponding to a central portion of the photographic paper shown in FIG. 15(b).

FIG. 15(b) is an explanatory drawing showing, in the printing section shown in FIG. 13, the light path of light reaching another point on the photographic paper.

FIG. 16(a) is a plan view showing a light source section when viewed from a point corresponding to a lower portion of the photographic paper shown in FIG. 16(b).

FIG. 16(b) is an explanatory drawing showing, in the printing section shown in FIG. 13, the light path of light reaching yet another point on photographic paper.

FIG. 17(a) is an explanatory drawing showing, in an electronic image input device provided with a CCD camera in a printing section thereof, positioning of a printing lens in a light path when printing onto photographic paper.

FIG. 17(b) is an explanatory drawing showing, in the electronic image input device shown in FIG. 17(a), positioning of a CCD camera in the light path when using the CCD camera to scan light from a light source section.

FIG. 22(a) is a perspective view showing the internal structure of the film scanner shown in FIG. 20.

FIG. 22(b) is a perspective view showing the exterior of the film scanner shown in FIG. 20.

FIG. 26 is a perspective view explaining, in the first light source section shown in FIGS. 25(a) and 25(b), inclination, with respect to a light axis, of LEDs provided in a predetermined region.

DESCRIPTION OF THE EMBODIMENTS

First Embodiment

Figure 1:
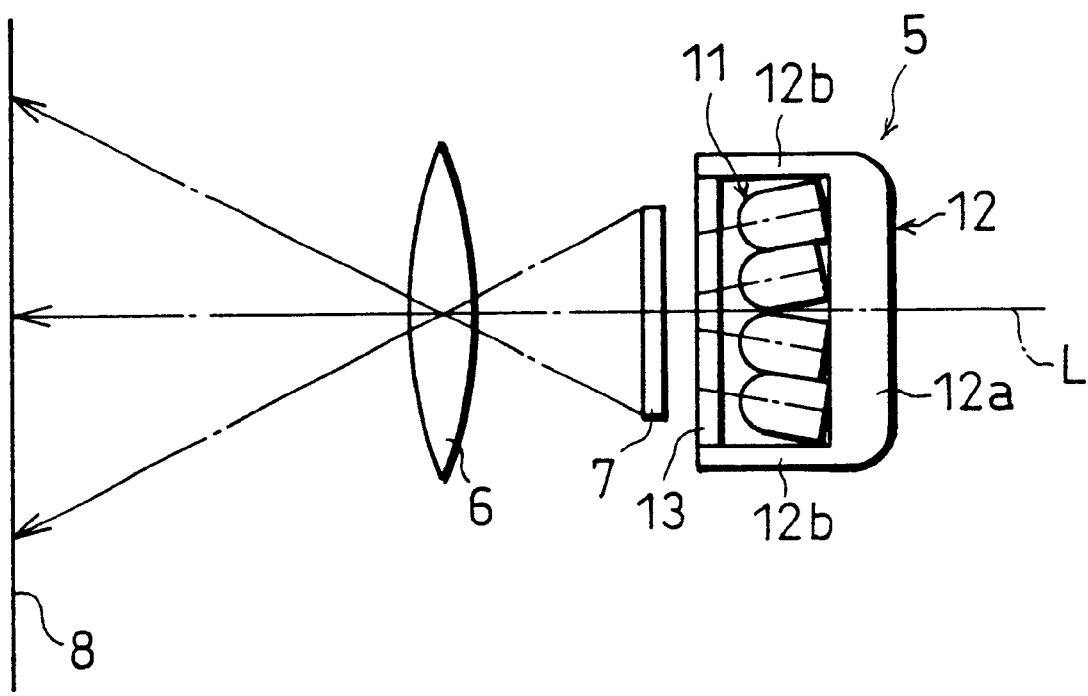
FIG. 1 is a cross-sectional drawing showing the structure of the main part of a printing section in a photograph printer according to one embodiment of the present invention.
Figure 2:
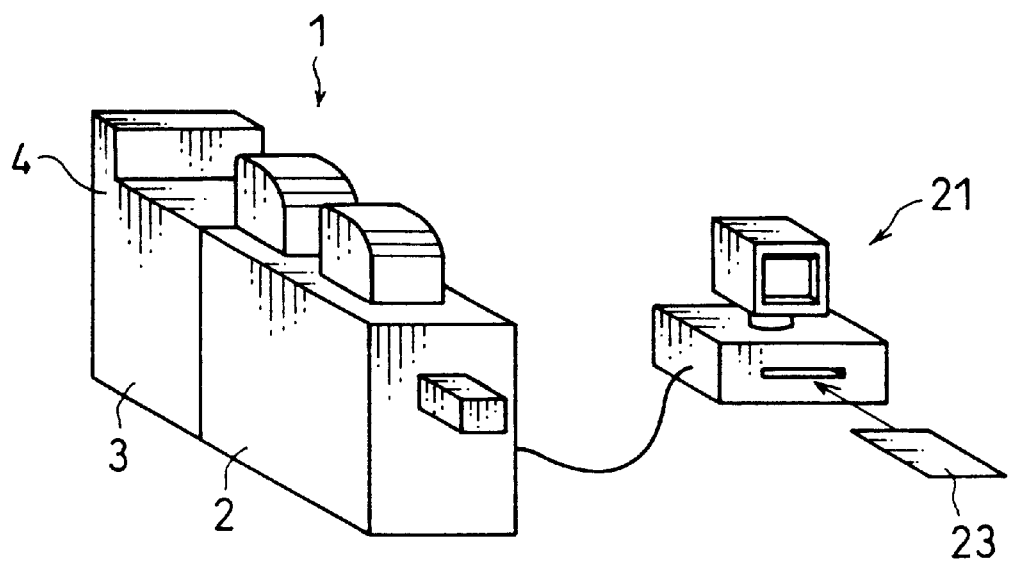
FIG. 2(*a*) is a perspective view showing the foregoing photograph printer connected to an unevenness correction device.
Figure 2:
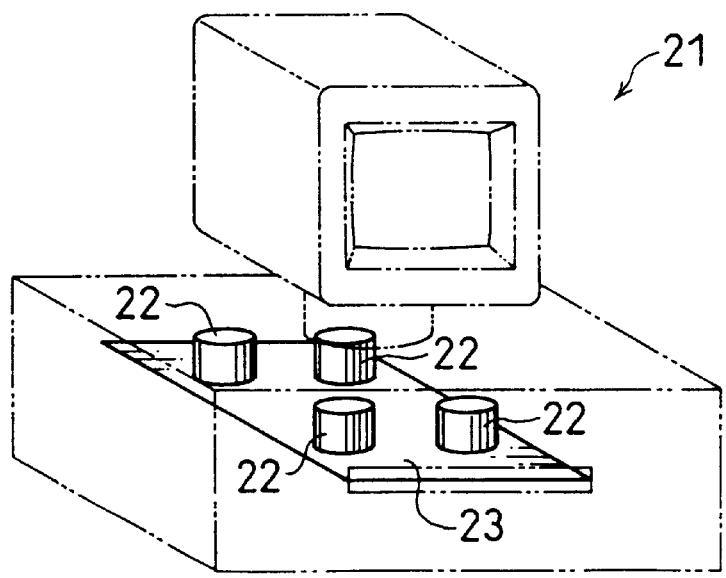

The following will explain one embodiment of the present invention with reference to FIGS. 1 through 11(b)

As shown in FIG. 2(a), a photograph printer 1 according to the present embodiment includes a printing section 2 (corresponding to the photograph printing device of the present invention), a developing section 3, and a drying section 4. The developing section 3 performs developing of an image printed onto photographic paper 8 (photosensitive material) in the printing section 2. The drying section 4 dries the photographic paper 8 after completion of developing processing.

Figure 3:
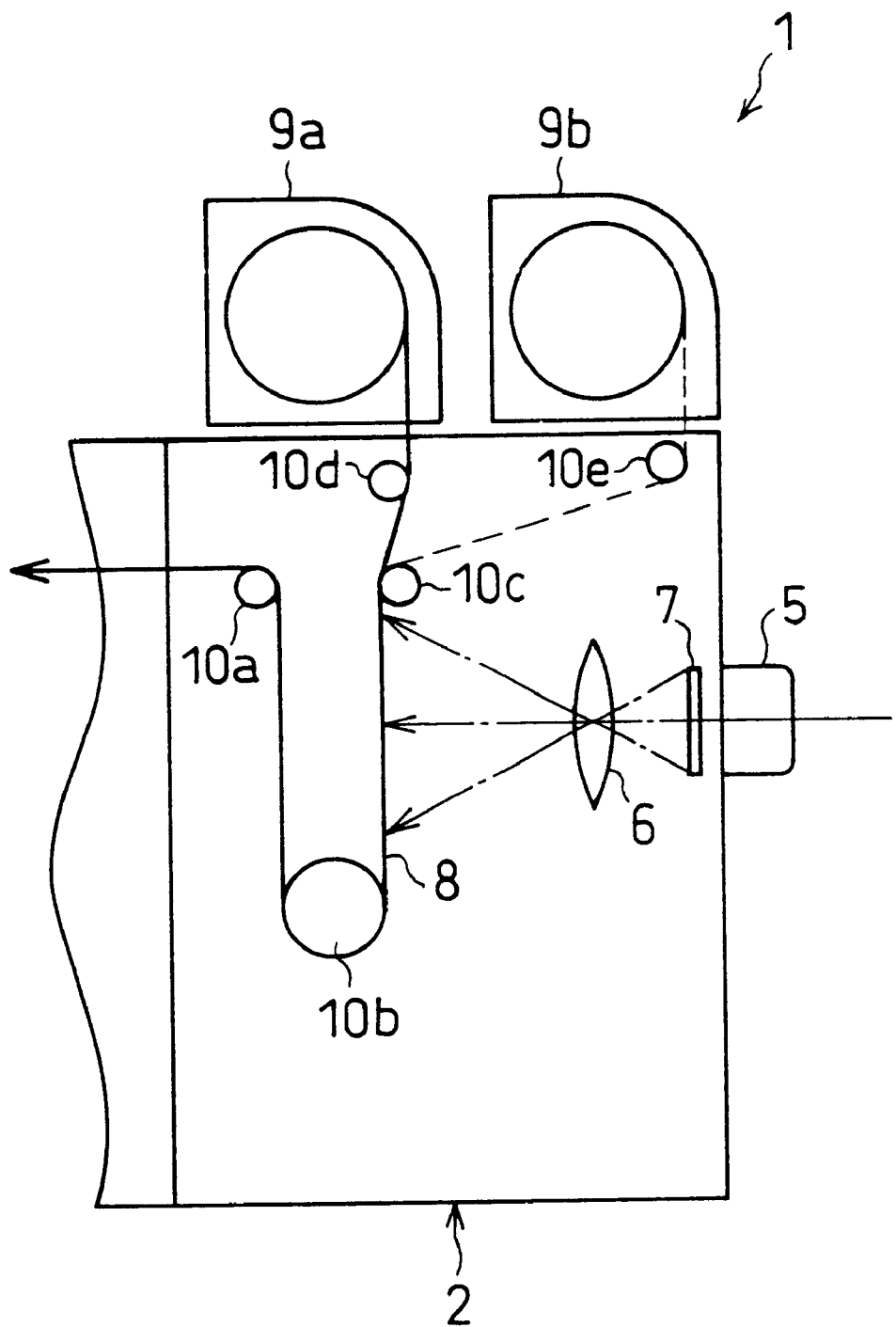
FIG. 3 is a cross-sectional drawing schematically showing the structure of the printing section shown in FIG. 1.

The printing section 2, as shown in FIG. 3, includes a light source section 5 and a printing lens 6. The light source section 5 projects light onto a film negative 7 on which is recorded an original image. Here, the film negative 7 functions as the information holding medium which holds the original image information. The structural details of the light source section 5 will be discussed later.

The printing lens 6 focuses an optical image, incident thereon, onto the photographic paper 8. In the present embodiment, a plurality of printing lenses 6, corresponding to the sizes of the photographic paper 8, are provided, and are, as needed, interposed into and withdrawn from the light path between the light source section 5 and the photographic paper 8, in a position at a predetermined distance from the photographic paper 8. Alternatively, it is also possible to use a structure in which a single printing lens 6 is moved in the direction of the light axis in accordance with the size of the photographic paper 8. Further, the printing lens 6 is provided with a diaphragm 6a (see FIG. 14(b)), which adjusts the light quantity of light passing through the printing lens 6 as needed.

Further, at the top of the printing section 2 are provided paper magazines 9a and 9b containing photographic paper 8 of different respective sizes. Photographic paper 8 contained in the paper magazine 9a is transported to an exposure position by rotation of transport rollers 10a, 10b, 10c, and 10d, and photographic paper 8 contained in the paper magazine 9b is transported to the exposure position by rotation of transport rollers 10a, 10b, 10c, and 10e. The size of photographic paper 8 on which printing is to be performed is selected as needed by the operator.

The photograph printer 1 having the foregoing structure is connected, as shown in FIG. 2(a), to an unevenness correction device 21. The unevenness correction device 21, as shown in FIG. 2(b), is internally provided with a plurality of density meters 22, and detects density distribution of yellow (Y), magenta (M), and cyan (C) in each quadrant (to be discussed below) of a test print 23 of, for example, a gray color, obtained in the photograph printer 1. As shown in FIG. 4, a detection signal from each density meter 22 is sent to a control section 24 provided in either the photograph printer 1 or the unevenness correction device 21. Based on these detection signals, the control section 24 controls the emitted light quantity of the light source section 5 so as to correct density unevenness and color unevenness.

Correction of density unevenness and color unevenness is performed when the device is set up, and/or at regular intervals (once a week, for instance).

Photographs taken at, for example, a ski area, have sharp black/white contrast, and normal printing processing causes people's faces, for example, to appear darker than normal. In this case, so-called overprinting is performed, in which the film negative 7 is interposed in the light path, and density is corrected for only a specific portion(in this example, people's faces) of the image corresponding to the original image recorded in the film negative 7.

Figure 5:
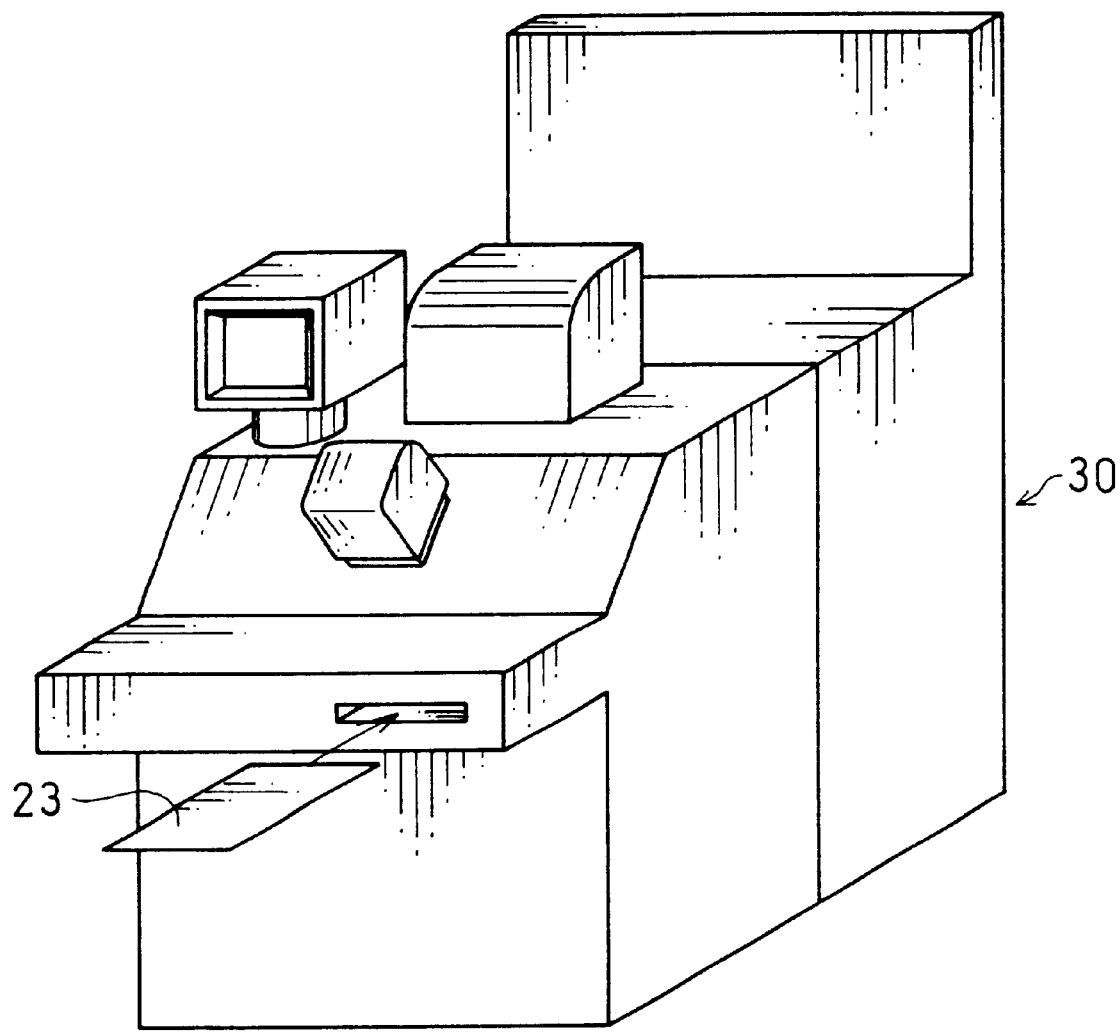
FIG. 5 is a perspective view showing a device incorporating both the photograph printer and the unevenness correction device shown in FIG. 2(a).

Incidentally, in the present embodiment, the photograph printer 1 and the unevenness correction device 21 are provided separately, but it is also possible to combine the photograph printer 1 and the unevenness correction device 21 into a combined unevenness correction device 30, as shown in FIG. 5.

Figure 6:
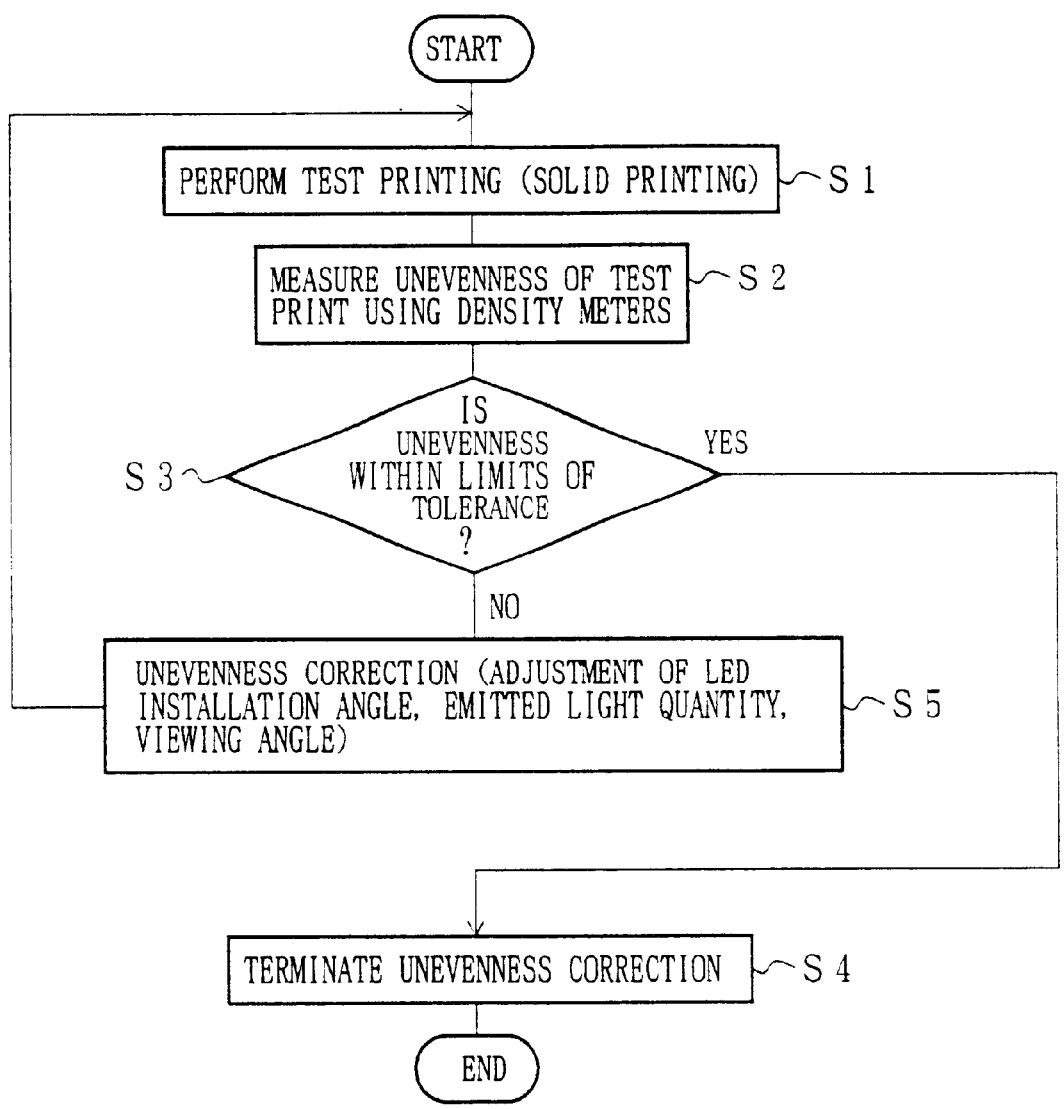
FIG. 6 is a flow-chart showing the flow of unevenness correction operations.

The following will explain the operations of the photograph printer 1 with reference to FIG. 6.

First, prior to performing printing and developing in the photograph printer 1, test printing(solid printing) is performed (Step 1; hereinafter, "Step" will be abbreviated as "S"). Test printing, performed, for example, when the photograph printer 1 is set up, is processing in which a gray color is printed over the entire surface of the photographic paper 8 by the light from the light source section 5, with no film negative 7 in the light path, or with a solid gray film negative 7 for test printing use interposed in the light path.

Next, a test print 23, obtained by developing the photographic paper 8 printed in S1, is inserted in the unevenness correction device 21, and the density meters 22 provided therein detect the density distribution in each quadrant (S2). Then detection signals from each density meter 22 are sent to the control section 24, which registers the density distribution in the test print 23, and judges whether density unevenness and color unevenness are within the limits of tolerance (S3). If, in S3, both types of unevenness are within the limits of tolerance, unevenness correction processing is terminated without performing unevenness correction (S4).

If, on the other hand, unevenness exceeds the limits of tolerance in S3, density unevenness and color unevenness are corrected (S5) by, for example, control of the emitted light quantity of the light source section 5 by the control section 24. An alternative method of correcting unevenness is for the operator to adjust the inclination (installation angle) and/or viewing angle of LEDs 11R, 11G, and 11B(to be discussed below; see FIG. 7) of the light source section 5. This method will be discussed later.

In order to perform overprinting, the desired film negative 7 is placed in the light path, and density is corrected only in a specific portion of the film negative 7 by, for example, control of the emitted light quantity of the light source section 5 by the control section 24.

In this way, when performing unevenness correction in 5, the processing in S1 through S3 and S5 is repeated until unevenness is within the limits of tolerance, and then unevenness correction is terminated (S4).

Thereafter, the film negative 7 is interposed in(or left in) the light path, and photographic paper 8 is transported to the exposure position from, for example, the paper magazine 9a, and ordinary printing processing is performed. In other words, the light source section 5 is lit in accordance with the control of the control section 24, and light is projected from the light source section 5 onto the film negative 7. Light passing through the film negative 7 reaches the photographic paper 8 through the printing lens 6. In this way, an image corresponding to the original image recorded on the film negative 7 is printed onto the photographic paper 8. Photographic paper 8 which has undergone printing processing is then transported to the developing section 3, where the printed image is developed. After developing, the photographic paper 8 is dried in the drying section 4.

Next, the structure of the light source section 5 will be explained.

Figure 7:
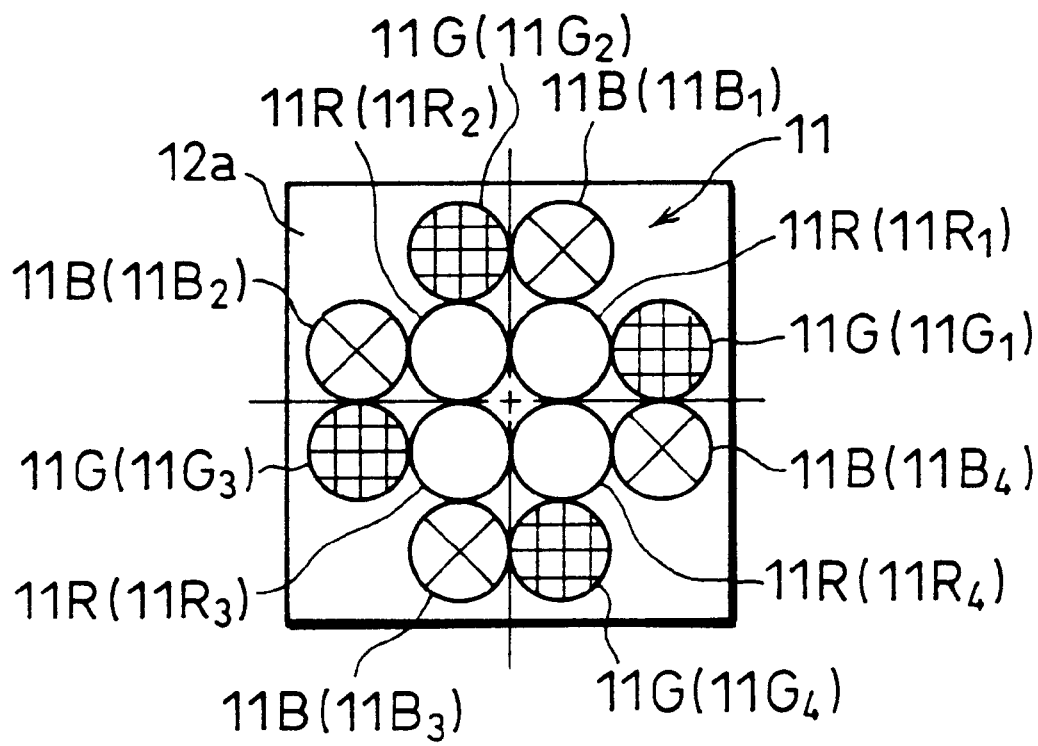
FIG. 7 is a plan view showing an arrangement of LEDs in the light source section of the printing section shown in FIGS. 1 and 3.
Figure 9:
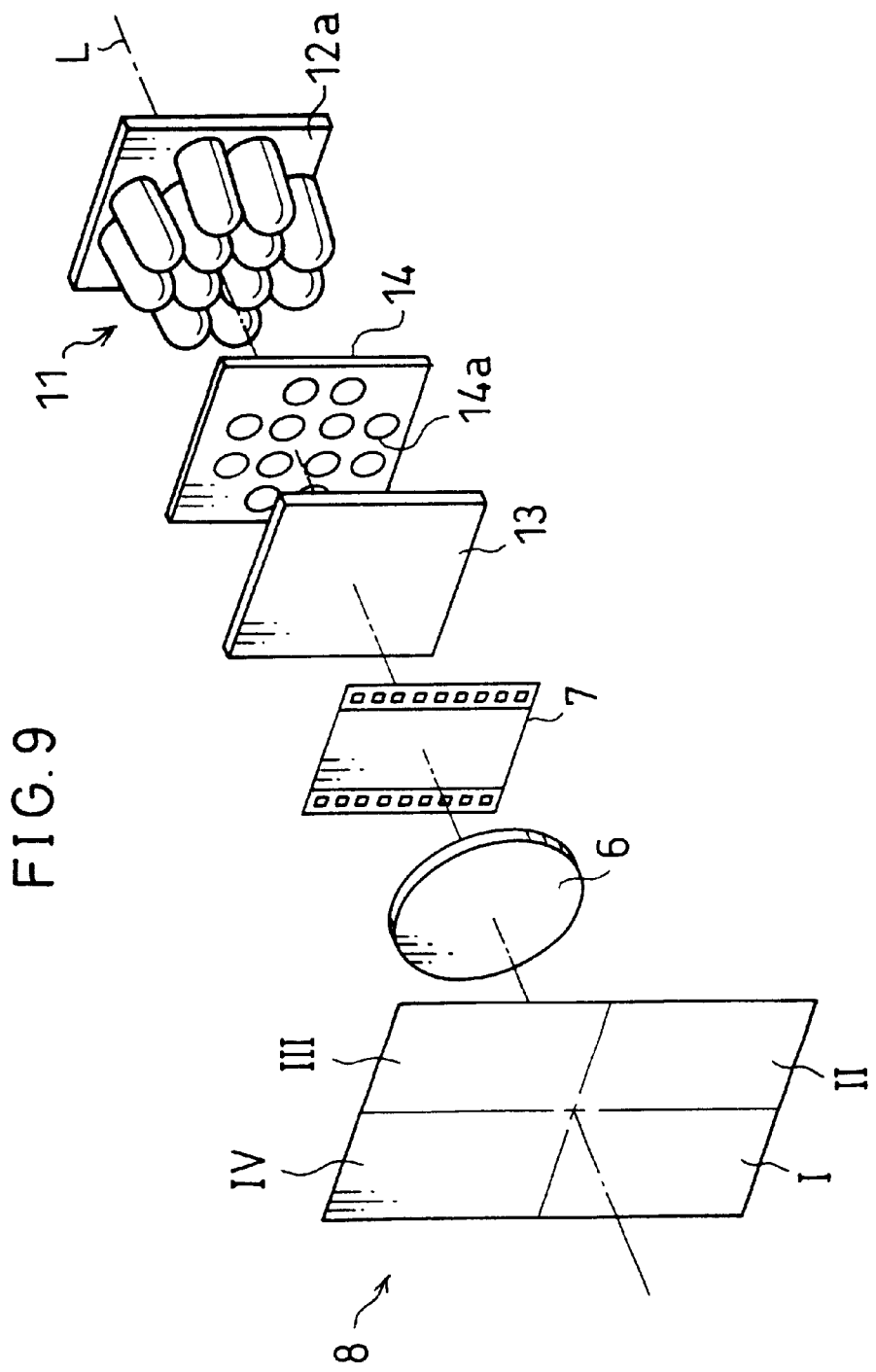
FIG. 9 is an exploded perspective view of the printing section shown in FIGS. 1 and 3.
Figure 10:
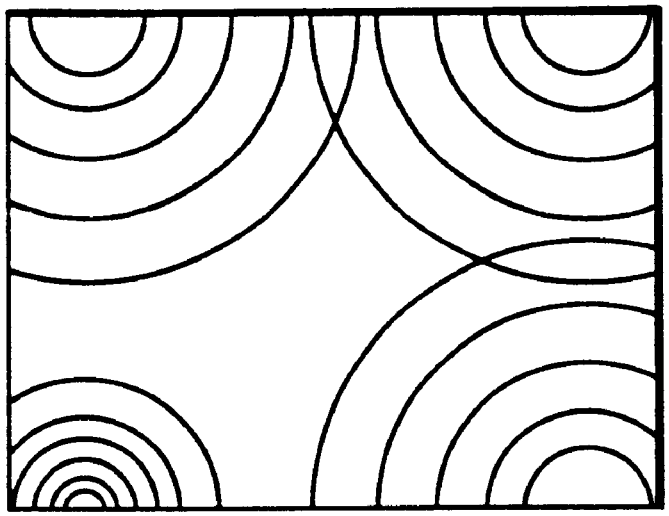
FIG. 10(a) is an explanatory drawing showing density distribution of light on photographic paper when the emitted light quantity of LEDs belonging to a predetermined region is greater than the emitted light quantities of LEDs belonging to other regions.
FIG. 10(b) is an explanatory drawing showing density distribution of light on photographic paper when the viewing angle of LEDs belonging to a predetermined region is smaller than the viewing angles of LEDs belonging to other regions.
Figure 10:
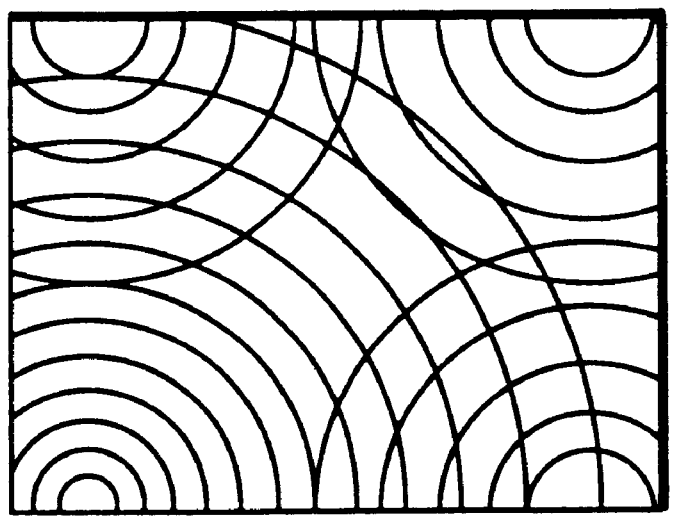

As shown in FIG. 1, the light source section 5 includes an LED group 11 made up of a plurality of LEDs (light emitting means), a support section 12 which supports the LED group 11, a scattering plate 13, and a diaphragm 14 (see FIG. 9). FIG. 7 shows a plan view of the LED group 11 shown in FIG. 1, viewed from the scattering plate 13 side. As shown in FIG. 7, the LED group 11 is made up of a plurality of LEDs 11R, 11G, and 11B, which emit red, green, and blue light, respectively. In other words, the LEDs 11R, 11G, and 11B have different respective spectral characteristics. The LEDs 11R, 11G, and 11B are controlled by the control section 24 (see FIG. 4) so as to be turned on during printing, and off when not printing. The details of the LED group 11 will be discussed later.

The support body 12 includes an LED substrate 12a, to which the bases of the LEDs 11R, 11G, and 11B are fixed. Around the perimeter of the LED substrate 12a is provided a wall section 12b which protects the LED group 11.

A reflective film is provided on the surface of the LED substrate 12a to which the respective LEDs are attached, so as to reduce loss of light quantity of the light projected by the LED group 11.

In other words, most of the projected light from the LED group 11 is projected from the heads of the respective LEDs, and most of it is projected toward the photographic paper 8. However, there is also a small quantity of light which is projected from the heads of the LEDs 11R, 11G, and 11B toward the LED substrate 12a. However, by providing the reflective film on the surface of the LED substrate 12a, light projected toward the LED substrate 12a is reflected toward the photographic paper 8, thus increasing the quantity of light projected toward the photographic paper 8. Accordingly, projected light from the LED group 11 can be used effectively, thus reducing loss of light quantity of the projected light.

The scattering plate 13 is frosted glass of a coarseness which can be seen through without appreciable difficulty by the naked eye, and the periphery thereof is fixed to the wall section 12b so that the scattering plate 13 is in close proximity with the heads of the LED group 11. The LEDs 11R, 11G, and 11B used in the present embodiment have viewing angles of 45° or less, and the light from the LEDs 11R, 11G, and 11B is suitably scattered by the scattering plate 13. Incidentally, if LEDs 11R, 11G, and 11B with a suitable viewing angle (around 180°, for example) are used, the scattering plate 13 may be omitted.

As shown in FIG. 9, the diaphragm 14 is provided with holes 14a corresponding to the respective LEDs 11R, 11G, and 11B. The respective internal diameters of the holes 14a differ for different diaphragms 14. Accordingly, by selectively placing in the light path between the LEDs 11R, 11G, and 11B and the scattering plate 13 a diaphragm 14 having holes 14a of a predetermined internal diameter, the viewing angle of the LEDs 11R, 11G, and 11B can be adjusted as needed.

Alternatively, instead of selectively interposing a predetermined diaphragm 14 in the foregoing light path, each LED 11R, 11G, and 11B may be provided with a diaphragm with a hole of variable internal diameter, and the diameter of the hole adjusted to adjust the viewing angle of each LED 11R, 11G, and 11B.

In the present embodiment, use of the LEDs 11R, 11G, and 11B as the light emitting means yields the following effects.

(1) There is no need for the cooling fan, heat-absorbing filter, light-adjusting filter, cutoff filter, etc. which are necessary when using a halogen lamp as the light emitting means. Accordingly, the structure of the light source section 5 can be simplified. Further, since a cooling fan is not used, surrounding dust is not sucked into the optical system, and thus good printing can be performed.

(2) Since spectral characteristics are stable, the direct-current power source used can be a simple one which applies a voltage to an IC (integrated circuit) control substrate. Accordingly, since a special direct-current power source is not necessary, increase of the size of the device can be avoided. Further, since spectral characteristics are stable, light adjustment can be easily managed by ON/OFF control of the LEDs 11R, 11G, and 11B.

(3) Since the LEDs 11R, 11G, and 11B are ON/OFF controlled, the LEDs 11R, 11G, and 11B need not be lit except when necessary. Accordingly, power consumption can be greatly reduced in comparison with the case of use of a halogen lamp. Further, since the LEDs 11R, 11G, and 11B are turned off when not performing printing, there is no need for a shutter mechanism between the photographic paper 8 and the LEDs 11R, 11G, and 11B. As a result, the number of structural parts can be reduced, and the structure of the photograph printer 1 can be simplified.

(4) The difference in light quantity between the light axis and surrounding areas is not as great as with a halogen lamp. Accordingly, loss of light quantity can be reduced in comparison with the case of use of a halogen lamp as the light source.

(5) Since the LEDs 11R, 11G, and 11B are ON/OFF controlled, they are not left on more than necessary. For this reason, even when printing a large number of photographs, damage to the film negative 7 due to heat from the LEDs 11R, 11G, and 11B can be avoided.

The following will explain the details of the LED group 11.

Here, as shown in FIG. 7, the LED substrate 12a will be divided into first through fourth quadrants, and the LEDs belonging to the first quadrant referred to as LEDs $11R_1$, $11G_1$, and $11B_1$; those belonging to the second quadrant as LEDs $11R_2$, $11G_2$, and $11B_2$; those belonging to the third quadrant as LEDs $11R_3$, $11G_3$, and $11B_3$; and those belonging to the fourth quadrant as LEDs $11R_4$, $11G_4$, and $11B_4$.

As shown in FIG. 7, an equal number of LEDs of each color(a total of 12 LEDs) are densely packed around the center of the LED group 11. More specifically, of the LED group 11, four LEDs $11R_1$ through $11R_4$ are provided mutually touching near the center of the LED substrate 12a, and, touching the four LEDs $11R_1$ through $11R_4$ are four LEDs $11G_1$ through $11G_4$ in point symmetry with each other (in other words, having symmetry with respect to a light axis L of the printing lens 6) and four LEDs $11B_1$ through $11B_4$ in point symmetry with each other. By this arrangement, the three LEDs $11R_1$, $11G_1$, and $11B_1$ form a cluster, and three more clusters are formed by three different-colored LEDs each. Accordingly, the LED group 11 is made up of four clusters. The light axis L passes through the center of the LED substrate 12a.

By providing the LEDs $11R_1$ through $11R_4$ which emit red light closest to the light axis L, red light, which is most prone to insufficient light quantity, can be used effectively.

When lit with a constant brightness, a ratio among the illumination times of the LEDs 11R, 11G, and 11B is set, in consideration of the photosensitivity of the photographic paper 8 to each color, to, for example, LED 11B:LED 11G:LED 11R=1:2:X, where X is in a range including 5 and 6. By illuminating the LEDs 11R, 11G, and 11B at such a ratio, red light, which is most prone to insufficient light quantity, can be supplemented, and good printing processing can be performed.

Incidentally, when illumination time is constant, the foregoing ratio may be a ratio of brightness of the respective LEDs. Accordingly, the number of LEDs is not limited to the 12 used in the present embodiment, and may be determined, within the limits of the space for installation, such that the product of LED brightness and illumination time for blue, green, and red fulfills the ratio 1:2:X, where X is in a range including 5 and 6.

Each of the LEDs 11R, 11G, and 11B is provided so as to incline at an angle of $\theta$ with respect to a light axis L, so that light projected thereby has directivity toward the light axis L. This will be explained below with reference to FIG. 8.

Figure 8:
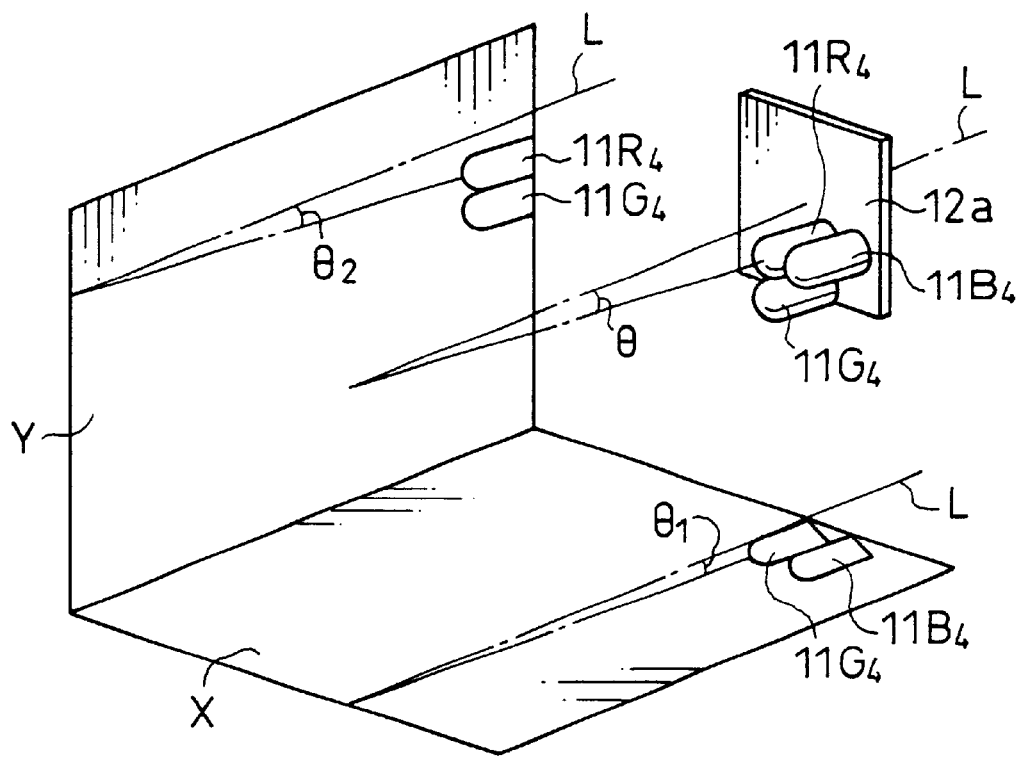
FIG. 8 is a perspective view explaining, in the light source section of the printing section shown in FIGS. 1 and 3, inclination, with respect to a light axis, of LEDs belonging to a fourth quadrant.

FIG. 8 is a perspective view showing only three LEDs, here, the LEDs $11R_4$, $11G_4$, and $11B_4$ of the fourth quadrant. As shown on a horizontal projection plane X in the Figure, each of the LEDs $11G_4$ and $11B_4$ inclines horizontally at an angle of $\theta_1$ with respect to the light axis L. In the same way, as shown on a vertical projection plane Y, each of the LEDs $11R_4$ and $11G_4$ inclines vertically at an angle of $\theta_2$ with respect to the light axis L. Here, the angles $\theta_1$ and $\theta_2$ may be equal.

Further, although not shown in the Figure, the LEDs 11R, 11G, and 11B of the other three quadrants are arranged in a similar manner. In consideration of various conditions such as the type of lens used in the optical system (focusing distance, aperture, etc.), print size, printing scaling ratio, etc., the foregoing angles $\theta$, $\theta_1$, and $\theta_2$, are set within a range of approximately 0° to 30°.

By providing the LEDs 11R, 11G, and 11B so as to incline at a predetermined angle $\theta$ with respect to the light axis L, even if aberration, etc. occurs in the optical system, projected light from the light source section 5 can be projected with certainty onto the peripheral areas of the photographic paper 8, as shown in FIG. 1.

By this means, the light from the LEDs 11R, 11G, and 11B need not be scattered more than necessary, as it was conventionally. Accordingly, there is no need for control which attempts to compensate for the loss of light quantity due to light scattering by increasing the exposure time or the brightness of emitted light.

In addition, since the LEDs 11R, 11G, and 11B are provided so as to incline at an angle of $\theta$ with respect to the light axis L, light spots with a one-to-one relationship to the LEDs 11R, 11G, and 11B do not appear on the photographic paper 8, as they did conventionally. As a result, color unevenness can be suppressed to some extent, and thus, as above, there is no need to scatter the light from the LEDs 11R, 11G, and 11B more than necessary. Accordingly, providing the LEDs 11R, 11G, and 11B so as to incline at an angle of $\theta$ with respect to the light axis L facilitates adjustment of unevenness in density and color.

The angle of inclination of each LED 11R, 11G, and 11B may be adjusted as needed during manufacturing, for example, at the time of fixing of the LEDs 11R, 11G, and 11B on the LED substrate 12a. Alternatively, adjustment may be performed after the legs of the LEDs 11R, 11G, and 11B, which are made of wire, for example, are fixed on the LED substrate 12a, by bending the legs of each LED a predetermined amount.

The following will explain the fact that each cluster of three LEDs 11R, 11G, and 11B projects light onto a specific area of the photographic paper 8.

The light source section 5 is made up of a plurality of LEDs 11R, 11G, and 11B, which are divided into four clusters in first through fourth quadrants. Further, each cluster has a specific light projection area on the photographic paper 8. In the present embodiment, the LEDs 11R, 11G, and 11B of the first through fourth quadrants are positioned symmetrically, with respect to the center of the printing lens 6, in relation to first through fourth light projection areas of the photographic paper 8.

In other words, light from the LEDs $11R_1$, $11G_1$, and $11B_1$ of the first quadrant (shown in FIG. 7) travels through, as shown in FIG. 9, the diaphragm 14, the scattering plate 13, the film negative 7, and the printing lens 6, and is projected onto an area I of the photographic paper 8. In FIG. 9, area I is the area at the lower left when looking from the photographic paper 8 toward the printing lens 6. In the same way, light from the LEDs $11R_2$, $11G_2$, and $11B_2$ of the second quadrant is projected onto an area II of the photographic paper 8; light from the LEDs $11R_3$, $11G_3$, and $11B_3$ of the third quadrant is projected onto an area III of the photographic paper 8; and light from the LEDs $11R_4$, $11G_4$, and $11B_4$ of the fourth quadrant is projected onto an area IV of the photographic paper 8. Here, areas II, III, and IV are located moving counter-clockwise from area I when looking from the photographic paper 8 toward the printing lens 6.

Next, FIG. 10(a) shows density distribution on the photographic paper 8 when test printing is performed when the emitted light quantity of the LEDs $11R_3$, $11G_3$, and $11B_3$ of the third quadrant is greater than the emitted light quantity of the LEDs 11R, 11G, and 11B of each of the other quadrants. FIG. 10(b), on the other hand, shows density distribution on the photographic paper 8 when test printing is performed when the viewing angle of the LEDs $11R_3$, $11G_3$, and $11B_3$ of the third quadrant is smaller than the emitted light quantity of the LEDs 11R, 11G, and 11B of each of the other quadrants. In the Figures, concentric circles indicate that density is higher in areas toward the center of the circles, and decreases with distance from the respective centers. The overall density distribution on the photographic paper 8 is a composite of the respective density distributions in each of the areas I through IV.

The emitted light quantity of each LED can be adjusted based on the LED's brightness and/or duration of illumination. In addition, the emitted light quantity of each LED can also be adjusted based on the wavelength of the light projected thereby. In this case, each LED used is capable of emitting light at a plurality of peak wavelengths(for example, the VLA101RGB, a multi-colored LED manufactured by Optrans Co.), and emitted light quantity is adjusted by individual ON/OFF control of each peak wavelength. In this way, the quantity of exposure light on the photographic paper 8 is controlled.

In other words, adjustment of the emitted light quantity of each LED is performed by changing at least one of the LED's brightness, duration of illumination, and wavelength of emitted light. When changing two or more of these physical quantities, it is sufficient to optimize change of each physical quantity so that density unevenness and color unevenness do not occur.

If, as above, the LEDs 11R, 11G, and 11B of each of the first through fourth quadrants have a specific light projection area on the photographic paper 8, adjustment of density unevenness and color unevenness over the entirety of the photographic paper 8 can be performed independently in each of the areas I through IV. In other words, in the present embodiment, unevenness correction of the entire photographic paper 8 can be performed with certainty, by merely adjusting the emitted light quantity, viewing angle, etc. of one cluster of three LEDs corresponding to a predetermined area of the photographic paper 8. Accordingly, adjustment of density unevenness and color unevenness of the entire photographic paper 8 is facilitated.

Figure 11A:
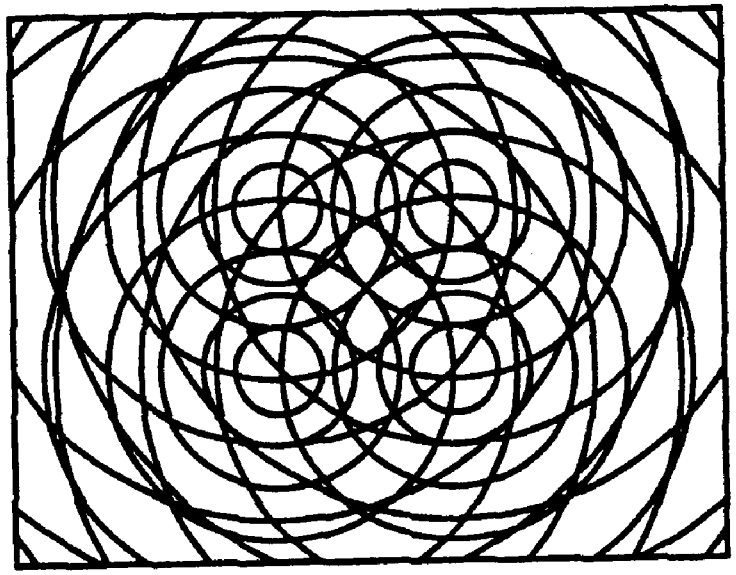
FIG. 11(a) is an explanatory drawing showing density distribution of light on photographic paper when LEDs have a small inclination with respect to a light axis.
Figure 11B:
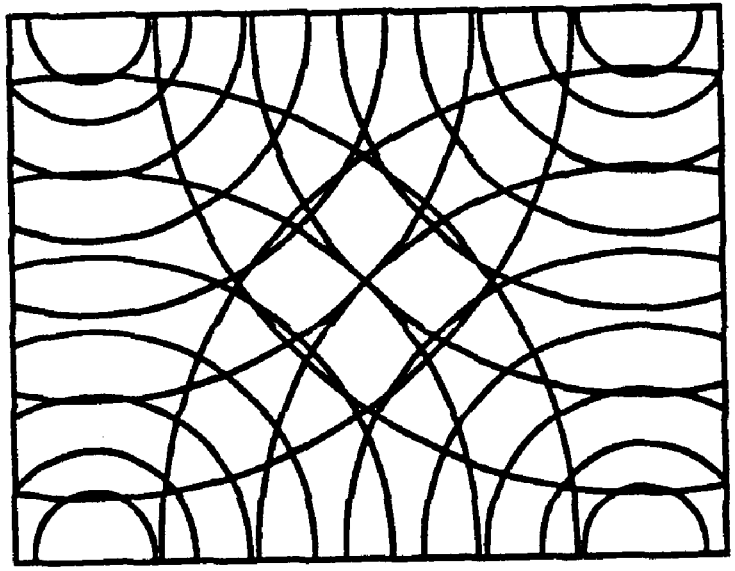
FIG. 11(b) is an explanatory drawing showing density distribution of light on photographic paper when LEDs have a large inclination with respect to a light axis.

Next, FIG. 11(a) shows density distribution on the photographic paper 8 when test printing is performed with a small angle of inclination of each of the LEDs 11R, 11G, and 11B. FIG. 11(b), on the other hand, shows density distribution on the photographic paper 8 when test printing is performed with a large angle of inclination of the LEDs 11R, 11G, and 11B.

In FIG. 11(a), the light spots of projected light from each quadrant are concentrated in the center of the photographic paper 8, and it can be seen that density distribution in the central portion thereof is substantially uniform. In FIG. 11(b), on the other hand, the light spots of projected light from each quadrant are located in the four corners of the photographic paper 8, but, here again, density distribution in the central portion thereof is substantially uniform.

A portion with uniform density distribution can be obtained in this way because the area onto which each cluster of three red, green, and blue LEDs projects light is comparatively limited to one of the areas I through IV, as is evident from FIGS. 11(a) and 11(b). This is of course due to the fact that each LED of each cluster of three red, green, and blue LEDs corresponding to one of the areas I through IV inclines so that light emitted thereby has directivity which intersects with the light axis L.

Incidentally, uniform density distribution in the central portion of the photographic paper 8, like that shown in FIGS. 11(a) and 11(b), can also be obtained by adjusting emitted light quantity or viewing angle of the LEDs 11R, 11G, and 11B corresponding to each area I through IV.

Accordingly, a portion of the photographic paper 8 having uniform density distribution can be obtained across a large extent by adjusting at least one of emitted light quantity, viewing angle, inclination, and wavelength of the LEDs 11R, 11G, and 11B corresponding to the areas I through IV. As a result, color unevenness can be more easily distinguished, thus simplifying adjustment of color unevenness.

Incidentally, when the foregoing angle of inclination is small, light spots are slightly visible, although not noticeably so. Accordingly, a large angle of inclination is preferable.

In the photograph printer 1 according to the present embodiment, it is possible to obtain uniform density distribution in the printing area of the photographic paper 8, like that shown in FIGS. 11(a) and 11(b), even when the LED group 11 is made up of only 12 LEDs. As a result, since the number of LEDs to be controlled is small, density unevenness and color unevenness can be easily corrected by controlling each LED's brightness, duration of illumination, etc.

Moreover, even though the present embodiment uses LEDs with narrower directivity(viewing angle of 45° or less, for example) than the LEDs used in conventional light sources, it is still possible to adequately realize the effect of the present invention, i.e., to obtain a portion with uniform density distribution, because the area onto which each cluster of three red, green, and blue LEDs projects light is comparatively limited to one of the areas I through IV. As a result, the scattering ratio of the scattering plate 13 can also be reduced, making it possible to hold to a minimum loss of light quantity of the LED group 11. For this reason, even when the number of LEDs making up the LED group 11 is small, there is no need to lengthen exposure time.

Incidentally, in the present embodiment, LEDs were used as the light emitting means, but it is also possible to use a semiconductor laser, etc.

Second Embodiment

The following will explain another embodiment of the present invention with reference to FIGS. 12(a) through 16(b). Members having the same functions as those used in the first embodiment above will be given the same reference symbols, and explanation thereof will be omitted here.

Figure 12A:
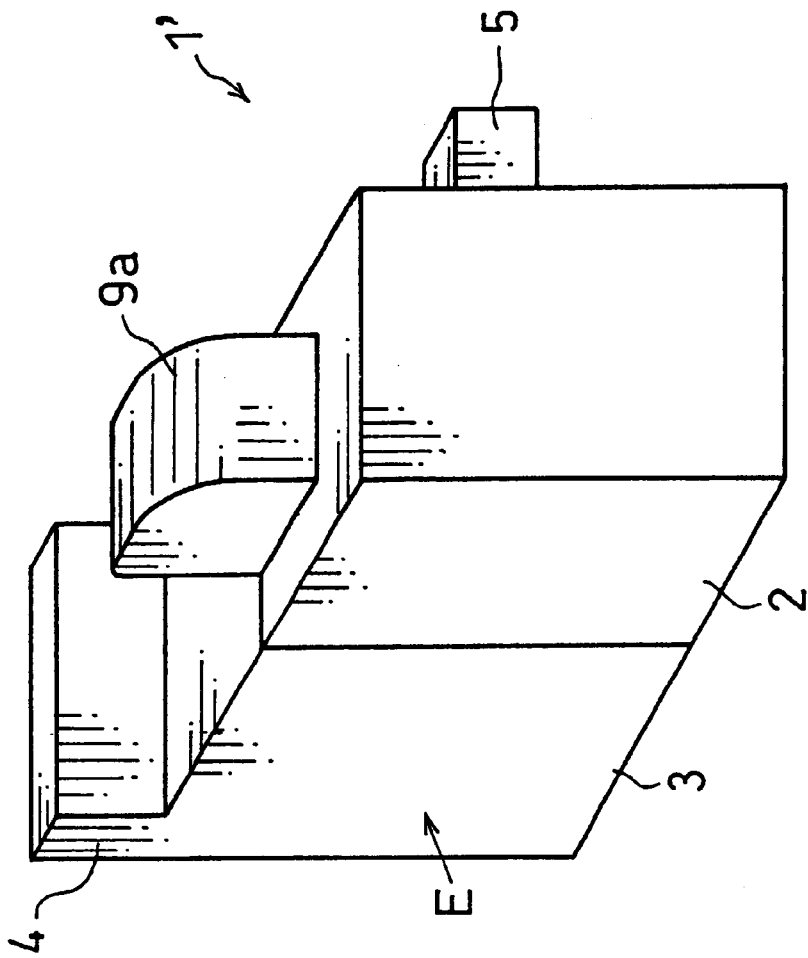
FIG. 12(a) is an explanatory drawing showing a photographic paper transport path in the photograph printer shown in FIG. 12(b).
Figure 12B:
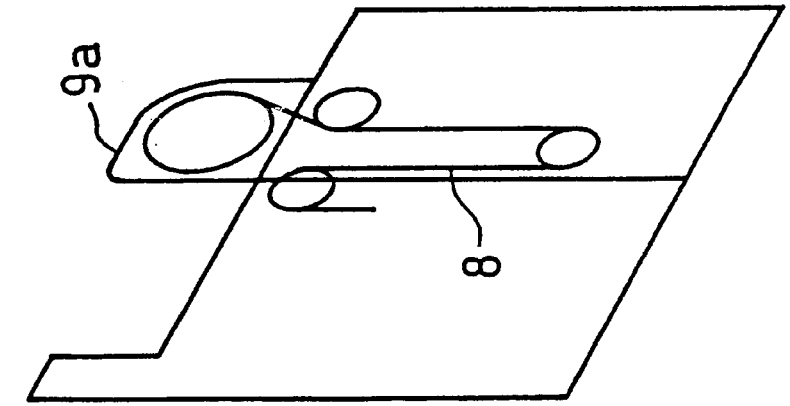
FIG. 12(b) is a perspective view showing the exterior of a photograph printer according to another embodiment of the present invention.

As shown in FIG. 12(b), a photograph printer 1' according to the present embodiment includes a printing section 2, a developing section 3, and a drying section 4, and is connected to the unevenness correction device 21 shown in FIG. 2(a). Except for the structure of the printing section 2, the photograph printer 1' is structured as the photograph printer 1 discussed in the first embodiment above, and accordingly the present embodiment will chiefly explain the structure of the printing section 2, and the operations of the whole.

Incidentally, as shown in FIG. 12(b), the photograph printer 1' is provided with only one paper magazine 9a, but it may also be provided with a paper magazine 9b, as in the first embodiment above (see FIG. 3), with the paper magazines 9a and 9b containing photographic paper 8 of different respective sizes. Further, FIG. 12(a) shows a transport path of the photographic paper 8 when the photograph printer 1' shown in FIG. 12(b) is viewed from the side(from the direction indicated by E).

Figure 13:
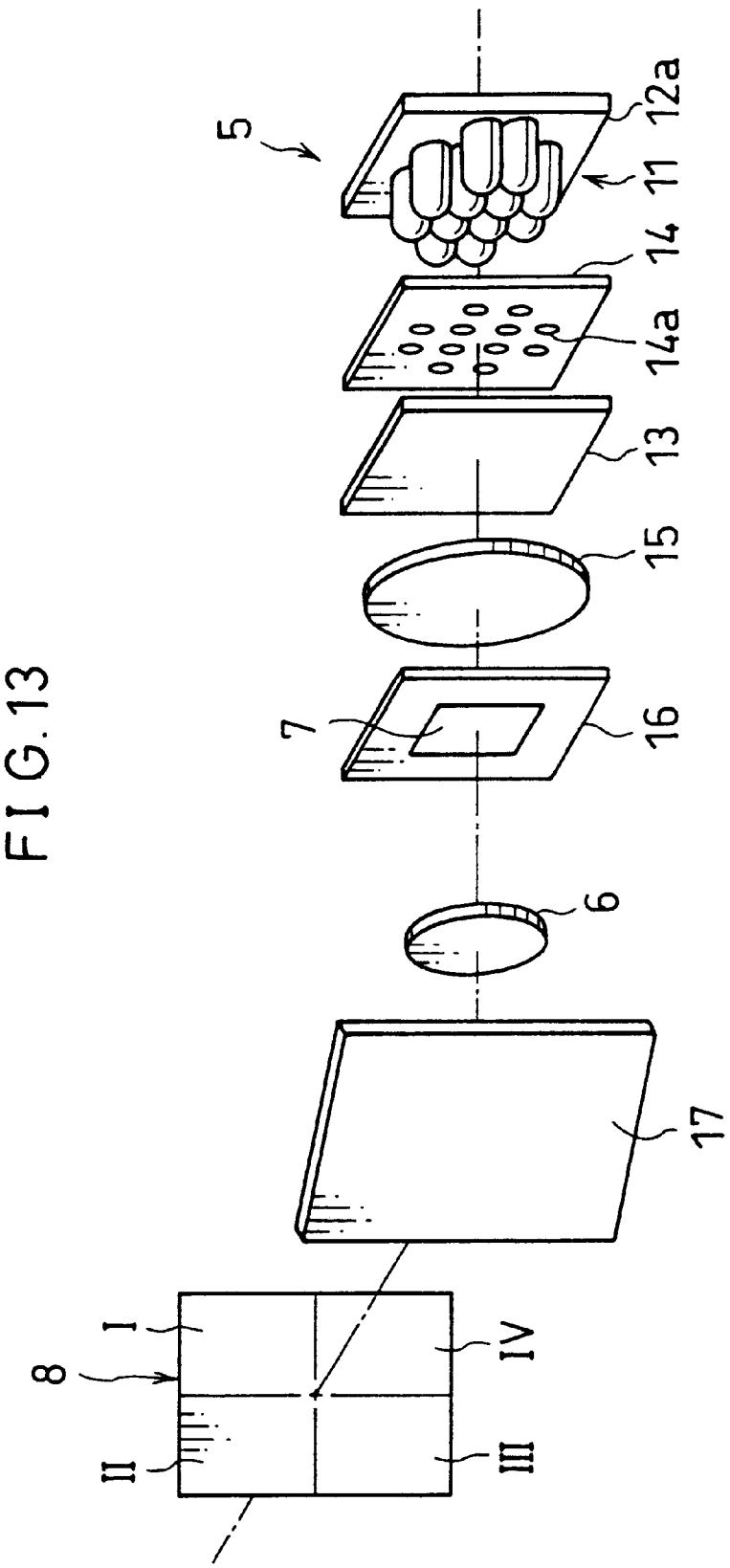
FIG. 13 is an exploded perspective view of a printing section of the photograph printer shown in FIG. 12(b).

In the present embodiment, the printing section 2, as shown in FIG. 13, is made up of a condensing lens 15 (light condensing means), an ANM (automatic negative mask) 16, a printing lens 6, and a reflection mirror 17, provided in that order in the light projection direction, between the light source section 5 and the photographic paper 8. The light source section 5 has the same structure as that of the first embodiment above, and is provided on the side of the photograph printer 1' (see FIG. 12(b)).

The condensing lens 15 condenses light from the light source section 5. By this means, the efficiency of light use is increased, and light quantity loss is greatly reduced. When the condensing lens 15 is provided, the position of the light source section 5 is determined on the basis of condensing-method light source design, taking into consideration the positional relationship between the printing lens 6 and the condensing lens 15, and the focusing distance.

Incidentally, instead of using the condensing lens 15, light from the light source section 5 may be condensed using, for example, a concave mirror. However, in this case, positioning of the concave mirror greatly complicates layout of the optical system. Accordingly, by using the condensing lens 15 as the light condensing means, it is easy to design the optical system, and since the structure of the optical system can be simplified, the size of the device can be reduced.

The ANM 16 automatically transports the film negative 7 to a predetermined position in the light path. The reflection mirror 17 reflects projected light from the light source section 5 toward the photographic paper 8.

With the foregoing structure, after completing correction of density unevenness and color unevenness using a test print as in the first embodiment above, the film negative 7, transported by the ANM 16, is interposed in the light path. Then the photographic paper 8 is transported from the paper magazine 9a to the exposure position, and ordinary printing processing is performed. In other words, the light source section 5 is lit in accordance with the control of the control section 24, and the light of the light source section 5 is condensed by the condensing lens 15 and projected onto the film negative 7 transported by the ANM 16. Light passing through the film negative 7 passes through the printing lens 6, is reflected by the reflection mirror 17, and reaches the photographic paper 8. In this way, an image corresponding to the original image recorded on the film negative 7 is printed onto the photographic paper 8. Thereafter, processing equivalent to that in the first embodiment above is performed.

As discussed above, although the structure of the printing section 2 of the printer 1' differs from that of the printer 1 discussed in the first embodiment above, the light source section 5 used is equivalent to that of the first embodiment, and thus effects equivalent to those of the first embodiment can be realized.

In the present embodiment, since the condensing lens 15 is used, light projected by the LEDs 11R, 11G, and 11B of the first quadrant is projected, via the reflection mirror 17, onto area I of the photographic paper 8 corresponding to the first quadrant. Here, area I is the area at the upper right when looking from the reflection mirror 17. In the same way, light projected by the LEDs 11R, 11G, and 11B of the second, third, and fourth quadrants is projected, via the reflection mirror 17, onto areas II, III, and IV of the photographic paper 8 corresponding to the second, third, and fourth quadrants, respectively. Here, areas II, III, and IV are located moving counter-clockwise from area I when looking from the reflection mirror 17.

Figures 14A, 14B:
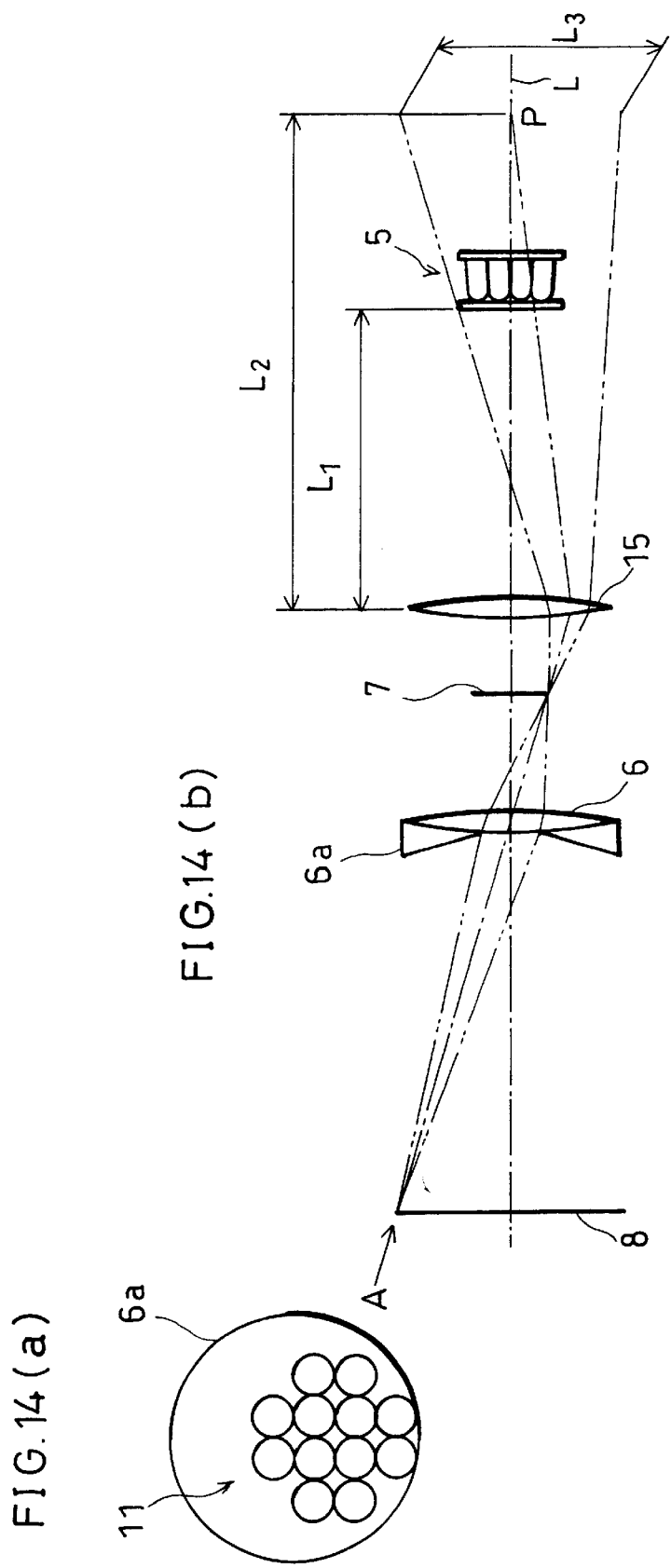
FIG. 14(a) is a plan view showing a light source section when viewed from a point corresponding to an upper portion of the photographic paper shown in FIG. 14(b).
FIG. 14(b) is an explanatory drawing showing, in the printing section shown in FIG. 13, the light path of light reaching a certain point on photographic paper.

FIGS. 14(b), 15(b), and 16(b) show domains of light reaching an upper portion, a central portion, and a lower portion, respectively, of the photographic paper 8. In each of the Figures, the domain bounded by a pair of two-dot-and-dash lines indicates light which reaches a given single point on the photographic paper 8. Incidentally, the reflection mirror 17 is not shown in these Figures.

When P is a point where the central axis of light reaching a given point on the photographic paper 8 intersects with the light axis L(point P being at a distance $L_2$ from the condensing lens 15), if the light source section 5 is provided at point P, a maximum of LEDs will fall within a width $L_3$ of the foregoing domain. However, in the present embodiment, the light source 5 is not provided at point P, but at a distance $L_1$ from the condensing lens 15. The distance $L_1$ is the position closest to the condensing lens 15 within a range, on the opposite side of the condensing lens 15 from the photographic paper 8, within which the light from the light source section 5 is projected onto a single point on the photographic paper 8. In this way, the length of the light source unit, i.e., the dimensions of the light source section 5, can be reduced, thus making it possible to reduce the size of the photograph printer 1'.

If the light source section 5 is viewed from a position A in the upper portion of the photographic paper 8, the LED group 11 can be seen(although through the scattering plate 13), as shown in FIG. 14(a). In this case, the LED group 11 appears in the lower portion of the light-transmitting part of the printing lens 6.

In the same way, if the light source section 5 is viewed from a position B in the central portion of the photographic paper 8, the LED group 11 appears, as shown in FIG. 15(a), in the central portion of the light-transmitting part of the printing lens 6 through the scattering plate 13. Again, if the light source section 5 is viewed from a position C in the lower portion of the photographic paper 8, the LED group 11 appears, as shown in FIG. 16(a), in the upper portion of the light-transmitting part of the printing lens 6 through the scattering plate 13.

Third Embodiment

The following will explain a further embodiment of the present invention with reference to FIGS. 17(a) through 19. Members having the same functions as those used in the first or second embodiment above will be given the same reference symbols, and explanation thereof will be omitted here.

An electronic image input device 31 according to the present embodiment includes a printing section 2 structured like that of the second embodiment above, further provided with, as shown in FIGS. 17(a) and 17(b), a CCD camera 32 (image pickup means) which picks up light from the light source section 5 transmitted through the film negative 7. Alternatively, the electronic input device 31 may be structured so that the CCD camera 32 is provided in a printing section 2 structured like that of the first embodiment above. In the Figures, each domain bounded by a pair of two-dot-and-dash lines indicates light which reaches a given single point on the photographic paper 8(in FIG. 17(a) ) or on a photoreceptive surface of the CCD camera 32(in FIG. 17(b)).

The electronic image input device 31 is also provided with the control section 24 (see FIG. 4) explained in the first embodiment above. Based on output signals from the CCD camera 32, density unevenness and color unevenness are corrected as in the first embodiment above, by, for example, control of the emitted light quantity of the light source section 5 by the control section 24.

The CCD camera 32 and the printing lens 6 are contained in and supported by a supporting section 33, and can each be interposed into and withdrawn from the light path between the light source section 5 and the photographic paper 8 by movement of the supporting section 33 in a direction perpendicular to the light axis L(in FIGS. 17(a) and 17(b), vertical sliding). In order to allow light from the light source section 5 which passes through the film negative 7 to reach the photographic paper 8 when the supporting section 33 is moved so as to position the printing lens 6 in the light axis L, the supporting section 33 is provided with an opening 33a on the light-incident side of the printing lens 6, and an opening 33b on the light-exit side of the printing lens 6. Further, in order to allow light from the light source section 5 which passes through the film negative 7 to reach the CCD camera 32 when the supporting section 33 is moved so as to position the CCD camera 32 in the light axis L, the supporting section 33 is also provided with an opening 33c on the light-incident side of the CCD camera 32.

Figure 18:
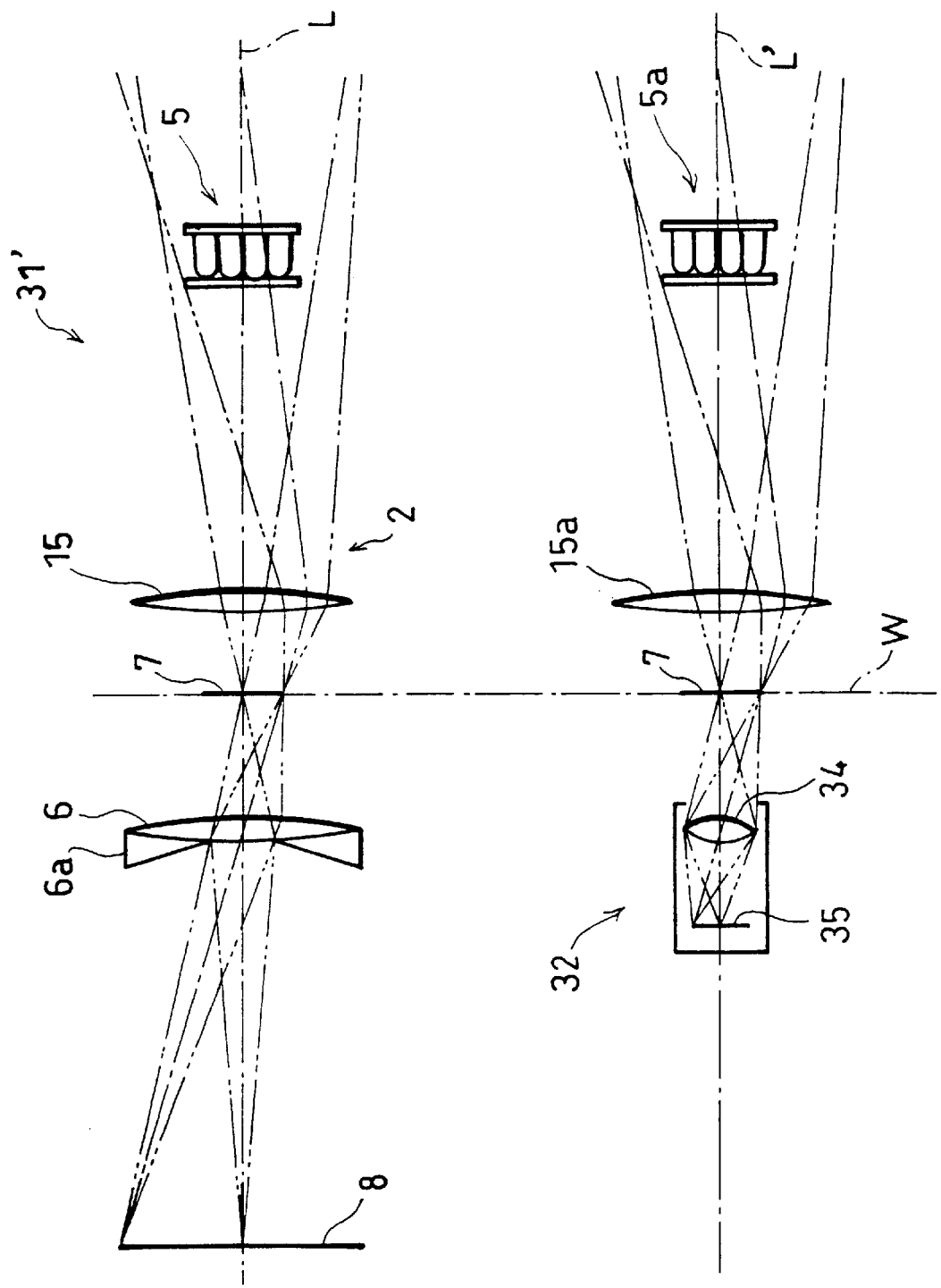
FIG. 18 is a cross-sectional view showing the structure of another electronic image input device, in which a printing lens and a CCD camera are provided independently, and different respective light source sections and condensing lenses are provided corresponding to the printing lens and the CCD camera.

Alternatively, instead of providing the printing lens 6 and the CCD camera 32 in a single unit as above, as shown in FIG. 18, an electronic image input device 31' may be structured with the printing lens 6 and the CCD camera 32 provided separately, and with a light source section 5a and a condensing lens 15a, equivalent to the light source section 5 and the condensing lens 15 discussed above, provided exclusively for the CCD camera 32. In this case, a printing system centered on a light axis L with respect to the photographic paper 8 and a monitor system centered on a light axis L' with respect to the CCD camera 32 may be provided with a common film negative transport path w, or with independent transport paths which transport different respective film negatives to the printing system and the monitor system.

The CCD camera 32 shown in FIGS. 17(a), 17(b), and 18 is made up of an objective lens 34 of the zoom type, moveable along the light axis L or L', and a CCD 35. The objective lens focuses incident light onto the CCD 35. The CCD 35 is provided with a plurality of photoreceptor elements, and detects, for each photoreceptor element, the light quantity of incident light projected through the objective lens 34. Each of the photoreceptor elements sends to the control section 24 an electrical signal corresponding to the quantity of received light, on the basis of which monitor display is performed.

Figure 19:
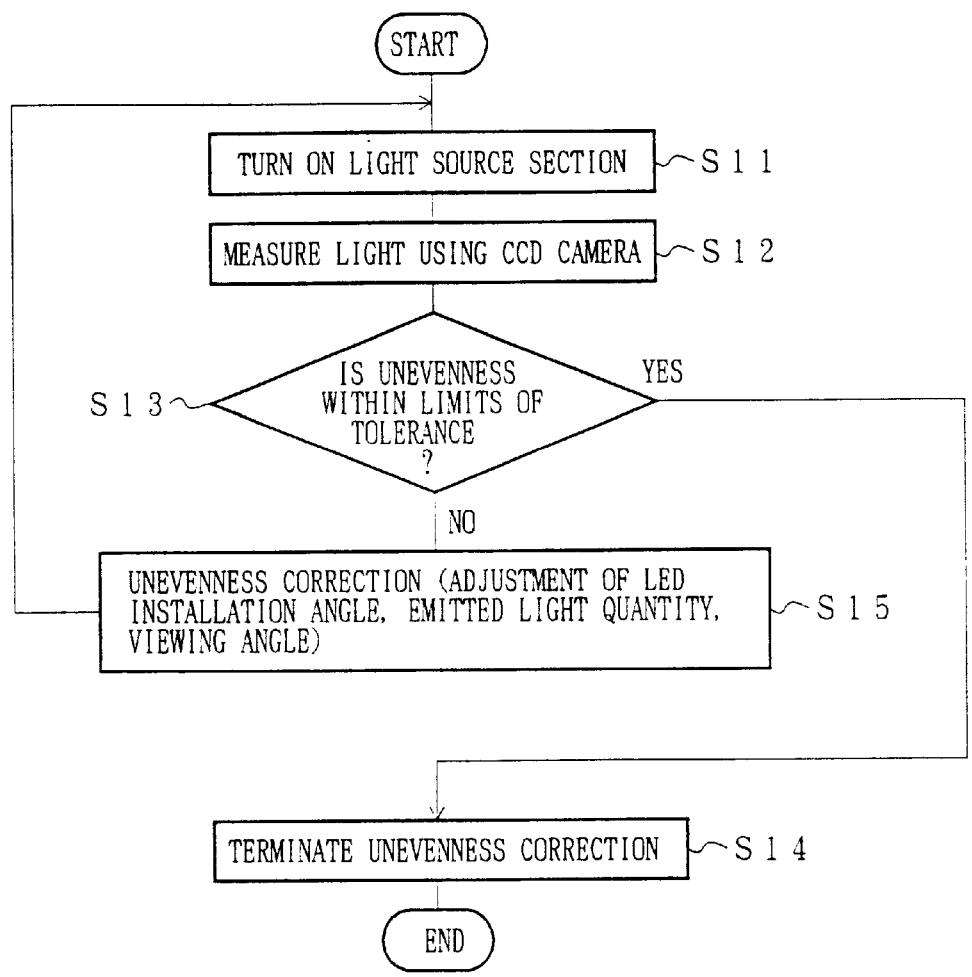
FIG. 19 is a flow-chart showing the flow of unevenness correction operations in the electronic image input device shown in FIGS. 17(a) and 17(b).

The following will explain the operations of the electronic image input device 31 with reference to FIG. 19.

In the structure explained above with reference to FIGS. 17(a) and 17(b), prior to performing printing onto the photographic paper 8, the CCD camera 32 is interposed into the light path by movement of the supporting section 33, as shown in FIG. 17(b). At this time, the photographic paper 8 may already have been transported to the exposure position.

When the light source section 5 is turned on (S11), light from the light source section 5 is projected through the condensing lens 15, the film negative 7, and the objective lens 34, and reaches the CCD 35. Here, the CCD 35 detects the light quantity of light incident on each photoreceptor element, and outputs to the control section 24 detection signals corresponding to the received light quantities (S12). By this means, the control section 24 registers the density distribution on the photoreceptive surface of the CCD 35.

Next, the control section 24 determines, on the basis of the foregoing density distribution, whether density unevenness and color unevenness are within the limits of tolerance (S13). If, in S13, both types of unevenness are within the limits of tolerance, unevenness correction processing is terminated without performing unevenness correction (S14).

If, on the other hand, unevenness exceeds the limits of tolerance in S13, density unevenness and color unevenness are corrected (S15) by, for example, control of the emitted light quantity of the light source section 5 by the control section 24. As with the first embodiment above, unevenness may also be corrected by adjustment of the inclination (installation angle) and/or viewing angle of LEDs 11R, 11G, and 11B of the light source section 5.

In this way, when performing unevenness correction in S15, the processing in S11 through S13 and S15 is repeated until unevenness is within the limits of tolerance, and then unevenness correction is terminated (S14).

Next, after turning off the light source section 5 temporarily, the printing lens 6 is interposed into the light path by movement of the supporting section 33, as shown in FIG. 17(a). Then the light source section 5 is turned on, emitted light quantity is controlled by the control section 24, and printing processing is performed as in the first embodiment above.

The structure shown in FIGS. 17(a) and 17(b) is suited to a case in which density unevenness and color unevenness are corrected before printing, and then the images of all of the frames of the film negative 7 are printed successively.

The structure shown in FIG. 18, on the other hand, is suited to a case in which, before printing, density unevenness and color unevenness are first corrected, and then correction data are inputted manually for the image of each frame of the film negative 7 while checking on the monitor the image of that frame picked up by the CCD camera 32. This is because if, using the structure shown in FIGS. 17(a) and 17(b), correction data are inputted manually for the image of each frame, the supporting section 33 must be moved back and forth once for each frame image, but if the structure shown in FIG. 18 is used, printing and correction based on the monitor can be performed simultaneously.

As discussed above, the electronic image input device 31 is structured so that the printing section 2 is provided with the CCD camera 32, and thus adjustment of density unevenness and color unevenness can be performed directly, based on the output of the CCD camera 32, before, for example, printing processing. Further, when the operator manually inputs a correction quantity, it is possible to perform the foregoing adjustment while viewing the image displayed on the monitor. Accordingly, it is unnecessary to perform the test printing of the first embodiment above, and adjustment of density unevenness and color unevenness can be performed quickly.

Further, since the image of a frame of the film negative 7 or of a film positive can be displayed on the monitor, the image can be viewed by a number of people, without printing it onto the photographic paper 8 as a photographic print. This enables use for exhibit, presentation in a conference, etc.

In addition, after suitably controlling emitted light quantity, etc. of the LEDs so as to eliminate unevenness in density and color, image data obtained from the CCD camera 32 can be recorded in a memory medium such as an MO (magneto-optical memory medium) or DVD (digital video disk), and retained in lieu of a photo album. Further, by controlling emitted light quantity, etc. of the LEDs, image data of varied visual effects can be recorded in such a memory medium.

Incidentally, in each of the embodiments explained above, the image information holding medium for holding the information of the original image was the film negative 7, which records the original image itself, but the image information holding medium is not limited to this. Alternatively, the information holding medium may be, for example, a liquid crystal display element, PLZT exposure head, or DMD (digital micromirror device) which controls reflectance or transmittance of light in accordance with image signals corresponding to the original image.

The foregoing liquid crystal display element is made up of a transparent substrate (TFT substrate), on which TFTs (Thin Film Transistors, a type of active element) corresponding to each pixel are provided in matrix form; and a transparent opposing substrate provided with opposing electrodes; and a liquid crystal layer sandwiched between the two substrates. When the liquid crystal display element is of the reflection type, a reflective plate is further provided on the outside of the liquid crystal panel structured as above. In a liquid crystal display element, a voltage applied to the liquid crystal layer is controlled by pixel in accordance with image signals corresponding to the original image, thus displaying the original image by varying by pixel the transmittance of light from the light source section 5 passing through the liquid crystal layer. Thus an image corresponding to the displayed original image can be printed onto the photosensitive material. Here, if the foregoing liquid crystal panel is provided with an RGB color filter, a color image can be printed. Incidentally, the liquid crystal panel may be a TN (Twisted Nematic) liquid crystal panel, an STN (Super Twisted Nematic) liquid crystal panel, etc.

Again, the foregoing PLZT exposure head is made up of a PLZT element of transparent ferroelectric ceramic material, provided between two polarizing plates (a polarizer and a detector), and a plurality of shutter sections (light output sections) which control transmittance of light in accordance with image signals. For the present invention, a PLZT exposure head having a two-dimensional arrangement of shutter sections is suitable. The foregoing PLZT element is a solid solution of $(Pb_{1-x}La_x)(Zr_yTi_{1-y})_{1-x/4}O_3$, obtained by adding lanthanum to PZT (a solid solution of lead zirconate ($PbZrO_3$) and lead titanate ($PbTiO_3$), mixed at a suitable ratio) and hot pressing thereof.

A DMD, on the other hand, is a plurality of oscillatable micro-mirrors of small size, arranged two-dimensionally, which regulates the inclination of each micromirror in order to change the direction in which light is reflected, thus controlling the supply of light to the photosensitive material.

When the information holding medium used is a transmission-type liquid crystal display element or a PLZT exposure head, light from the light source 5 passes through the information holding medium and is guided to the photosensitive material, and when the information holding medium is a reflection-type liquid crystal display element or a DMD, light from the light source 5 is reflected by the information holding medium and is guided to the photosensitive material. In either case, an image corresponding to the original image held by the information holding medium is printed onto the photosensitive material.

Incidentally, the shape, structure, number, etc. of the structural members explained in each of the foregoing embodiments are not limited to those specified above. For example, the LED group 11 shown in FIG. 7 is made up of 12 LEDs, but any number of LEDs may be used, provided each cluster includes at least one LED 11R, one LED 11G, and one LED 11B.

Fourth Embodiment

The following will explain a further embodiment of the present invention with reference to FIGS. 20 through 29. Members having the same functions as those used in any of the first through third embodiments above will be given the same reference symbols, and explanation thereof will be omitted here.

Figure 21:
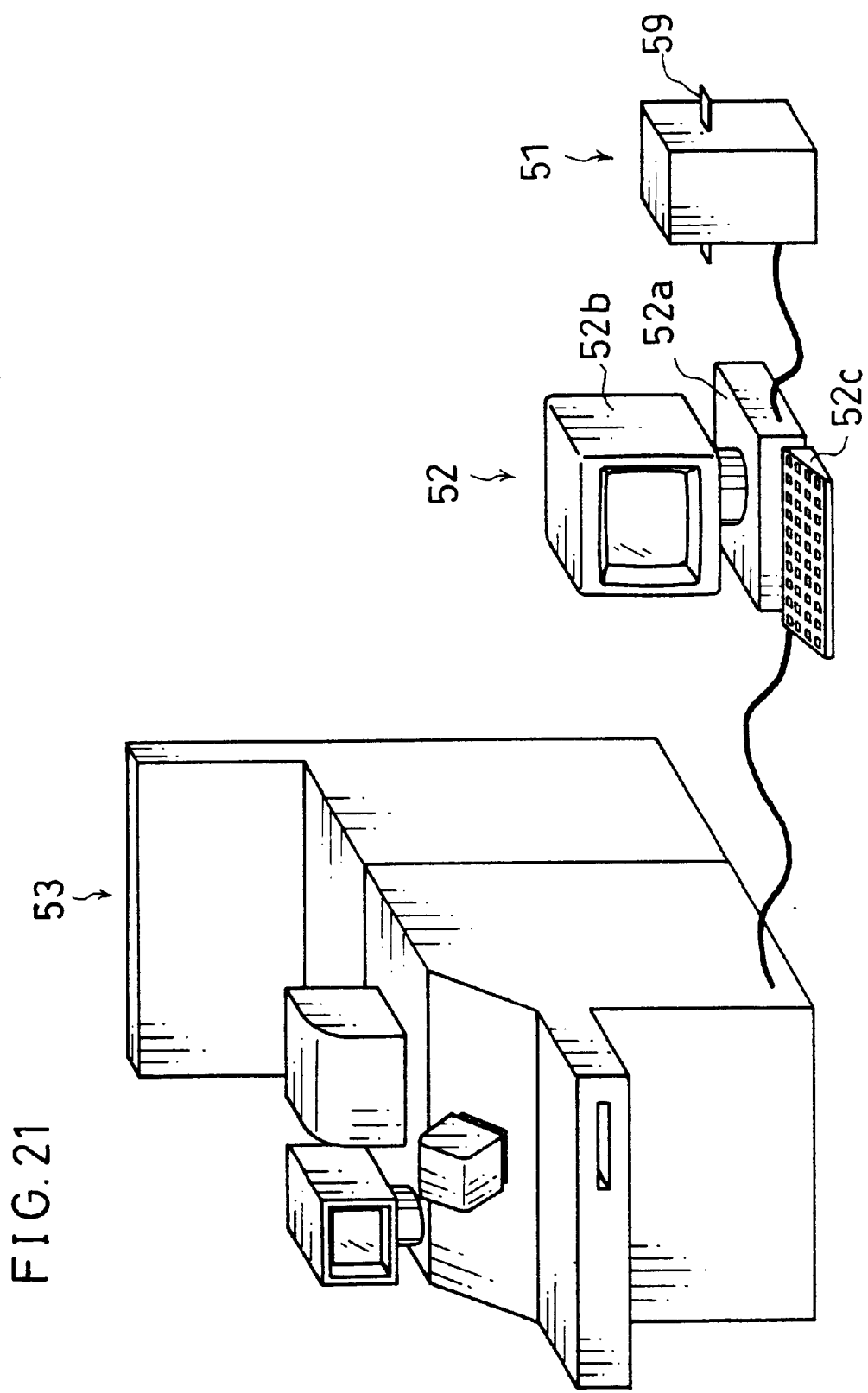
FIG. 21 is a perspective view showing the structure of a digital printing system including the film scanner shown in FIG. 20.

A film scanner 51 according to the present embodiment projects light onto a film negative 59 recording an original image, and scans light passing through the film negative 59, and, as shown in FIG. 21, is connected to a digital printer 53 via a personal computer 52 (computer). The film scanner 51, the personal computer 52, and the digital printer 53 collectively make up a digital printing system.

The personal computer 52 includes a main body 52a, a monitor 52b, and a keyboard 52c. To the main body 52a are inputted signals from a scanning section 55 (to be discussed below; see FIG. 22(a)) of the film scanner 51. On the basis of the signals from the scanning section 55, the monitor 52b displays the density distribution of an image obtained by scanning performed by the scanning section 55. This image corresponds to the original image recorded on the film negative 59. The keyboard 52c is used by the operator to input instructions for adjusting emitted light quantity, brightness, duration of illumination, etc. of a light source section 54 (to be discussed below; see FIG. 22(a)) of the film scanner 51.

Accordingly, image data obtained by the film scanner 151, after being processed and edited in accordance with instructions inputted through the keyboard 52c, is printed out as an image by the digital printer 53.

As shown in FIG. 22(a), the film scanner 51 includes a light source section 54 and a scanning section 55. The light source section 54 projects light onto the film negative 59. The details of the light source section 54 will be discussed later.

The scanning section 55 scans light from the light source section 54 transmitted through the film negative 59, and is made up of an objective lens 55a and a CCD 55b (scanning means), which is an image pickup element. The objective lens 55a is moveable along a light axis L, and focuses the foregoing light onto the CCD 55b. The objective lens 55a is provided with a diaphragm 55c (see FIG. 20) which, as needed, adjusts the light quantity of light projected onto the CCD 55b. The CCD 55b includes a plurality of photoreceptor elements, and outputs to the personal computer 52 electrical signals corresponding to the quantity of light received by each photoreceptor element.

In the light path between the light source section 54 and the scanning section 55 are provided a mirror tunnel 56, a condensing lens 57, and an ANM 58, in that order in the light projection direction.

The mirror tunnel 56 is a hollow, quadrilateral pyramid with trapezoidal sides, the inner surfaces of which are mirrored, which functions to efficiently guide to the film negative 59 the light emitted by the light source section 54. The upper end of the mirror tunnel 56 is in close proximity with the ANM 58, and the condensing lens 57 is fixed between the upper end of the mirror tunnel 56 and the ANM 58, so as to condense light exiting from the mirror tunnel 56 onto the film negative 59 transported by the ANM 58. In this way, the efficiency of use of the light is increased, thus greatly reducing loss of light quantity. When the condensing lens 57 is provided, the position of the light source section 54 is determined on the basis of condensing-method light source design, taking into consideration the positional relationship between the object lens 55a and the condensing lens 57, and the focusing distance.

Incidentally, instead of using the condensing lens 57, light from the light source section 54 may be condensed using, for example, a concave mirror. However, in this case, positioning of the concave mirror greatly complicates layout of the optical system. Accordingly, by using the condensing lens 57 as the light condensing means, the structure of the optical system can be simplified.

The ANM 58 automatically transports to a predetermined position in the light path the film negative 59, which is held between transport rollers 60a and transport rollers 60b.

The structural members explained above are contained in a body 51a, shown in FIG. 22(a), of the film scanner 51. The film negative 59 is fed into the body 51a through a film inlet 51b provided in the body 51a.

Next, the details of the light source section 54 will be explained with reference to FIG. 20 and FIGS. 23(a) through 26.

Figure 23A:
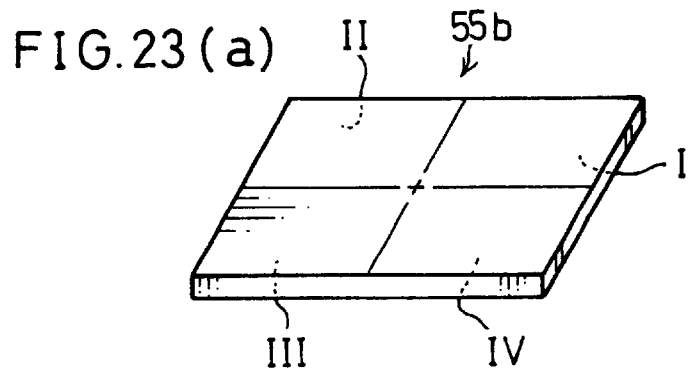
FIG. 23(a) is an enlarged perspective view of a CCD provided in the film scanner shown in FIG. 23(b).
Figure 23B:
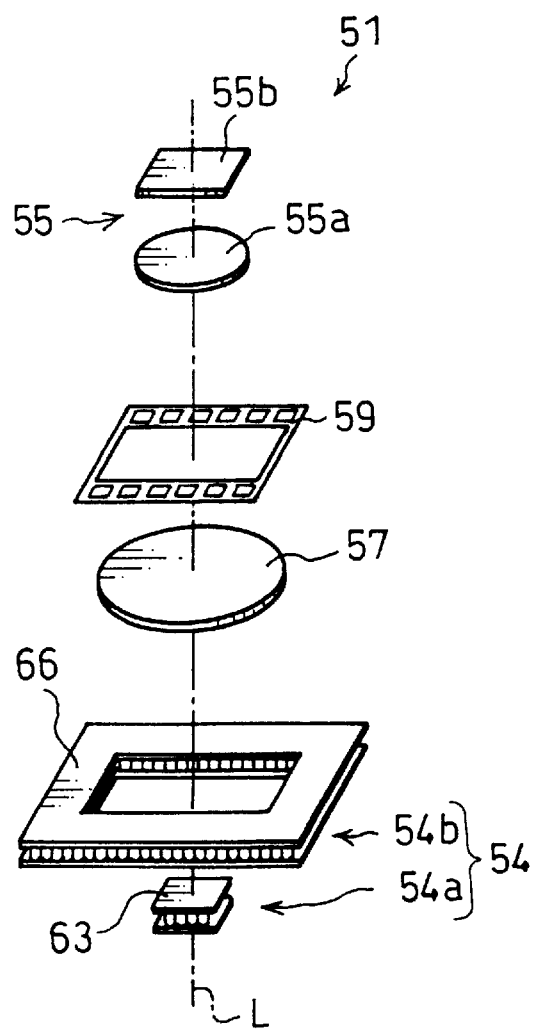
FIG. 23(b) is an exploded perspective view of the interior of the film scanner shown in FIG. 20.

FIG. 23(b) is an exploded perspective view of the interior of the film scanner 51. For ease of explanation, the mirror tunnel 56 is omitted from the Figure. Further, FIG. 23(a) shows the photoreceptive surface of the CCD 55b shown in FIG. 23(b), enlarged and divided into four areas.

As shown in FIG. 23(b), the light source section 54 is made up of a first light source section 54a (first light source) and a second light source section 54b (light compensating means; second light source), provided on different respective substrates.

The first light source section 54a is moveable in a direction parallel to the light axis L in accordance with the extent of the CCD 55b receiving light, and chiefly projects light (condensed light) toward the scanning section 55 through areas of the film negative 59 other than an area of surface unevenness (scratch area) formed therein. The second light source section 54b, on the other hand, is provided in the shape of a rectangular frame encircling the first light source section 54a, and chiefly projects light (scattered light) toward the scanning section 55 through an area of surface unevenness formed in the film negative 59. The following will explain the respective structures of the first and second light source sections 54a and 54b.

Figure 24A:
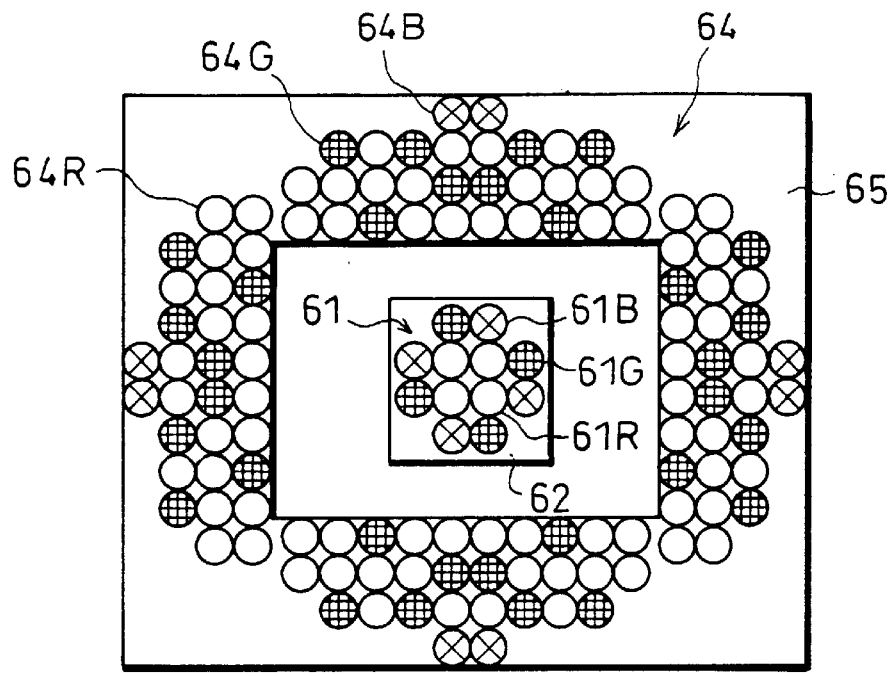
FIG. 24(a) is a plan view schematically showing the structure of a light source section of the film scanner shown in FIG. 20.
Figure 24B:
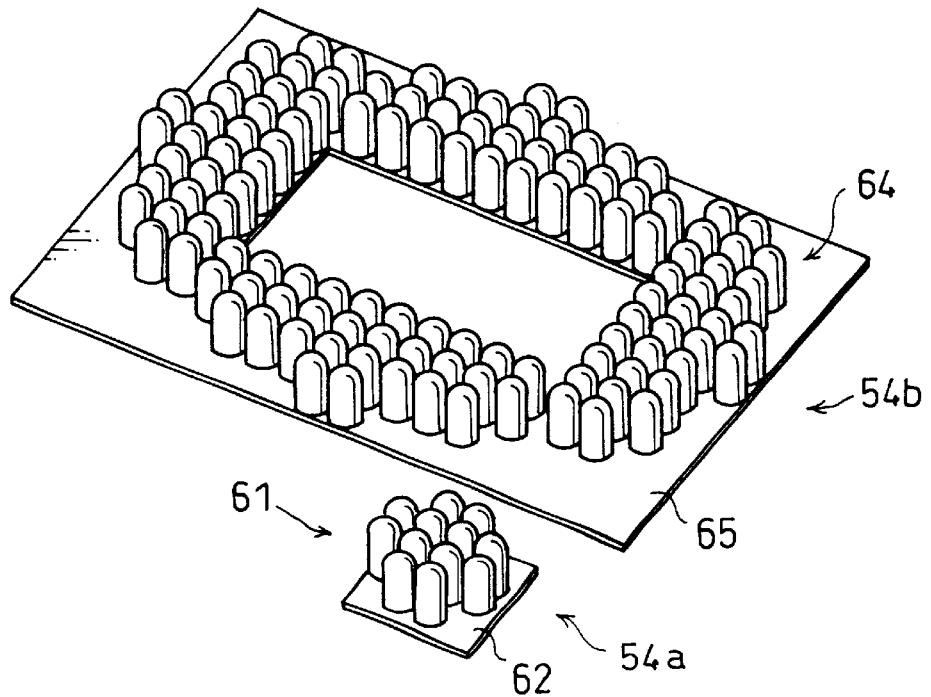
FIG. 24(b) is a perspective view of the light source section shown in FIG. 24(a).

The first light source section 54a, as shown in FIGS. 24(a) and 24(b), includes an LED group 61 made up of a plurality of LEDs (light emitting means), an LED substrate 62, to which the LED group 61 is fixed, and a scattering plate 63 (see FIG. 23(b)).

The LED group 61 is made up of a plurality of LEDs 61R, 61G, and 61B, which emit red, green, and blue light, respectively. In other words, the LEDs 61R, 61G, and 61B have different respective spectral characteristics. The LEDs 61R, 61G, and 61B are controlled by a control section (not shown) so as to be turned on during scanning of the film negative 59, and off when not scanning. The details of the LED group 61 will be discussed later.

The surface of the LED substrate 62 to which the respective LEDs are attached is provided with a reflective film, so as to reduce loss of light quantity of the light projected by the LED group 61.

In other words, most of the projected light from the LED group 61 is projected from the heads of the respective LEDs, and most of it is projected toward the scanning section 55. However, there is also a small quantity of light which is projected from the heads of the LEDs 61R, 61G, and 61B toward the LED substrate 62. However, by providing the reflective film on the surface of the LED substrate 62, light projected toward the LED substrate 62 is reflected toward the scanning section 55, thus increasing the quantity of light projected toward the scanning section 55. Accordingly, projected light from the LED group 61 can be used effectively, thus reducing loss of light quantity of the projected light.

The scattering plate 63 is frosted glass of a coarseness which can be seen through without appreciable difficulty by the naked eye, and is provided in close proximity with the heads of the LED group 61. The LEDs 61R, 61G, and 61B used in the present embodiment have viewing angles of 45° or less, and the light from the LEDs 61R, 61G, and 61B is suitably scattered by the scattering plate 63. Incidentally, if LEDs 61R, 61G, and 61B with a suitable viewing angle (around 180°, for example) are used, the scattering plate 63 may be omitted.

Incidentally, although not shown in the Figures, a diaphragm with holes corresponding to the respective LEDs 61R, 61G, and 61B may be provided in the light path between the LED group 61 and the scattering plate 63. By placing a diaphragm having holes of a predetermined internal diameter in the foregoing light path as needed, the viewing angle of the LEDs 61R, 61G, and 61B can be suitably adjusted, and the density distribution of the image obtained by the scanning section 55 can be made more uniform.

Alternatively, instead of selectively interposing a predetermined diaphragm in the foregoing light path, each LED 61R, 61G, and 61B may be provided with a diaphragm with a hole of variable internal diameter, and the diameter of the hole adjusted to adjust the viewing angle of each LED 61R, 61G, and 61B.

The following will explain the details of the LED group 61.

Figure 25A:
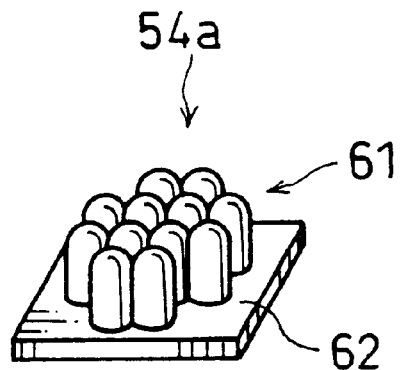
FIG. 25(a) is a perspective view schematically showing the structure of a first light source section provided in the light source section shown in FIGS. 24(a) and 24(b).
Figure 25B:
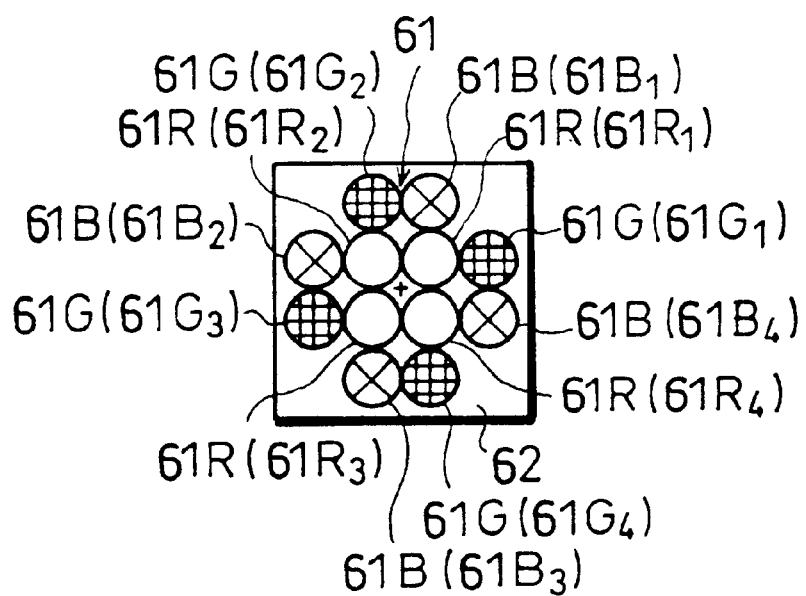
FIG. 25(b) is a plan view of the first light source section shown in FIG. 25(a).

FIG. 25(a) is a perspective view showing the first light source section 54 shown in FIG. 23(b), with the scattering plate 63 removed. Further, FIG. 25(b) is a plan view of the first light source section 54. Here, as shown in FIG. 25(b), the LED substrate 62 will be divided into first through fourth quadrants, and the LEDs belonging to the first quadrant referred to as LEDs $61R_1$, $61G_1$, and $61B_1$; those belonging to the second quadrant as LEDs $61R_2$, $61G_2$, and $61B_2$; those belonging to the third quadrant as LEDs $61R_3$, $61G_3$, and $61B_3$; and those belonging to the fourth quadrant as LEDs $61R_4$, $61G_4$, and $61B_4$.

As shown in FIG. 25(b), an equal number of LEDs of each color (a total of 12 LEDs) are densely packed around the center of the LED group 61. More specifically, of the LED group 61, four LEDs $61R_1$ through $61R_4$ are provided mutually touching near the center of the LED substrate 62, and, touching the four LEDS $61R_1$ through $61R_4$ are four LEDs $61G_1$ through $61G_4$ in point symmetry with each other (in other words, having symmetry with respect to a light axis L of the objective lens 55a) and four LEDs $61B_1$ through $61B_4$ in point symmetry with each other. By this arrangement, the three LEDs $61R_1$, $61G_1$, and $61B_1$ form a cluster, and three more clusters are formed by three different-colored LEDs each. Accordingly, the LED group 61 is made up of four clusters.

When lit with a constant brightness, a ratio among the illumination times of the LEDs 61R, 61G, and 61B is set to, for example, LED 61B:LED 61G:LED 61R=1:2:X, where X is in a range including 5 and 6. By illuminating the LEDs 61R, 61G, and 61B at such a ratio, red light, which is most prone to insufficient light quantity, can be supplemented, and overall good scanning can be performed.

Incidentally, when illumination time is constant, the foregoing ratio may be a ratio of brightness of the respective LEDs. Accordingly, the number of LEDs is not limited to the 12 used in the present embodiment, and may be determined, within the limits of the space for installation, such that the product of LED brightness and illumination time for blue, green, and red fulfills the ratio 1:2:X, where X is in a range including 5 and 6.

Each of the LEDs 61R, 61G, and 61B is provided so as to incline at an angle of θ with respect to a light axis L, so that light projected thereby has directivity toward the light axis L. This will be explained below with reference to FIG. 26.

FIG. 26 is a perspective view showing only three LEDs, here, the LEDs $61R_3$, $61G_3$, and $61B_3$ of the third quadrant.

As shown on a projection plane X in the Figure, each of the LEDs $61G_3$ and $61B_3$ inclines in a direction in the plane X at an angle of $\theta_1$ with respect to the light axis L. In the same way, as shown on a projection plane Y perpendicular to the projection plane X, each of the LEDs $61R_3$ and $61G_3$ inclines in a direction in the plane Y at an angle of $\theta_2$ with respect to the light axis L. Here, the angles $\theta_1$ and $\theta_2$ may be equal.

Further, although not shown in the Figure, the LEDs 11R, 11G, and 11B of the other three quadrants are arranged in a similar manner. In consideration of various conditions such as the type of lenses used in the optical system (focusing distance, aperture, etc.), extent of the CCD 55b receiving light, print size, etc., the foregoing angles $\theta$, $\theta_1$, and $\theta_2$, are set within a range of approximately 0° to 30°.

Since each LED is provided so as to incline with respect to the light axis L, each cluster of three LEDs 11R, 11G, and 11B projects light onto a specific area of the scanning section 55. In the present embodiment, first through fourth light projection areas on the scanning section 55 are positioned opposite the LEDs 11R, 11G, and 11B of the first through fourth quadrants.

More specifically, light from the LEDs $61R_1$, $61G_1$, and $61B_1$ of the first quadrant travels through the condensing lens 57, the film negative 59, and the objective lens 55a, and is projected onto an area I of the CCD 55b, shown in FIG. 23(a). In FIG. 23(a), area I is the area at the upper right when viewed from the side of the CCD 55b opposite the objective lens 55a. In the same way, light from the LEDs $61R_2$, $61G_2$, and $61B_2$ of the second quadrant is projected onto an area II of the CCD 55b; light from the LEDs $61R_3$, $61G_3$, and $61B_3$ of the third quadrant is projected onto an area III of the CCD 55b; and light from the LEDs $61R_4$, $61G_4$, and $61B_4$ of the fourth quadrant is projected onto an area IV of the CCD 55b. Here, areas II, III, and IV are located moving counter-clockwise from area I when viewed from the side of the CCD 55b opposite the objective lens 55a.

By means of the foregoing arrangement, even if aberration, etc. occurs in the optical system, projected light from the first light source section 54a can be projected with certainty onto the peripheral areas of the CCD 55b, and thus it is not necessary to, for example, increase the scattering ratio of the scattering plate 63 in order to compensate insufficient light quantity in the peripheral areas of the CCD 55b, and the light from the LEDs 61R, 61G, and 61B need not be scattered more than necessary. As a result, there is no need for control which attempts to compensate for the loss of light quantity due to light scattering by increasing the duration of illumination or increasing the brightness of light emitted by the LEDs 61R, 61G, and 61B.

In addition, since the LEDs 61R, 61G, and 61B are provided so as to incline at an angle of $\theta$ with respect to the light axis L, light spots with a one-to-one relationship to the LEDs 61R, 61G, and 61B do not appear on the CCD 55b. As a result, light-source unevenness can be suppressed to some extent, and thus, as above, there is no need to scatter the light from the LEDs 61R, 61G, and 61B more than necessary. Incidentally, light-source unevenness is density unevenness and color unevenness on the photoreceptive surface of the CCD 55b. Accordingly, providing the LEDs 61R, 61G, and 61B so as to incline at an angle of $\theta$ with respect to the light axis L facilitates adjustment of light-source unevenness.

The angle of inclination of each LED 61R, 61G, and 61B may be adjusted as needed during manufacturing, for example, at the time of fixing of the LEDs 61R, 61G, and 61B on the LED substrate 62. Alternatively, adjustment may be performed after the legs of the LEDs 61R, 61G, and 61B, which are made of wire, for example, are fixed on the LED substrate 62, by bending the legs of each LED a predetermined amount.

Further, an inclination angle varying mechanism, which can adjust the angle of inclination of each of the LEDs 61R, 61G, and 61B, may be provided. An example of such an inclination angle varying mechanism will be explained in the fifth embodiment below.

The first light source section 54a with the foregoing structure is positioned closer to the film negative 59 the smaller the extent of the CCD 55b which receives light, and is positioned farther from the film negative 59 the larger the extent of the CCD 55b which receives light. This is because it is necessary to change the angle of incidence of light on the film negative 59 in accordance with the extent of the CCD 55b which receives light. In other words, when the angle of incidence of light on the film negative 59 is reduced by positioning the first light source section 54a closer to the film negative 59, the extent of the CCD 55b receiving light is reduced. When, on the other hand, the angle of incidence of light incident on the film negative 59 is increased by positioning the first light source section 54a farther from the film negative 59, the extent of the CCD 55b receiving light is increased. Here, the extent of the CCD 55b receiving light is also proportional to the size of the print later outputted by the digital printer 53.

By moving the first light source 54a along the light axis L in this way, the extent of the CCD 55b receiving light can be changed along a continuous, unbroken range, and a continuous range of print sizes can also be realized. Further, in this case, since the first and second light source sections 54a and 54b are provided separately, optimum optical design can be realized, thus increasing freedom of design.

The second light source section 54b, as shown in FIGS. 24(a) and 24(b), includes an LED group 64 made up of a plurality of LEDs (light emitting means), an LED substrate 65, to which the LED group 64 is fixed, and a scattering plate 66 (see FIG. 23(b)).

The LED group 64 is made up of a plurality of LEDs 64R, 64G, and 64B, which emit red, green, and blue light, respectively. In other words, the LEDs 64R, 64G, and 64B have different respective spectral characteristics. The LEDs 64R, 64G, and 64B are controlled by a control section (not shown) so as to be turned on during scanning the film negative 59, and off when not scanning. The details of the LED group 64 will be discussed later.

In the center of the LED substrate 65 is formed a rectangular opening, through which passes light from the first light source 54a. Accordingly, the LED substrate 65 is provided in the shape of a rectangular frame centered on the light axis L, and the LEDs 64R, 64G, and 64B fixed on the LED substrate 65 are arranged in the shape of a ring centered on the light axis L. Further, the surface of the LED substrate 65 to which the respective LEDs are attached is provided with a reflective film like that provided on the LED substrate 62, so as to reduce loss of light quantity of the light projected by the LED group 64.

The scattering plate 66 is frosted glass of a coarseness which can be seen through without appreciable difficulty by the naked eye, and is provided in close proximity with the heads of the LED group 64. Further, in the center of the scattering plate 66 is formed a rectangular opening, through which passes light from the first light source 54a.

The LEDs 64R, 64G, and 64B used in the present embodiment have viewing angles of 45° or less, and the light from the LEDs 64R, 64G, and 64B is suitably scattered by the scattering plate 66. Incidentally, if LEDs 64R, 64G, and 64B with a suitable viewing angle (around 180°, for example) are used, the scattering plate 66 may be omitted.

Incidentally, although not shown in the Figures, a diaphragm like that in the first light source 54a may be provided in the light path between the LED group 64 and the scattering plate 66, by means of which the viewing angle of the LEDs 64R, 64G, and 64B can be suitably adjusted.

Alternatively, instead of selectively interposing a predetermined diaphragm in the foregoing light path, each LED 64R, 64G, and 64B may be provided with a diaphragm with a hole of variable internal diameter, and the diameter of the hole adjusted to adjust the viewing angle of each LED 64R, 64G, and 64B.

The following will explain the details of the LED group 64.

The LEDs 64R, 64G, and 64B are attached to the LED substrate 65 so that light emitted thereby has directivity in a direction parallel to the light axis L. This is because the mirror tunnel 56 and the condensing lens 57 act to efficiently project the scattered light emitted by the LED group 64 onto the film negative 59. This arrangement also has the advantage that the manufacturing process and manufacturing control are simpler than when each LED 64R, 64G, and 64B is attached with a predetermined angle of inclination. However, attaching the LEDs 64R, 64G, and 64B with a predetermined angle of inclination creates no inconvenience to the present invention.

The LEDs 64R, 64G, and 64B are arranged as follows. As shown in FIG. 24(a), the number of LEDs in the LED group 64 is approximately 10 times that of the LED group 61 of the first light source section 54a; here, 120 LEDs. Further, on each side of the rectangular opening in the LED substrate 65 are provided 30 LEDs, arranged in four tiers each.

In other words, each of the first and second tiers is made up of 10 LEDs, the third tier of eight LEDs, and the fourth tier of two LEDs. Arranging a plurality of LEDs in tiers in this way not only prevents formation in the scanning section 55 of an image corresponding to a scratch, etc. on the film negative 59, but also facilitates adjustment of the sharpness of the print obtained after scanning, i.e., of brightness, which indicates the extent of sharpness or softness of the printed image.

With regard to the ratio in number of LEDs 64R, 64G, and 64B, it is satisfactory to provide relatively more LEDs 64R, which are prone to insufficient light quantity, relatively fewer LEDs 64B, which have high photosensitivity, and an intermediate number of LEDs 64G. However, emitted light quantity is controlled so that a product of brightness and duration of illumination for each color satisfies R:G:B= 5–6:2:1. By illuminating the LEDs 64R, 64G, and 64B at such a ratio, red light, which is most prone to insufficient light quantity, can be supplemented, and overall good scanning can be performed.

Further, with regard to the positions of the LEDs 64R, 64G, and 64B, it is satisfactory to provide relatively more LEDs 64R close to the light axis L, and to provide the LEDs 64B relatively farthest from the light axis L. Accordingly, the LEDs 64B are provided in the fourth tier on each side of the opening in the LED substrate 65.

In the present embodiment, use of LEDs as the light emitting means in the first and second light source sections 54a and 54b yields the following effects.

(1) There is no need for the cooling fan, heat-absorbing filter, light-adjusting filter, cutoff filter, etc. which are necessary when using a halogen lamp as the light emitting means. Accordingly, the structure of the light source section 54 can be simplified. Further, since a cooling fan is not used, surrounding dust is not sucked into the optical system, and thus good scanning can be performed.

(2) Since spectral characteristics are stable, the directcurrent power source used can be a simple one which applies a voltage to an IC (integrated circuit) control substrate. Accordingly, since a special direct-current power source is not necessary, increase of the size of the device can be avoided. Further, since spectral characteristics are stable, light adjustment can be easily managed by ON/OFF control of the LEDs.

(3) Since the LEDs are ON/OFF controlled, the LEDs need not be lit except when necessary. Accordingly, power consumption can be greatly reduced in comparison with the case of use of a halogen lamp. Further, since the LEDs are turned off when not performing scanning, there is no need for a shutter mechanism between the CCD 55b and the light source section 54. As a result, the number of structural parts can be reduced, and the structure of the film scanner 51 can be simplified.

(4) The difference in light quantity between the light axis and surrounding areas is not as great as with a halogen lamp. Accordingly, loss of light quantity can be reduced in comparison with the case of use of a halogen lamp as the light source.

(5) Since the LEDs are ON/OFF controlled, they are not left on more than necessary. For this reason, even when making a large number of scans, damage to the film negative 59 due to heat from the LEDs can be avoided.

(6) Since the LEDs have different respective spectral characteristics, there is no need to provide an RGB color filter in front of the CCD 55b. Consequently, the structure of the light source section 54 can be simplified.

The following will explain the relative positions of the first and second light source sections 54a and 54b with respect to the light axis L.

Figure 20:
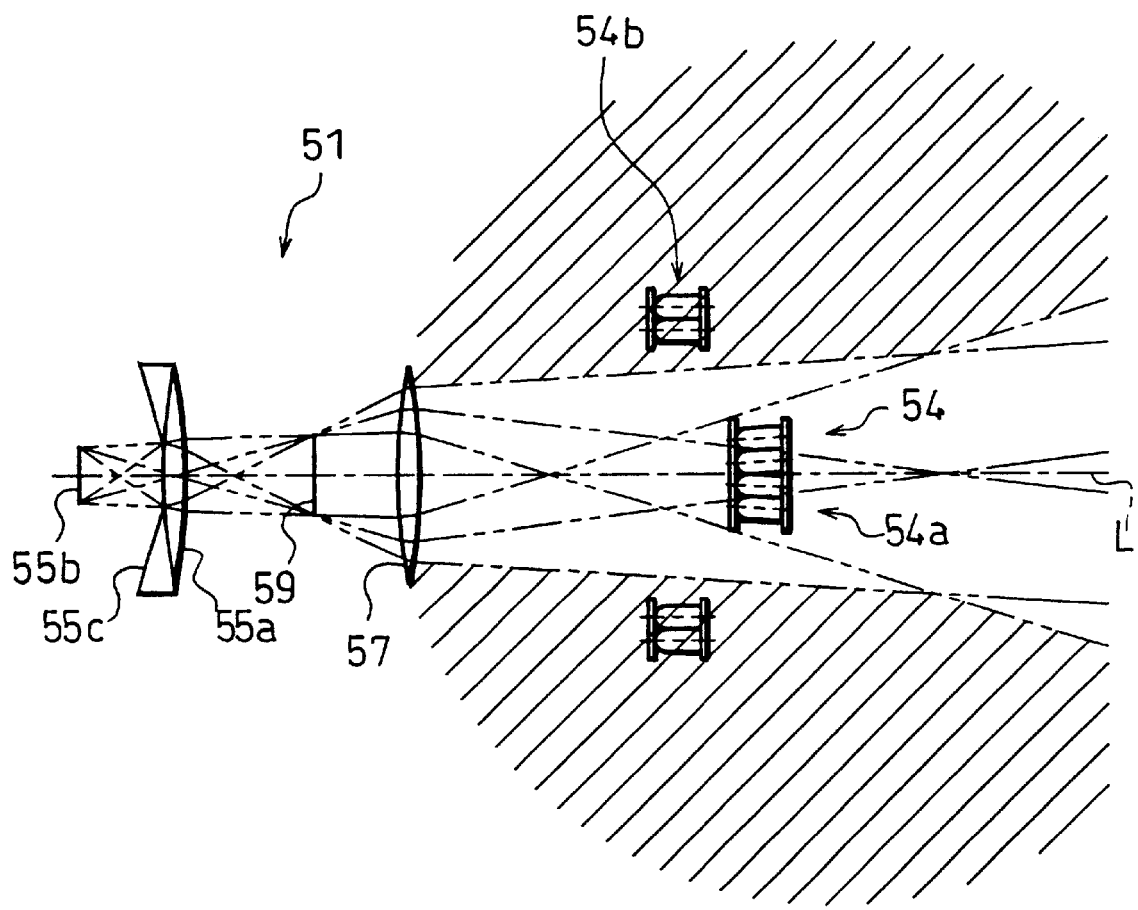
FIG. 20 is a cross-sectional view schematically showing the structure of a film scanner according to a further embodiment of the present invention.

In the exposure system made up of the condensing lens 57, the film negative 59, the objective lens 55a, and the CCD 55b, FIG. 20 shows a domain in which light from the light source section 54 directly reaches the CCD 55b and a domain in which this light does not directly reach the CCD 55b. The first and second light source sections 54a and 54b are of course provided on the opposite side of the condensing lens 57 from the objective lens 55a, and are not provided on the objective lens 55a side of the condensing lens 57.

In FIG. 20, the diagonally hatched area indicates a domain from which, even if a light source is provided, light does not directly reach any point of the CCD 55b. The area in the vicinity of the light axis L free of diagonal hatching, which is surrounded by the hatched area, indicates a domain from which, if a light source is provided, light reaches some point on the CCD 55b. Light traveling along the dividing line between the hatched and non-hatched areas passes through the edge of the film negative 59 and reaches the edge of the CCD 55b.

Here, an important feature of the present invention is the positional relationship of the first and second light source sections 54a and 54b, whereby the first light source section 54a is provided within the non-hatched area centered on the light axis L, and the second light source section 54b is provided within the diagonally hatched area. Accordingly, when, for example, the first and second light source sections 54a and 54b are both lit, light from the second light source section 54b does not reach the CCD 55b if the film negative 59 is free of scratches, etc.

Accordingly, using the first and second light source sections 54a and 54b positioned as above, when, for example, there is a shallow scratch in the film negative 59, a good image can be obtained by the CCD 55b, such that no scratch image appears in the printed image even though the film negative 59 is scratched. The principle behind this will be explained below.

Figure 27A:
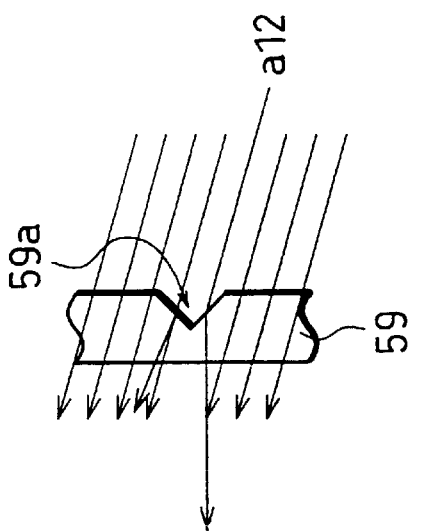
FIG. 27(a) is a cross-sectional view showing light projected onto a film negative perpendicularly, being refracted at a scratch area and diverted from a light path which leads to a scanning section.

FIG. 27(a) is a vertical cross-sectional view of a film negative 59 in which is formed a notch-shaped scratch 59a, schematically showing condensed light from the first light source 54a projected perpendicularly onto and passing through the film negative 59. As shown in the Figure, light beams a3 and a4 incident on the scratch 59a are refracted thereby, and do not reach the CCD 55b provided on the light-exit side of the film negative 59. However, light beams a1, a2, a5, and a6, incident on areas of the film negative 59 other than the scratch 59a, are transmitted through the film negative 59 without refraction, and reach the CCD 55b.

Figure 27B:
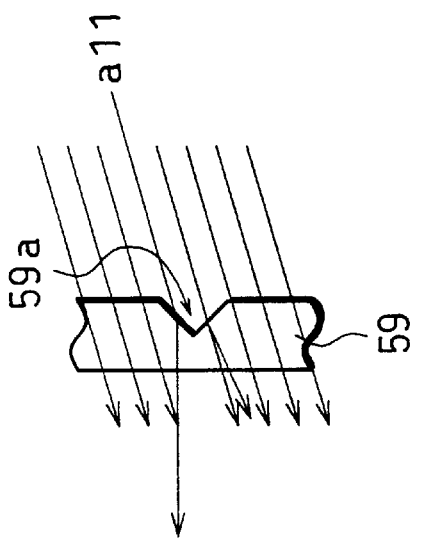
FIG. 27(b) is a cross-sectional view showing light projected onto a film negative diagonally from above, being refracted at a scratch area and directed toward a scanning section.

FIG. 27(b) is a vertical cross-sectional view of the film negative 59, schematically showing scattered light from the second light source 54b projected onto the film negative 59 diagonally from above. As shown in the Figure, light incident on areas of the film negative 59 other than the scratch 59a is transmitted through the film negative 59 without refraction, and does not reach the CCD 55b. However, light incident on the upper inclined surface of the scratch 59a includes a light beam a11 which is refracted by the scratch 59a and exits the film negative 59 perpendicular to the light-exit surface thereof, and reaches the CCD 55b.

Figure 27C:
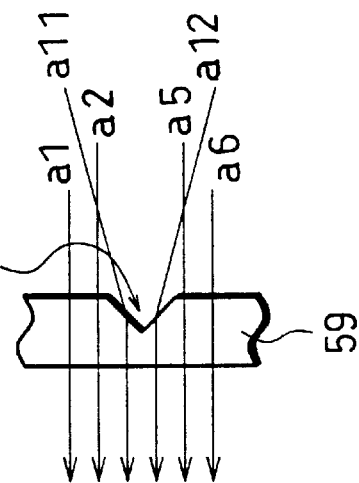
FIG. 27(c) is a cross-sectional view showing light projected onto a film negative diagonally from below, being refracted at a scratch area and directed toward a scanning section.

In the same way, as shown in FIG. 27(c), when scattered light from the second light source 54b is projected onto the film negative 59 diagonally from below, light incident on the lower inclined surface of the scratch 59a includes a light beam a12 which is refracted by the scratch 59a and exits the film negative 59 perpendicular to the light-exit surface thereof, and reaches the CCD 55b.

In other words, the light beams a11 and a12 which reach the CCD 55b expose the position where the scratch 59a is focused, and thus, in the image scanned by the CCD 55b, the area corresponding to the scratch 59a does not appear as a white area.

Accordingly, by exposure of the CCD 55b by the light beams a1, a2, a5, and a6 projected by the first light source section 54a, which are focused on the CCD 55b without irregular refraction by the film negative 59, and by the light beams a11 and a12 projected by the second light source section 54b, which are irregularly refracted by the surface unevenness of the scratch 59a in the film negative 59 and reach the CCD 55b, formation of an image corresponding to the scratch 59a (a white area, for example) on the photoreceptive surface of the CCD 55b can be prevented.

In other words, the second light source section 54b is provided to compensate insufficient light quantity due to disturbance of the focusing light path by surface unevenness such as the scratch 59a, which causes an image of the scratch, etc. to be formed in the CCD 55b, using the disturbance of the focusing light path caused by the surface unevenness such as the scratch 59a.

Here, as has been discussed above, it is important to position the first and second light source sections 54a and 54b such that the first light source section 54a is provided in a position on the light axis L, and the second light source section 54b is provided within a domain from which light does not directly reach the CCD 55b. By means of this arrangement, the second light source section 54b can be used solely for eliminating scratch images, and will not influence light-source unevenness correction of the first light source section 54a when there is no surface unevenness such as the scratch 59a in the film negative 59.

Incidentally, among the light projected by the first light source section 54a, there may be light which reaches the CCD 55b through the surface unevenness such as the scratch 59a. In this case, it is preferable to individually adjust the emitted light quantities (determined by brightness, duration of illumination, etc.) of the LEDs of the first and second light source sections 54a and 54b optimally so that an image of the surface unevenness such as the scratch 59a does not appear on the CCD 55b.

The following will explain the operations of the digital print system as a whole, when the scratch formed on the film negative 59 is comparatively shallow, or when there is no scratch on the film negative 59.

When the light source section 54 (the first and second light source sections 54a and 54b) is lit, light projected thereby travels through the interior of the mirror tunnel 56, and is projected onto the condensing lens 57. Light incident on the condensing lens 57 is condensed thereby, and reaches the film negative 59 transported by the ANM 58. Here, since the second light source section 54b is provided in the position described above, with a normal film negative 59 which is free of scratches, etc., light from the second light source 54b does not reach the scanning section 55 after passing through the film negative 59. When, on the other hand, a comparatively shallow scratch 59a is formed on the film negative 59, light from the first light source section 54a passing through areas of the film negative 59 other than the scratch 59a reaches the scanning section 55, and light from the second light source section 54b refracted by the scratch 59a reaches the scanning section 55.

In this way, in the scanning section 55, the original image recorded on the film negative 59 is focused by the objective lens 55a on the photoreceptive surface of the CCD 55b, without being influenced by the scratch 59a. In other words, a situation in which the image recorded at the scratch 59a does not reach the scanning section 55 does not arise. Then, each photoreceptor element of the CCD 55b outputs an electrical signal in accordance with the light quantity received thereby to the main body 52a of the personal computer 52. Next, based on these signals, the monitor 52b displays the density distribution of the image focused on the photoreceptive surface of the CCD 55b.

Then the operator, operating the keyboard 52c, adjusts light-source unevenness by adjusting emitted light quantity, brightness, duration of illumination, etc. of the light source section 54. Thereafter, the digital printer 53, which is connected to the film scanner 51 through the personal computer 52, prints out the image scanned by the film scanner 51.

In this way, merely by illuminating both the first and second light source sections 54a and 54b and projecting condensed light and scattered light in a suitable ratio, even when a comparatively shallow scratch 59a is formed on the film negative 59, an image corresponding to the scratch 59a does not appear in the scanning image. Accordingly, an image free of scratch images can be obtained by the CCD 55b.

The following will explain measures to be taken when, for example, a comparatively deep scratch is formed on the film negative 59.

When the scratch 59a on the film negative 59 is deep, even if condensed light and scattered light are projected in a suitable ratio, an image corresponding to the scratch 59a appears as a white area in the scanning image. Accordingly, in this case, the white area must be restored.

However, the personal computer cannot determine whether the white area is a scratch image corresponding to the scratch 59a or part of a legitimate scanning image corresponding to the original image recorded on the film negative 59.

Thus, when the scratch 59a in the film negative 59 is deep, elimination of the scratch image from the scanning image is performed by means of digital processing, as follows.

First, only the second light source section 54b is lit, and the CCD 55b scans light obtained through the scratch 59a, shown in FIGS. 27(b) and 27(c)(first process). In this way, only a scratch image corresponding to the scratch 59a is focused on the photoreceptive surface of the CCD 55b. Then the CCD 55b sends to the personal computer 52 signals corresponding to the light quantity received by each photoreceptor element. Thus the scratch image alone is read into the personal computer 52, and the personal computer 52 recognizes the position of the scratch image.

Figure 27D:
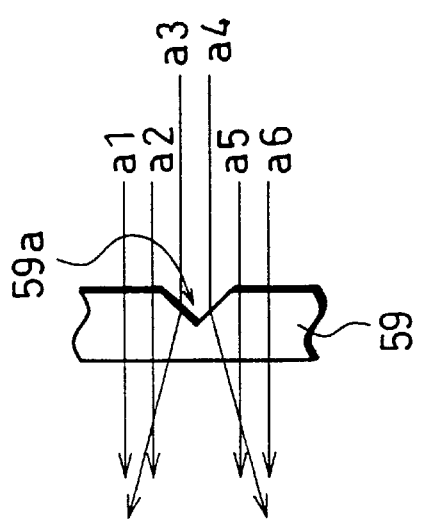
FIG. 27(d) is a cross-sectional view showing light projected onto a film negative perpendicularly and light projected diagonally, both being directed toward a scanning section.

Next, both the first and second light source sections 54a and 54b are lit (second process). In this way, as shown in FIG. 27(d), a scratch image (white area) corresponding to the scratch 59a and an image free of scratches, corresponding to areas other than the scratch 59a, are focused on the photoreceptive surface of the CCD 55b. Then, by means of signals from the CCD 55b, these scanning images are read into the personal computer 52.

Then, since the position of the scratch image has already been recognized, the personal computer 52 performs processing to increase the density at the scratch image so as to conform with the density of the image free of scratches (third process). This adjustment of density can be performed by, for example, increasing the emitted light quantity of the second light source section 54b in accordance with the quantity of light from the second light source section 54b scanned by the scanning section 55. This processing may be performed manually by the operator using the keyboard 52c while viewing the monitor 52b. Alternatively, the personal computer 52 itself may be made to perform this processing automatically by means of software which brings the density of the scratch image into conformity with the density of the image in the immediate vicinity of the scratch image. Image data with a scratch image corrected as above is then sent to the digital printer 53 and printed out as an image free of scratch images.

Figure 28:
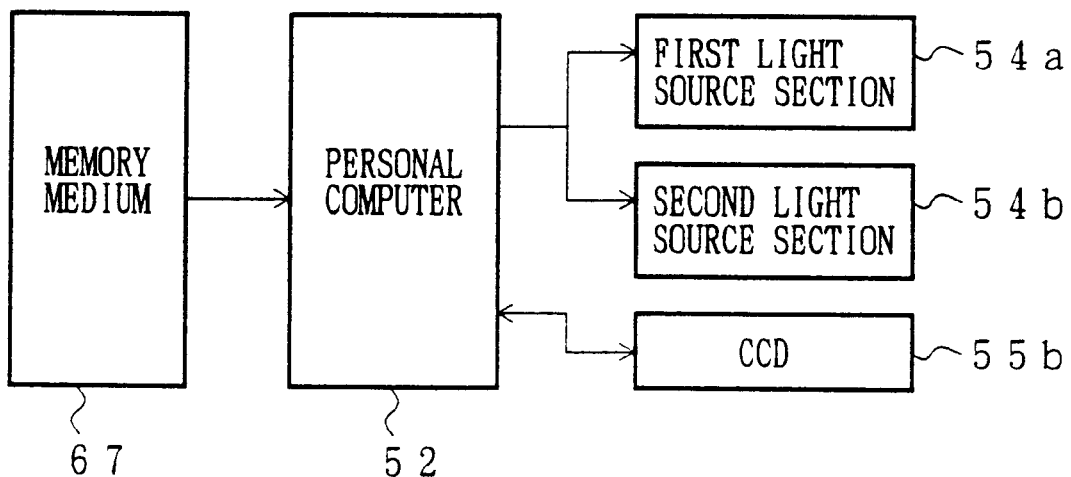
FIG. 28 is a block diagram schematically showing control of operations of the various sections of the film scanner shown in FIG. 20 by a computer when a memory medium recording a scratch recognition program (software) causes the computer to execute scratch recognition processing.

A program for causing the personal computer 52 to perform the foregoing first process may be recorded in a memory medium 67 (such as a CD-ROM) shown in FIG. 28, and, using the memory medium 67, the personal computer 52 may be caused to automatically recognize the existence of a scratch 59a. In other words, in this case, based on the program recorded in the memory medium 67, the personal computer 52 turns on the second light source section 54b, and causes the COD 55b to scan light obtained through the scratch area of the film negative 59. Then, by sending the scanning result of the CCD 55b to the personal computer 52, the personal computer 52 can automatically recognize that there is a scratch area on the film negative 59.

Incidentally, instead of providing a second light source section 54b which itself emits light, means may be provided which, by reflecting, refracting, etc., light from the first light source section 54a, create light projected onto the film surface from random directions.

The following will explain the fact that, since the first light source section 54a requires fewer LEDs than do conventional photograph printers which use LEDs as the light source, the film scanner 51 according to the present embodiment is enabled to provide both ease of adjustment of light-source unevenness and scratch elimination.

Figure 29:
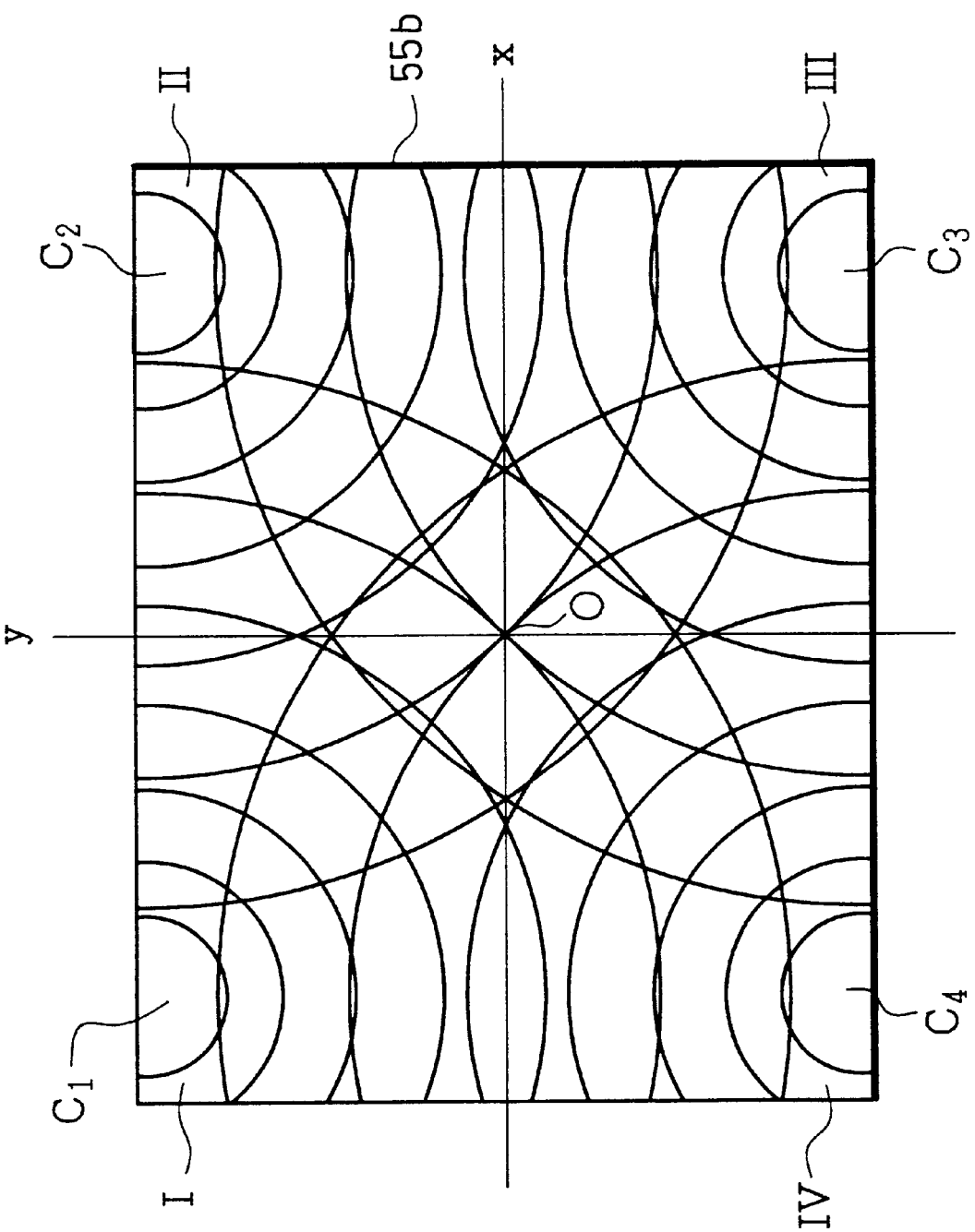
FIG. 29 is an explanatory drawing schematically showing light intensity distribution on a CCD when the light source section shown in FIGS. 24(a) and 24(b) is lit.

FIG. 29 schematically shows density distribution on the photoreceptive surface of the CCD 55b when scanning is performed with the first light source section 54a lit. The four small circles $C_1$ through $C_4$ are areas of highest density, formed at the center of light projected by each cluster of three LEDs emitting red, green, and blue light, respectively. For this reason, areas $C_1$ through $C_4$ will be referred to as "maximum density areas." Since illumination decreases with distance from each maximum density area $C_1$ through $C_4$, density gradually decreases. In other words, in the Figure, the greater the radius of a circle with respect to the center of a maximum density area, the lower the density.

Further, circles concentric on the center of the maximum density area $C_1$ of an area I show density distribution due to illumination by the LEDs $61R_1$, $61G_1$, and $61B_1$ (shown in, for example, FIG. 25(b) ). In the same way, circles concentric on the center of the maximum density area $C_2$ of an area II show density distribution due to illumination by the LEDs $61R_2$, $61G_2$, and $61B_2$; circles concentric on the center of the maximum density area $C_3$ of an area III show density distribution due to illumination by the LEDs $61R_3$, $61G_3$, and $61B_3$; and circles concentric on the center of the maximum density area $C_4$ of an area IV show density distribution due to illumination by the LEDs $61R_4$, $61G_4$, and $61B_4$.

Here, as shown in FIG. 29, the areas I through IV are delimited by an x axis and a y axis, which intersect at a point of origin O. Here, the closer to the point of origin O, the more uniform the density distribution. Accordingly, during actual scanning, the angles of inclination of the respective LEDs and the distance between the objective lens 55a and the CCD 55b are set such that scanning is performed in a region relatively close to the point of origin O having a uniform density distribution at its periphery, i.e., such that the vicinity of each maximum density area $C_1$ through $C_4$ is not used in scanning. A portion with uniform density distribution can be obtained in this way because the area onto which each cluster of three red, green, and blue LEDs projects light is comparatively limited to one of the areas I through IV, as is evident from FIG. 29. This is of course due to the fact that each LED of each cluster of three red, green, and blue LEDs corresponding to one of the areas I through IV inclines so that light emitted thereby has directivity in a direction which intersects with the light axis L.

In this way, in the film scanner 51 according to the present embodiment, it is possible to obtain uniform density distribution in the scanning area of the CCD 55b, even when the LED group 61 is made up of only 12 LEDs. As a result, since the number of LEDs to be controlled is small, light-source unevenness can be easily corrected by controlling each LED's brightness, duration of illumination, etc.

Moreover, even though the present embodiment uses LEDs with narrower directivity (viewing angle of 45° or less, for example) than the LEDs used in conventional light sources, it is still possible to adequately realize the effect of the present invention, i.e., to obtain a portion with uniform density distribution, because the area onto which each cluster of three red, green, and blue LEDs projects light is comparatively limited to one of the areas I through IV. As a result, the scattering ratio of the scattering plate 63 can also be reduced, making it possible to hold to a minimum loss of light quantity of the LED group 61. For this reason, even when the number of LEDs making up the LED group 61 is small, there is no need to lengthen exposure time.

Incidentally, since each cluster of three red, green, and blue LEDs corresponds to one of the areas I through IV of the CCD 55b, the density of yellow (Y), magenta (M), and cyan (C) can be freely changed in each area I through IV by changing the emitted light quantity of the LED of each color in that area.

By means of the structure of the first light source section 54a according to the present embodiment, in order to increase scratch eliminating effect and prevent light-source unevenness during scanning, it is not necessary to provide a scattering plate of high scattering ratio in front of a large number of LEDs, as was necessary in the past, when the LEDs used emitted light having directivity parallel to the light axis. Further, when LEDs emitting light having directivity parallel to the light axis were used, the influence of aberration, etc. due to design of the optical system caused insufficient light quantity in peripheral areas of the CCD 55b relative to the center thereof, and thus it was necessary to increase the emitted light quantity of the LEDs illuminating the peripheral areas of the CCD 55b. However, with the structure of the first light source section 54a according to the present embodiment, the foregoing complicated control is not necessary.

Fifth Embodiment

Figure 30A:
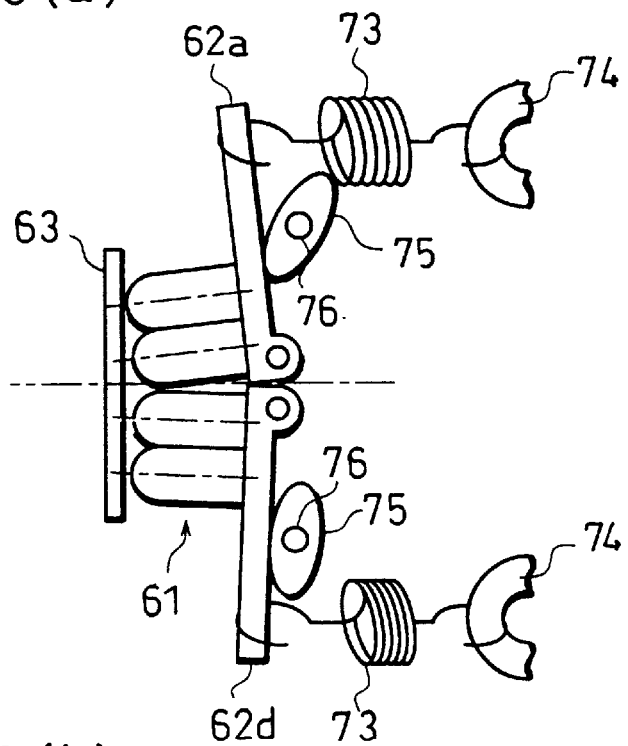
FIG. 30(a) is a side view schematically showing the structure of an LED inclination angle varying mechanism provided in the light source section shown in FIGS. 25(a) and 25(b).
Figure 30B:
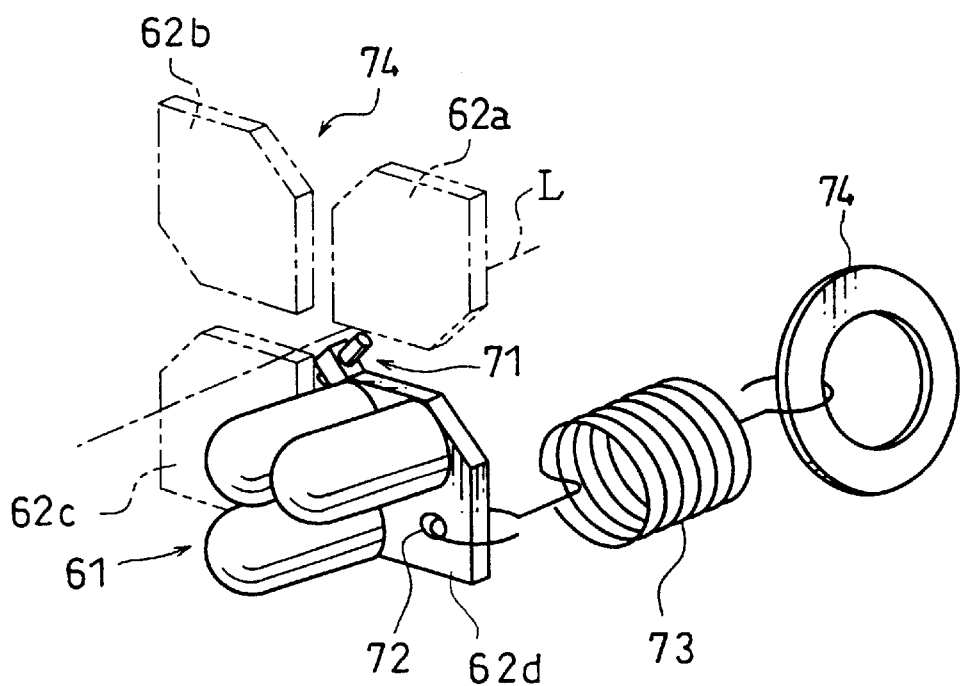
FIG. 30(b) is a perspective view of the inclination angle varying mechanism shown in FIG. 30(a).

The following will explain a further embodiment of the present invention with reference to FIGS. 30(a) and 30(b). The present embodiment will explain a case in which the first light source section 54a of the film scanner 51 explained in the fourth embodiment above is provided with a mechanism for collectively changing the angles of inclination of each cluster of LEDs of the LED group 61. Accordingly, members having the same functions as those used in the fourth embodiment above will be given the same reference symbols, and explanation thereof will be omitted here.

In the present embodiment, as shown in FIGS. 30(a) and 30(b), the LED substrate 62 is divided into four partial substrates 62a through 62d, corresponding to the first through fourth quadrants explained in the fourth embodiment above, and the LEDs belonging to each quadrant are fixed perpendicularly to the corresponding partial substrate 62a, 62b, 62c, or 62d. In each partial substrate 61a through 62d, the corner thereof closest to the light axis L is beveled, and is provided with a hinge 71. In each partial substrate 62a through 62d, a hole 72 is provided in the vicinity of the corner farthest from the light axis. Each hole 72 supports one end of a spring 73. The other end of each spring 73 is supported via a spring supporting member 74.

A cam 75 is provided in contact with the surface of each partial substrate 62a through 62d opposite the side provided with the LEDs. Each cam 75 is rotatable on a shaft 76. In accompaniment with the rotation of a cam 75, the partial substrate 62a, 62b, 62c, or 62d with which it is in contact rotates on its hinge 71 against the tension of the corresponding spring 73. The rotation of each cam 75 is controlled by a control section (not shown). By means of this arrangement, each partial substrate 62a through 62d rotates in accompaniment with the rotation of the corresponding cam 75, and, as a result, the angle of inclination of the LED cluster provided thereon can be adjusted to a desired angle.

Incidentally, the rotation of each partial substrate 62a through 62d is not limited to rotation by means of a cam 75, etc.; it is satisfactory if each partial substrate 62a through 62d is collectively rotatable.

By providing, as above, a mechanism (directivity direction adjusting means) enabling the angles of inclination of the LEDs of the LED group 61 to be varied by quadrant, density distribution on the photoreceptive surface of the CCD 55b (see, for example, FIG. 29) can be adjusted in each area corresponding to a quadrant of the LED group 61. Consequently, the position of each maximum density area can be freely changed, and adjustment of light-source unevenness is further simplified.

Incidentally, the mechanism of the present embodiment for enabling change of the angle of inclination of each LED can of course also be applied to the photograph printing devices of the first and second embodiments above, and to the electronic image input device of the third embodiment above.

Sixth Embodiment

Figure 31:
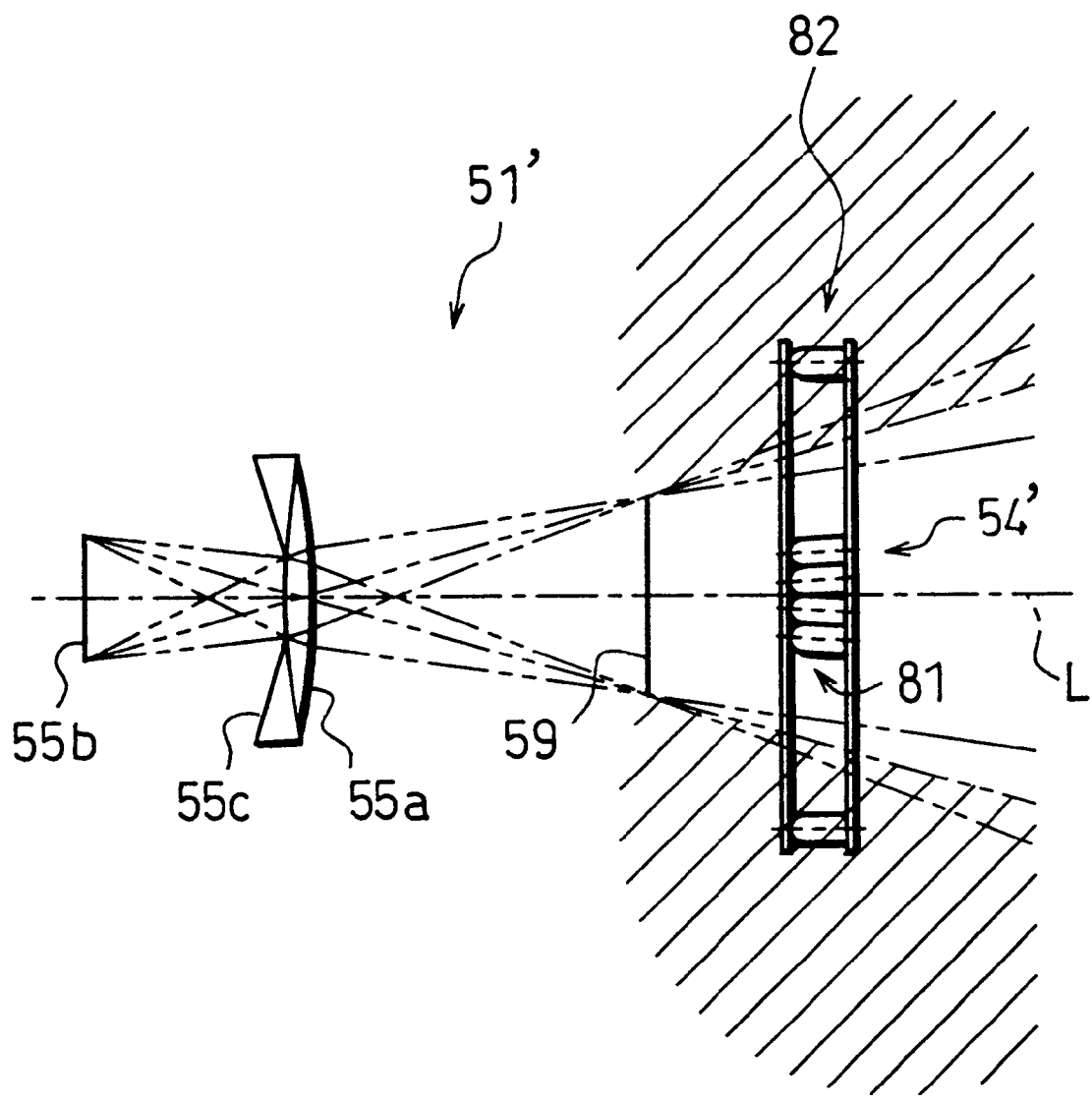
FIG. 31 is a cross-sectional view schematically showing the structure of a film scanner according to a further embodiment of the present invention.
Figure 32A:
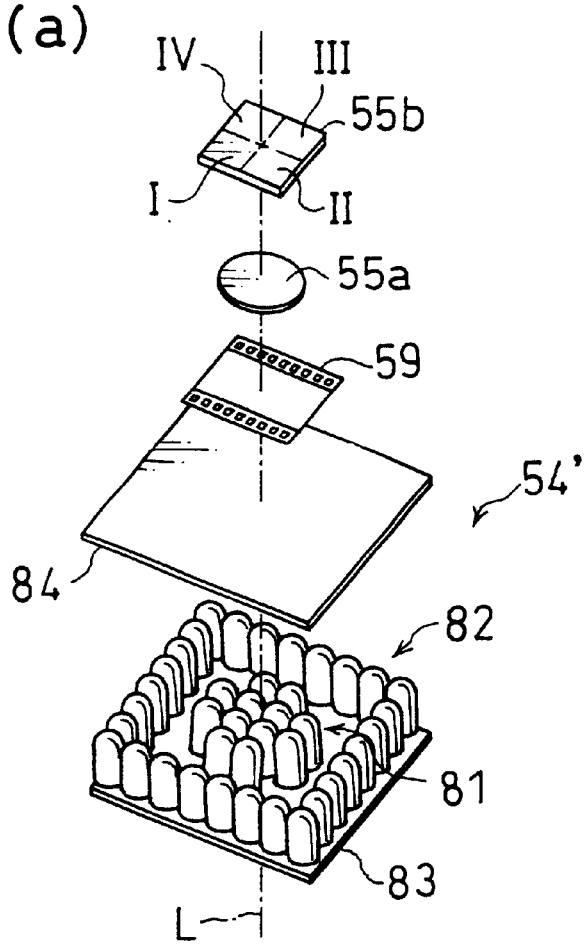
FIG. 32(a) is an exploded perspective view of the interior of the film scanner shown in FIG. 31.
Figure 32B:
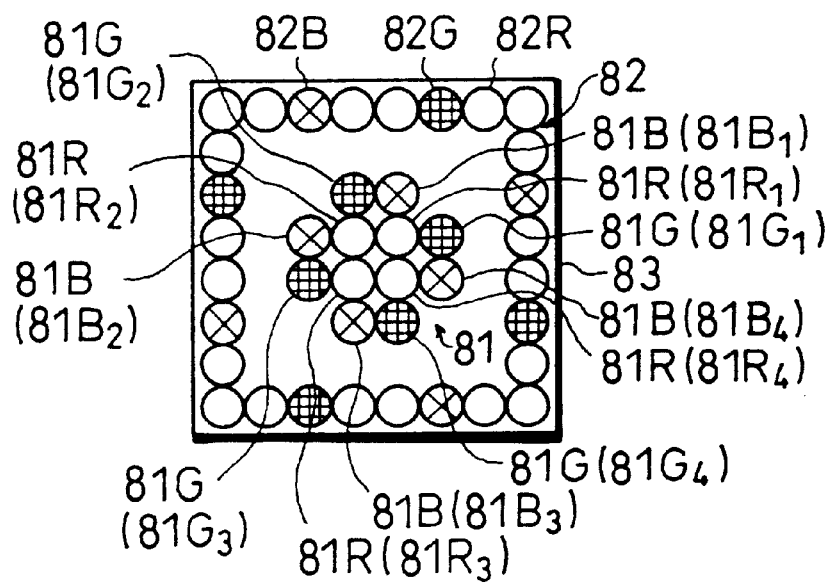
FIG. 32(b) is a plan view showing an arrangement of LEDs in a light source section provided in the film scanner shown in FIG. 31.
Figure 33:
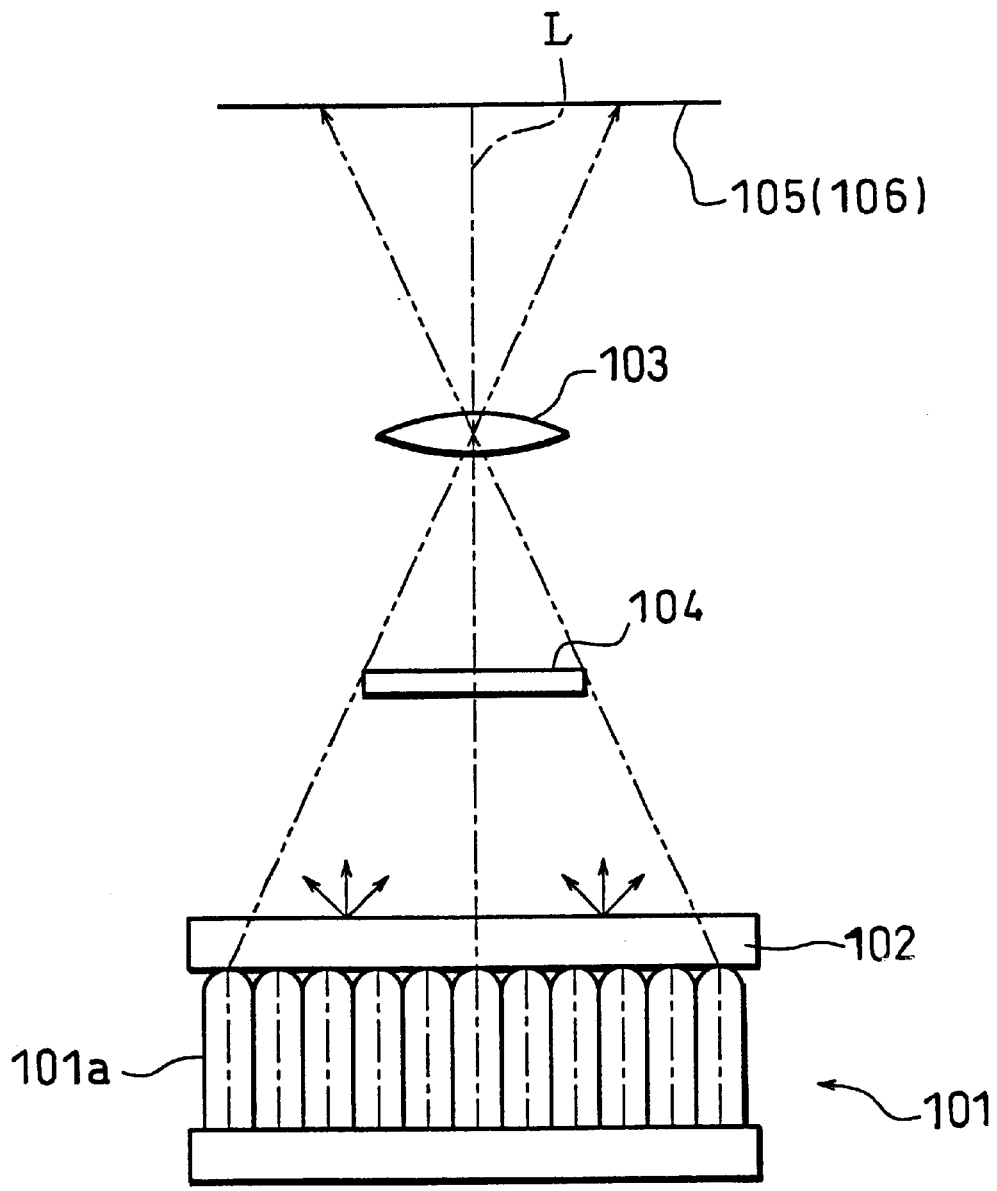
FIG. 33 is a cross-sectional view schematically showing the structure of a printing section of a conventional photograph printer and the structure of a conventional film scanner.
Figure 34:
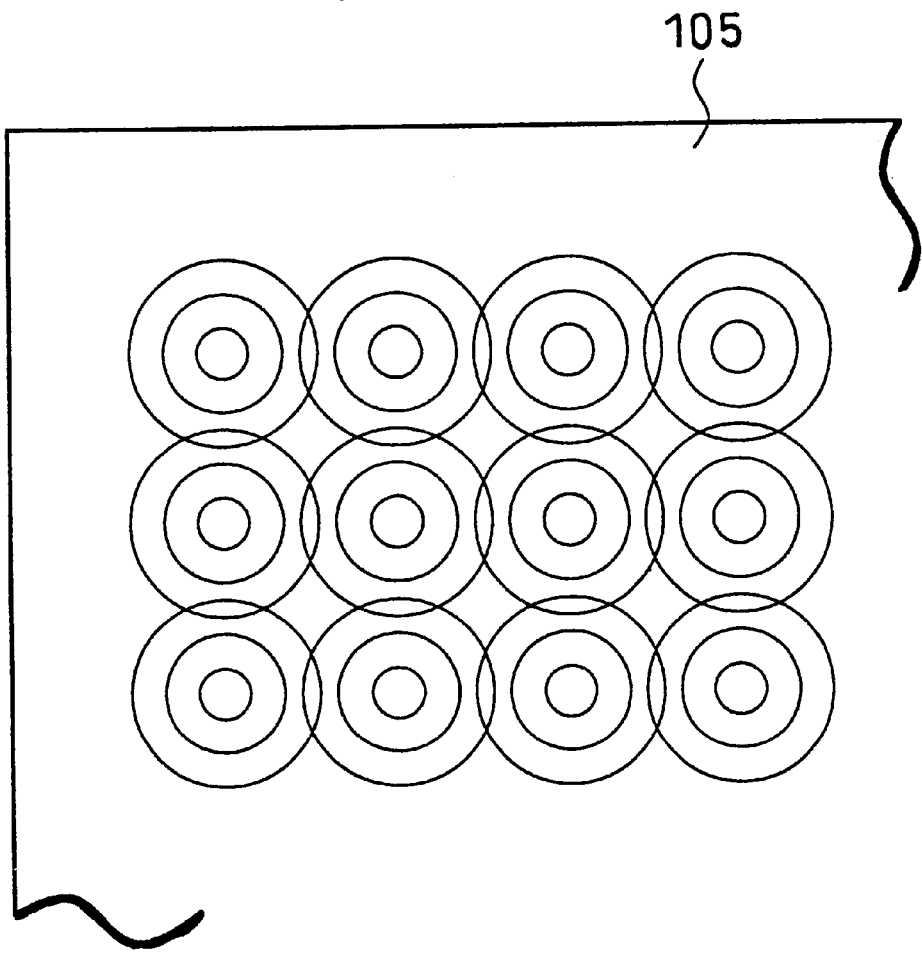
FIG. 34 is an explanatory drawing showing, in the foregoing conventional photograph printer, the intensity distribution of light projected by LEDs onto color photographic paper.

The following will explain a further embodiment of the present invention with reference to FIGS. 31 through 32(b). Members having the same functions as those used in the fourth embodiment above will be given the same reference symbols, and explanation thereof will be omitted here.

A film scanner 51' according to the present embodiment is structured as the film scanner 51 of the fourth embodiment above, except that the light source section 54 is replaced by a light source section 54', and no condensing lens is provided.

As shown in FIG. 32(a), the light source section 54' includes LED groups 81 and 82, an LED substrate 83 which integrally supports both LED groups 81 and 82, and a scattering plate 84 provided close to the heads of the LED groups 81 and 82 so as to cover both LED groups 81 and 82, which scatters light emitted by the LED groups 81 and 82. Here, the LED group 81 corresponds to the first light source set forth in the claims, and the LED group 82 corresponds to the light compensating means set forth in the claims.

The LED group 81 is made up of a plurality of LEDs densely packed around the center of the LED substrate 83, and chiefly projects light (condensed light) toward the CCD 55b through the film negative 59. The LED group 82, on the other hand, is made up of a plurality of LEDs arranged in the shape of a square frame encircling the LED group 81, and chiefly projects light (scattered light) toward the CCD 55b through an area of surface unevenness, such as a scratch, formed in the film negative 59.

Since, in the present embodiment, the LED groups 81 and 82 are provided on a common LED substrate 83, the LED group 81 cannot be independently moved along the light axis L, but, by moving the light source section 54' itself along the light axis L, it is possible to perform printing in accordance with the extent of the CCD 55b receiving light, as in the fourth embodiment above.

The following will explain the arrangement of the LED group 81.

FIG. 32(b) is a plan view of the LED group 81, viewed from the scattering plate 84 side in FIG. 32(a). As shown in FIG. 32(b), the LED group 81 is made up of LEDs 81R, 81G, and 81B, which emit red, green, and blue light, respectively. In other words, the LEDs have different respective spectral characteristics corresponding to the respective colors.

Here, for ease of explanation, the LEDs 81R, 81G, and 81B will be referred to as follows. As shown in FIG. 32(b), LEDs belonging to a first quadrant will be referred to as LEDs $81R_1$, $81G_1$, and $81B_1$; those belonging to a second quadrant as LEDs $81R_2$, $81G_2$, and $81B_2$; those belonging to a third quadrant as LEDs $81R_3$, $81G_3$, and $81B_3$; and those belonging to a fourth quadrant as LEDs $81R_4$, $81G_4$, and $81B_4$.

The LEDs 81R, 81G, and 81B of the LED group 81 are arranged as in the LED group 61 used in the fourth embodiment above. In other words, an equal number of LEDs of each color (a total of 12 LEDs) are densely packed around the center of the LED group 81. More specifically, of the LED group 81, four LEDs $81R_1$ through $81R_4$ are provided mutually touching near the center of the LED substrate 83, and, touching the four LEDs $81R_1$ through $81R_4$ are four LEDs $81G_1$ through $81G_4$ in point symmetry with each other (in other words, having symmetry with respect to a light axis L) and four LEDs $81B_1$ through $81B_4$ in point symmetry with each other. By this arrangement, the three LEDs $81R_1$, $81G_1$, and $81B_1$ form a cluster, and three more clusters are formed by three different-colored LEDs each. Accordingly, the LED group 81 is made up of four clusters.

As in the LED group 61 in the fourth embodiment above, the LEDs 81R, 81G, and 81B of each cluster are attached to the LED substrate 83 so as to incline, so that light emitted thereby has directivity in a direction which intersects with the light axis L. Consequently, the LEDs 81R, 81G, and 81B of each cluster correspond to a specific area of the CCD 55b, and chiefly illuminate the area to which they correspond.

Specifically, as shown in FIG. 32(a), the CCD 55b is divided into four areas I through IV by two axes intersecting at the light axis L, with the areas I, II, III, and IV located beginning with the lower left area, viewed from the side opposite the objective lens 55a, and moving counter-clockwise. Here, the LEDs $81R_1$, $81G_1$, and $81B_1$ shown in FIG. 32(b) are provided so as to correspond with area I. In the same way, the LEDs $81R_2$, $81G_2$, and $81B_2$ are provided so as to correspond with area II; the LEDs $81R_3$, $81G_3$, and $81B_3$ so as to correspond with area III; and the LEDs $81R_4$, $81G_4$, and $81B_4$ so as to correspond with area IV.

In the LED group 82, on the other hand, LEDs 82G, which emit green light, alternate with LEDs 82B, which emit blue light, with two or three LEDS 82R, which emit red light, provided between each LED 82G/LED 82B pair. The LEDs of each color are arranged with point symmetry with each other with respect to the light axis L. The overall arrangement of the LED group 82 is shaped as a square frame. In order to perform suitable scanning, a ratio among the numbers of LEDs 82R, 82G, and 82B is set to approximately 5–6:2:1. In other words, a ratio is used which can supplement red light, which is most prone to insufficient light quantity.

The arrangement of the LED group 81 also takes the foregoing point into consideration. In other words, the LEDs 81R are provided toward the center of the LED group 81 rather than the periphery thereof, in the position from which red light can be most easily concentrated on the CCD 55b. Moreover, when brightness is held constant, a ratio among the durations of illumination of the LEDs of the respective colors is set to 5–6:2:1. Alternatively, when duration of illumination is held constant, the foregoing ratio may be a ratio of brightness of the LEDs of the respective colors.

Further, the LEDs 82R, 82G, and 82B, like the LEDs of the LED group 64 in the fourth embodiment above, are attached to the LED substrate 83 so that light emitted thereby has directivity in a direction parallel to the light axis L. The reason for this is because the manufacturing process and manufacturing control are simpler than when each LED 82R, 82G, and 82B is attached with a predetermined angle of inclination. However, if it is important to increase efficiency of light use, it is preferable to attach each LED 82R, 82G, and 82B to the LED substrate 83 with a predetermined angle of inclination.

Incidentally, the numbers of LEDs provided in the LED groups 81 and 82 are not limited to those explained in the present embodiment, and may be determined, within the limits of the space for installation, such that the product of LED brightness and illumination time for red, green, and blue fulfills the ratio X: 2:1:X, where X is in a range including 5 and 6.

The following will explain the relative positions of the LED groups 81 and 82 with respect to the light axis L. In the exposure system made up of the film negative 59, the objective lens 55a, and the CCD 55b, FIG. 31 shows a domain in which light from the light source section 54' directly reaches the CCD 55b and a domain in which this light does not directly reach the CCD 55b. The light source section 54' is of course provided on the opposite side of the film negative 59 from the objective lens 55a, and is not provided on the objective lens 55a side of the film negative 59. In FIG. 31, the diagonally hatched area indicates a domain from which, even if a light source is provided, light does not directly reach any point of the CCD 55b. The area in the vicinity of the light axis L free of diagonal hatching, which is surrounded by the hatched area, indicates a domain from which, if a light source is provided, light reaches some point on the CCD 55b. Light traveling along the dividing line between the hatched and non-hatched areas passes through the edge of the film negative 59 and reaches the edge of the CCD 55b.

Here, an important feature of the present invention is the positional relationship of the LED groups 81 and 82, whereby the LED group 81 is provided within the non-hatched area centered on the light axis L, and the LED group 82 is provided within the diagonally hatched area. Accordingly, although both LED groups 81 and 82 are lit during, for example, restoration of a scratch image, light from the LED group 82 does not reach the CCD 55b if the film negative 59 is free of scratches, etc.

As discussed above, the light source section 54', in which the LED groups 81 and 82 are arranged as explained above, is not provided with a condensing lens like that used in the fourth embodiment above. Nevertheless, just as in the fourth embodiment, condensed light projected by the LED group 81 is refracted at the scratch area of the film negative 59 and does not reach the CCD 55b, but at areas other than the scratch area, passes through the film negative 59 and reaches the CCD 55b. Scattered light projected by the LED group 82, on the other hand, is refracted at the scratch area of the film negative 59 and reaches the CCD 55b, but at areas other than the scratch area, passes through the film negative 59 and does not reach the CCD 55b.

Accordingly, in that condensed light and scattered light from the LED groups 81 and 82 are used, the present embodiment is no different from the fourth embodiment above, and, like the fourth embodiment, the present embodiment is able to perform scratch recognition, and, based on the result of scratch recognition, to perform image restoration of only the scratch image.

Incidentally, it is possible to apply the light source section 54 used in the fourth embodiment above in place of the light source section 54' of the present embodiment, or, conversely, to apply the light source section 54' of the present embodiment in place of the light source section 54 of the fourth embodiment, as long as the positions of the respective LED groups are given proper consideration. The effects of the present invention can be obtained in both of these cases.

As discussed above, the photograph printing device according to the present invention may be structured so as to include a light source which projects light onto an information holding medium which holds original image information, and so as to print onto photosensitive material an image corresponding to the original image information by projecting light onto the photosensitive material through the information holding medium; in which the light source is made up of a plurality of light emitting means having different respective spectral characteristics, and each of the light emitting means is provided so as to incline with respect to a light axis, so that light emitted thereby has directivity toward the light axis.

Further, the photograph printing device according to the present invention may be structured so that the light source is made up of a plurality of clusters, each made up of a plurality of light emitting means, and each cluster has a specific light projection area on the photosensitive material.

With the foregoing structure, adjustment of density unevenness and color unevenness over the entirety of the photosensitive material can be performed by adjusting the light emitting means in the cluster corresponding to each light projection area. As a result, adjustment of density unevenness and color unevenness of the entire photosensitive material can be further simplified.

Further, the photograph printing device according to the present invention may be structured so that light condensing means are provided between the light source and the information holding medium, for condensing the light from the light source.

With the foregoing structure, efficiency of use of light from the light source can be improved, thus reducing loss of light quantity.

Further, the photograph printing device according to the present invention may be structured so that the light condensing means are a condensing lens.

With the foregoing structure, layout of the optical system is simpler than when the condensing means are, for example, a concave mirror. Accordingly, it is easy to design the optical system, and since the structure of the optical system can be simplified, the size of the device can be reduced.

Further, the photograph printing device according to the present invention may be structured so that the light emitting means are light emitting diodes, and so that, for each light emitting diode, at least one of emitted light quantity, viewing angle, inclination, and wavelength of emitted light can be adjusted.

With the foregoing structure, by adjusting, for each light emitting diode, at least one of emitted light quantity, viewing angle, inclination, and wavelength of emitted light, a portion of the photosensitive material having uniform density distribution can be obtained across a wide extent. As a result, color unevenness can be more easily distinguished, thus simplifying adjustment of color unevenness.

As discussed above, the electronic image input device according to the present invention may be structured so as to include the foregoing photograph printing device, and image pickup means, which pick up light from the light emitting means obtained through the information holding medium.

With the foregoing structure, adjustment of density and color unevenness, for example, can be performed directly, on the basis of output from the image pickup means, prior to printing. Accordingly, it is not necessary to perform test printing to detect unevenness in density and color, and, as a result, adjustment of density unevenness and color unevenness can be performed quickly.

As discussed above, the film scanner according to the present invention may be structured so as to include a first light source, which projects light onto film recording an original image; scanning means, which register the original image by scanning light transmitted through the film; and light compensating means, which compensate insufficient light quantity due to disturbance of the light path from the first light source to the scanning means by an irregularity in the surface of the film, which causes an image of the irregularity to be formed in the scanning means, using the disturbance of the light path caused by the irregularity.

Further, the film scanner according to the present invention may be structured so that the light compensating means are provided in a domain on the opposite side of the film from the scanning means, from which light projected by the light compensating means does not reach the scanning means after passing through the film.

With the foregoing structure, when the light compensating means are provided in a domain from which light projected thereby, even if incident on the film, does not reach the scanning means after passing through the film, light projected by the light compensating means does not reach the scanning means if there is no irregularity in the film, but if there is an irregularity in the film, part of the light projected by the light compensating means, due to refraction, etc. by the irregularity, reaches the scanning means. Accordingly, by illuminating both the first light source and the light compensating means during scanning, the first light source contributes to scanning of the original image recorded on the film, and, only when there is an irregularity in the film, the light compensating means prevent appearance of the irregularity in the scanning image.

As a result, even if the light compensating means are provided separately from the first light source, there is no need to change the particulars of control of the first light source adjusted for scanning of the original image.

Further, the film scanner according to the present invention may be structured so that the light compensating means are a second light source made up of a plurality of light emitting means (such as LEDs) having different respective spectral characteristics, and so that emitted light quantity of at least the second light source can be changed as desired.

With the foregoing structure, it is possible to adjust the emitted light quantity of the light emitting means of the second light source in accordance with, for example, the extent of an irregularity (such as the depth of a scratch) formed in the surface of the film. Accordingly, when, for example, the extent of the irregularity is small (a shallow scratch, for example), the foregoing emitted light quantity can be set lower than usual, and restoration of the scratch image can be performed while reducing the power consumption of the second light source. When, on the other hand, the extent of the irregularity is large (a deep scratch, for example), the scratch image can be restored with certainty by setting the foregoing emitted light quantity higher than usual.

Further, by also changing the emitted light quantity of the first light source in accompaniment with adjustment of the emitted light quantity of the second light source, the brightness, i.e., so-called sharpness of the scanning image obtained by the scanning means can be changed.

Further, the film scanner according to the present invention may be structured so that the first light source is made up of a plurality of light emitting means having different respective spectral characteristics, and the light emitting means are provided so that light emitted thereby has directivity in a plurality of directions intersecting with a light axis from the first light source to the scanning means.

With the foregoing structure, since the directions of directivity of light are set so as to intersect with the light axis, a portion of the light emitting means of the first light source have correspondence with a specific area of the scanning means which is deflected from the light axis. In other words, light emitted by a portion of the light emitting means is projected onto a specific area of the scanning means which is deflected from the light axis. Further, setting the light so as to have directivity in a plurality of directions intersecting with the light axis produces a plurality of such correspondences between a portion of the light emitting means and a specific area of the scanning means.

In this way, since a plurality of specific areas decentered from the light axis are formed in the intensity distribution of the projected light, an area of uniform intensity distribution is formed in a central area surrounded by the foregoing specific areas, i.e., in an area surrounding the light axis. Since unevenness in density and color do not occur in such an area of uniform intensity distribution, it is preferable to use this area in scanning. Further, as long as the light emitting means are set such that light emitted thereby has directivity in a plurality of directions intersecting with the light axis, such an area of uniform intensity distribution is basically formed, even if a scattering plate, etc. for scattering light is not provided in front of the light emitting means.

Accordingly, light emitted by the light emitting means can be used effectively, and loss of light quantity can be reduced. Consequently, in comparison with a conventional film scanner in which light had directivity parallel to the light axis, and which required a scattering plate of high scattering ratio, the film scanner according to the present invention can obtain the effects of both shortening illumination time and preventing an irregularity from appearing in the scanning image.

Further, the film scanner according to the present invention may be structured so that the directions of directivity of light emitted by the light emitting means of the first light source are variable.

With the foregoing structure, changing the direction of directivity of light emitted by a portion of the light emitting means of the first light source also changes the intensity distribution in the specific area corresponding to that portion of the light emitting means. In this way, when the intensity distribution of a specific area is adjusted, the intensity distribution over the entirety scanning means, which is made up of the total of the specific areas, naturally also changes. Accordingly, adjustment to obtain an area of uniform intensity distribution over the entirety of the photoreceptive surface of the scanning means can be performed by changing the direction of directivity of the light emitting means corresponding to a single specific area. Consequently, such adjustment is easier than in the past, when adjustment of emitted light quantity of each of a plurality of light emitting means was necessary.

Further, the film scanner according to the present invention may be structured so that the light emitting means provided in the first light source and in the light compensating means are light emitting diodes.

With the foregoing structure, since brightness and duration of illumination of light emitting diodes can be easily controlled, adjustment of density unevenness and color unevenness by changing emitted light quantity is simplified. Further, viewing angle of the light emitting diodes can be selected as necessary, and the angle of inclination of the direction of directivity of light can be easily changed by changing the angle of attachment of the light emitting diodes to the substrate. In this way, the extent of the area of uniform intensity distribution can be easily changed.

Further, since light emitting diodes produce less heat, consume less power, and have more stable spectral characteristics than a halogen lamp, there is no need for structural parts such as a cooling fan, heat-absorbing filter, light-adjusting filter, cutoff filter, etc. Further, since power consumption is small and spectral characteristics are stable, a stable direct-current power source is unnecessary, thus enabling use of a simple direct-current power source using an integrated circuit. Consequently, reduction of the size and weight of the film scanner can be realized. Further, since spectral characteristics are stable, ON/OFF control can be performed whenever necessary. Consequently, there is no need to provide a shutter mechanism in front of the scanning means, and power consumption can be further reduced.

As discussed above, the scratch recognition method according to the present invention may include the steps of projecting light onto film recording an original image; and recognizing the existence of a scratch area formed on the film by scanning light obtained through the scratch area.

With the foregoing method, by scanning, among the light projected onto the film, the light obtained through the scratch area, it is possible to recognize the existence of a scratch area on the film. Accordingly, if the existence of a scratch area can be distinguished in this manner, it is then possible to perform processing to increase image density at the scratch image alone by, for example, adjusting emitted light quantity. As a result, scratch images can be restored with certainty.

As discussed above, a memory medium recording a scratch recognition program according to the present invention may be structured so as to record a program which causes a computer to recognize the existence of a scratch area, formed on film recording an original image, by projecting light onto the film and scanning light obtained through the scratch area.

With the foregoing structure, since the memory medium records a program for projecting light onto the film recording the original image and scanning, among the light projected onto the film, the light obtained through the scratch area, the computer automatically recognizes the existence of a scratch area on the film. Accordingly, in comparison with a case in which the operator checks scanning light on a monitor, for example, scratch recognition can be performed more quickly, and with less effort on the part of the operator.

As discussed above, an image restoration method according to the present invention may include the steps of (a) projecting light onto film recording an original image, and scanning light obtained through a scratch area formed on the film; (b) after step (a), projecting onto the film light differing from the light projected in step (a), and scanning light passing through areas of the film other than the scratch area; and (c) bringing density of an image obtained in step (a) into conformity with density of an image obtained in step (b).

With the foregoing method, first, by scanning light obtained through the scratch area formed on the film, the existence of the scratch area on the film is recognized, and the image recorded in the scratch area (hereinafter referred to as the "first image") is obtained. Next, by scanning light passing through areas of the film other than the scratch area, the image recorded in those areas (hereinafter the "second image") is obtained, and then, finally, density of the first image is adjusted so as to substantially conform with density of the second image. Accordingly, even when a scratch area is formed on the film, by recognizing the scratch area, it is possible to restore the scratch image (white area, for example) alone. As a result, it is possible to obtain good prints free of scratch images.

Further, in the image restoration method according to the present invention, step (c) may be performed by changing an emitted light quantity in accordance with the quantity of light scanned in step (a).

With the foregoing method, when, for example, the quantity of light scanned in step (a) is small, by increasing the quantity of light projected, the quantity of light scanned can be increased, thus increasing the density of the first image. Accordingly, density of the first image can be easily adjusted by adjusting the emitted light quantity of light corresponding to the first image.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A photograph printing device for transferring an image from an information holding medium which holds original image information to a photosensitive material, said photograph printing device comprising:

a light source which projects light onto said information holding medium to transfer said image to said photosensitive material, said light source comprising:

a plurality of light emitters having a plurality of different spectral characteristics; and a fixing substrate providing a common plane onto which said light emitters are secured, each said light emitter being provided so as to incline with respect to both said fixing substrate and a light axis passing through a point on said fixing substrate and a point on said information holding medium, so that light emitted by said each said light emitter has directivity toward the light axis.

2. The photographic printing device set forth in claim 1, wherein:

said light source comprises a plurality of clusters, each cluster made up of a plurality of said light emitters; and each said cluster comprises at least one said light emitter which emits red light, at least one said light emitter which emits green light, and at least one said light emitter which emits blue light.

3. The photograph printing device set forth in claim 2, wherein:

said light emitters which emit red light are provided in positions in each cluster closest to the light axis.

4. The photograph printing device set forth in claim 2, wherein:

where brightness of said light emitters is constant, respective durations of illumination of said light emittters emitting light of each color are set to a ratio of red:green:blue=X:2:1, where X is in a range including 5 and 6.

5. The photograph printing device set forth in claim 2, wherein:

where duration of illumination of said light emitters is constant, respective brightness of said light emitters emitting light of each color is set to a ratio of red:green:blue=X:2:1, where X is in a range including 5 and 6.

6. The photograph printing device set forth in claim 2, wherein:

a product of brightness and duration of illumination of said light emitters emitting light of each color is set to a ratio of red:green:blue=X:2:1, where X is in a range including 5 and 6.

7. The photograph printing device set forth in claim 1, wherein:

said light emitters are light emitting diodes, and, for each said light emitting diode, any one of emitted light quantity, viewing angle, inclination with respect to the light axis and said fixing substrate, and wavelength of emitted light can be adjusted.

8. The photograph printing device set forth in claim 1, wherein:

said light source includes a plurality of clusters corresponding to a plurality of areas on said fixing substrate, each cluster made up of a plurality of said light emitters; and each said cluster projects light onto a predetermined portion of the photosensitive material.

9. The photographic printing device set forth in claim 8, further comprising:

a controller which controls quantity of light emitted by said light emitters of each said cluster.

10. The photograph printing device set forth in claim 8, further comprising:

a diaphragm member, having a plurality of apertures, each aperture provided corresponding to a different one of said light emitters, wherein:

said diaphragm member adjusts a viewing angle of said light emitter of each said cluster, using said apertures.

11. The photograph printing device set forth in claim 8, wherein:

an angle of inclination of each said cluster with respect to both the light axis and said fixing substrate and a wavelength of emitted light of said light emitting emitters can be adjusted for each said cluster.

12. The photographic printing device set forth is claim 1, further comprising:

a light condenser, which condenses light from said light source onto said information holding medium.

13. The photographic printing device set forth in claim 12, wherein:

said light condenser is a condensing lens.

14. The photographic printing device set forth in claim 13, wherein:

said condensing lens is provided between said light source and said information holding medium; and said light source is provided within a range in which light from said light source is projected through said condensing lens onto a single point on the photosensitive material, at a position within that range closest to said condensing lens.

15. The photograph printing device set forth in claim 1, further comprising:

a reflecting member, which reflects light which is projected toward said fixing substrate toward said photosensitive material.

16. A photograph printing device set forth in claim 1, wherein:

said information holding medium holds said original image information before light is projected from said light source.

17. A photograph printing device set forth in claim 1, wherein:

a condition of said information holding medium varies according to the original image information held by said information holding medium.

18. A photograph printing device set forth in claim 1, wherein:

said information holding medium is a photograph film.

19. A photograph printing device set forth in claim 1, wherein:

said information holding medium is a light modulation element.

20. The photograph printing device set forth in claim 1, wherein:
said light emitters are light emitting diodes, and a viewing angle of emitted light of each said light emitting diode is adjustable.

21. The photograph printing device set forth in claim 1, wherein:
said light emitters are light emitting diodes, and an inclination of each light emitting diode with respect to the light axis and the fixing substrate is adjustable.

22. The photograph printing device set forth in claim 1, wherein:
said light emitters are light emitting diodes, and an emitted light quantity of each light emitting diode is adjustable.

23. The photograph printing device set forth in claim 1, wherein:
said light emitters are light emitting diodes, and a wavelength of emitted light of each said light emitting diode is adjustable.

24. An electronic image device comprising:
a photograph printing device for transferring an image from an information holding medium which holds original image information to a photosensitive material, said photograph printing device comprising:
a light source for projecting light onto said information holding medium, said light source comprising:
a plurality of light emitters, each light emitter having one of a plurality of different respective spectral characteristics, and
a fixing substrate providing a common plane onto which said plurality of light emitters are secured, each said light emitter being provided so as to incline with respect to both said fixing substrate and a light axis passing through said information holding medium and said fixing substrate, so that light emitted by each said light emitter has directivity toward the light axis; and
an image pickup, which picks up light from said light emitters obtained from said information holding medium.

25. The electronic image input device set forth in claim 24, further comprising:
support means, which support said image pickup means, and interpose said image pickup means into and withdraw said image pickup means from a light path between said light source and the photosensitive material.

26. The electronic image input device set forth in claim 24, wherein said light source comprises:
a light source for printing, which projects light onto the photosensitive material through the information holding medium; and
a light source for image pickup, which projects light onto said image pickup through the information holding medium;
said light source for printing and said light source for image pickup being provided separately.

27. A photograph printing device for transferring an image from an information holding medium which holds original image information to a photosensitive material, the photograph printing device comprising:
a light source for projecting light onto said information holding medium, said light source comprising:
a plurality of light emitters having different respective spectral characteristics and grouped into a plurality of clusters;
a plurality of fixing substrates arranged around a light axis, the light axis passing through a point adjacent each said fixing substrate and a point on said information holding medium, each said fixing substrate providing a common plane onto which the light emitters of one of said clusters are secured; and
an inclination angle adjuster, which separately adjusts inclination angles of said fixing substrates with respect to the light axis, so that light emitted by said light emitters of each said cluster has directivity toward the light axis.

28. A photograph printing device for transferring an image from an information holding medium which holds original image information to a photosensitive material, the photograph printing device comprising:
a light source for projecting light onto said information holding medium, said light source comprising:
a plurality of light emitters, each light emitter having one of a plurality of different spectral characteristics and a fixing substrate providing a common plane onto which said plurality of light emitters are secured, each said light emitter being provided so as to incline with respect both to said fixing substrate and a light axis passing through a point of said fixing substrate and a point on said information holding medium, so that light emitted by each said light emitter has directivity toward the light axis.

29. An electronic image device comprising:
a photograph printing device for transferring an image from an information holding medium which holds original image information to a photosensitive material, said photograph printing device comprising:
a light source which projects light onto said information holding medium, said light source comprising a plurality of light emitters, each light emitter having one of a plurality of different spectral characteristics and a fixing substrate providing a common plane onto which said plurality of light emitters are secured, each said light emitter being provided so as to incline with respect to both said fixing substrate and a light axis passing through a point on said fixing substrate and a point on said information holding medium, so that light emitted by each said light emitter has directivity toward the light axis; and
an image pickup, which picks up light from said light emitter obtained from said information holding medium.

30. A photograph printing device for printing an image from an information holding medium onto a photosensitive medium, the printing device comprising:
a plurality of light sources arranged in an array, each light source comprising:
a substrate, and
a group of light emitters having a plurality of different spectral characteristics and mounted on the substrate, each light emitter having one of the plurality of different spectral characteristics, each light source mounted offset from a light axis passing through a point near each of the substrates and through a point on the information holding medium; and
a mechanism which adjusts an angle of inclination of at least one light source with respect to the light axis, to adjust the inclination of emitted light relative to the light axis; wherein, the plurality of light sources are arranged such that the light emitters nearest the light axis have the same spectral characteristic.

* * * * *

UNITED STATES PATENT AND TRADEMARK OFFICE
CERTIFICATE OF CORRECTION

PATENT NO. : 6,396,565 B1
DATED : May 28, 2002
INVENTOR(S) : Yuji Yamamoto et al.

It is certified that error appears in the above-identified patent and that said Letters Patent is hereby corrected as shown below:

Column 43,
Line 43, delete "means".
Line 44, change "interpose" to -- interposes -- and delete "means".
Line 45, change "draw" to -- draws -- and delete "means".

Signed and Sealed this

Tenth Day of February, 2004

JON W. DUDAS
*Acting Director of the United States Patent and Trademark Office*